(12) United States Patent
Fukushima et al.

(10) Patent No.: US 11,503,278 B2
(45) Date of Patent: Nov. 15, 2022

(54) DEVICE FOR DERIVING AFFINE MERGE CANDIDATE

(71) Applicant: JVCKENWOOD Corporation, Yokohama (JP)

(72) Inventors: Shigeru Fukushima, Yokohama (JP);
Hiroya Nakamura, Yokohama (JP);
Toru Kumakura, Yokohama (JP);
Hideki Takehara, Yokohama (JP);
Satoru Sakazume, Yokohama (JP);
Hiroyuki Kurashige, Yokohama (JP)

(73) Assignee: JVCKENWOOD CORPORATION, Kanagawa (JP)

( * ) Notice: Subject to any disclaimer, the term of this patent is extended or adjusted under 35 U.S.C. 154(b) by 0 days.

(21) Appl. No.: 17/269,971

(22) PCT Filed: Dec. 20, 2019

(86) PCT No.: PCT/JP2019/050012
§ 371 (c)(1),
(2) Date: Feb. 19, 2021

(87) PCT Pub. No.: WO2020/137850
PCT Pub. Date: Jul. 2, 2020

(65) Prior Publication Data
US 2021/0243436 A1    Aug. 5, 2021

(30) Foreign Application Priority Data
Dec. 28, 2018   (JP) .............................. JP2018-247409

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/159* (2014.11); *H04N 19/46* (2014.11)

(58) Field of Classification Search
CPC .. H04N 19/105; H04N 19/159; H04N 19/176; H04N 19/46; H04N 19/52; H04N 19/70
See application file for complete search history.

(56) References Cited

U.S. PATENT DOCUMENTS 6,275,532 B1    8/2001  Hibi et al.
8,737,480 B2    5/2014  Wang et al.
(Continued)

FOREIGN PATENT DOCUMENTS

JP    09172644 A    6/1997
RU    2628226 C2    8/2017
(Continued)

OTHER PUBLICATIONS

International Search Report for related PCT App No. PCT/JP2019/050012 dated Mar. 17, 2020, 6 pgs.
(Continued)

*Primary Examiner* — Francis Geroleo
(74) *Attorney, Agent, or Firm* — Procopio, Cory, Hargreaves & Savitch LLP

(57) ABSTRACT

Technology for improving coding efficiency by performing a block split suitable for picture coding and decoding is provided. A moving-picture coding device for performing an affine transform in units of coding blocks includes an affine inheritance merging candidate derivation unit configured to derive an affine inheritance merging candidate for inheriting an affine model of blocks neighboring a coding target block in a space domain, an affine construction merging candidate derivation unit configured to derive an affine construction merging candidate from a plurality of motion information
(Continued)

elements of blocks neighboring the coding target block in a space or time domain, and an affine fixation merging candidate derivation unit configured to derive an affine fixation merging candidate in which motion information of an affine control point is fixed. A motion vector of each affine control point is fixed to (0, 0) in the affine fixation merging candidate.

6 Claims, 60 Drawing Sheets

(51) Int. Cl.
  *H04N 19/159* (2014.01)
  *H04N 19/46* (2014.01)

(56) References Cited

U.S. PATENT DOCUMENTS

| | | | |
|---|---|---|---|
| 9,838,710 B2 | 12/2017 | Lee et al. | |
| 2020/0059651 A1* | 2/2020 | Lin | H04N 19/105 |
| 2020/0077113 A1* | 3/2020 | Huang | H04N 19/55 |
| 2020/0244989 A1* | 7/2020 | Lee | H04N 19/137 |
| 2021/0203943 A1* | 7/2021 | Lin | H04N 19/105 |
| 2021/0227207 A1* | 7/2021 | Zhang | H04N 19/159 |

FOREIGN PATENT DOCUMENTS

| | | |
|---|---|---|
| WO | 2017148345 A1 | 9/2017 |
| WO | 2018067823 A1 | 4/2018 |
| WO | 2018141416 A1 | 8/2018 |
| WO | 2018212110 A1 | 11/2018 |

OTHER PUBLICATIONS

Chen, H., et al., CE4: Affine Merge Enhancement (Test 2.10), Joint Video Experts Team (JVET) of ITU-T SG 16 WP 3 and ISO/IEC JTC 1/SC 29/WG 11, JVET-K0186-v3, 11th Meeting: Ljubljana, SI, Jul. 2018, pp. 1-6.
Galpin, F., et al., CE4.2.4 Affine Merge Mode, Joint Video Experts Team (JVET) of ITU-T SG 16 WP 3 and ISO/IEC JTC 1/SC 29/WG 11, JVET-L0156-r2, 12th Meeting: Macao, CN, Oct. 2018, pp. 1-5.
Wang, Y., et al., CE4.2.12 Affline Merge Mode, Joint Video Experts Team (JVET) of ITU-T SG 16 WP 3 and ISO/IEC JTC 1/SC 29/WG 11, JVET-K0355-v2, 11th Meeting: Ljubljana, SI, Jul. 2018, pp. 1-5.
Zhao, J., et al., CE4-related: History Based Affline Merge Candidate, Joint Video Experts Team (JVET) of ITU-T SG 16 WP 3 and ISO/IEC JTC 1/SC 29/WG 11, JVET-L0305, 12th Meeting: Macao, CN, Oct. 2018, pp. 1-5.
Office Action dated Dec. 15, 2021 in counterpart RU Patent Application No. 2021118253, 9 pages.
Office Action dated Jan. 13, 2022 in counterpart IN Patent Application No. 202117006856, 9 pages.
Chen J et al: "Algorithm description for Versatile Video Coding and Test Model 3 (VTM 3)", 124. MPEG Meeting; Oct. 8, 2018-Oct. 12, 2018; Macao; (Motion Picture Expert Group or ISO/IEC JTC1/SC29/WG11 ), No. m45226 Dec. 24, 2018 (Dec. 24, 2018), XP030215996, Retrieved from the Internet: URL:http://phenix.int-evry.fr/mpeg/doc_end_user/documents/124_Macao/wg11/m45226-JVET-L1002-v2-JVET-L1002-v2.zip JVET-L 1002-v2. docx [retrieved on Dec. 24, 2018].

* cited by examiner

| 0 | | 1 | |

| 0 | 1 | | 2 |

FIG. 9

```
coding_quadtree() {
    qt_split
    if(qt_split) {
        coding_quadtree(0)
        coding_quadtree(1)
        coding_quadtree(2)
        coding_quadtree(3)
    }
    else {
        multi_type_tree()
    }
}
```

```
multi_type_tree() {
    mtt_split
    if(mtt_split) {
        mtt_split_vertical
        mtt_split_binary
        if(mtt_split_binary) {
            multi_type_tree(0, mtt_split_vertical)
            multi_type_tree(1, mtt_split_vertical)
        } else {
            multi_type_tree(0, mtt_split_vertical)
            multi_type_tree(1, mtt_split_vertical)
            multi_type_tree(2, mtt_split_vertical)
        }
    } else {
        // end split
    }
}
```

FIG. 12

```
coding_unit() {
    pred_mode_flag
    if( MODE_INTRA ) {
        intra_pred_mode
    }
    else { // MODE_INTER
        merge_flag
        if( merge_flag ) {
            merge_affine_flag
            if(merge_affine_flag==0) {
                umve_flag
            }
        } else {
            inter_affine_flag
            if( inter_affine_flag ) {
                cu_affine_type_flag
            }
        }
    }
}
```

FIG. 13

| merge_flag | merge_affine_flag | inter_affine_flag | Selected Mode |
|---|---|---|---|
| 1 | 0 | N/A | Merge Mode |
| 1 | 1 | N/A | Affine Merge Mode |
| 0 | N/A | 0 | Inter Pred Mode |
| 0 | N/A | 1 | Inter Affine Mode |

FIG. 31A
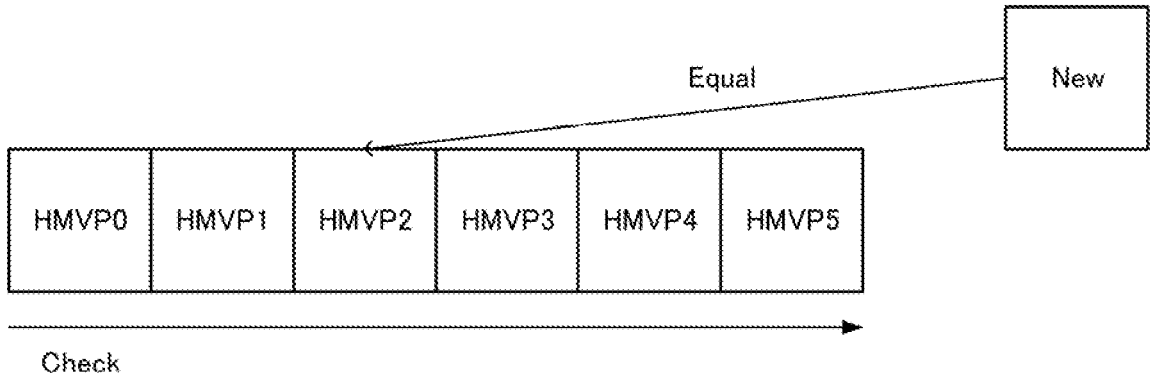
FIG. 31B
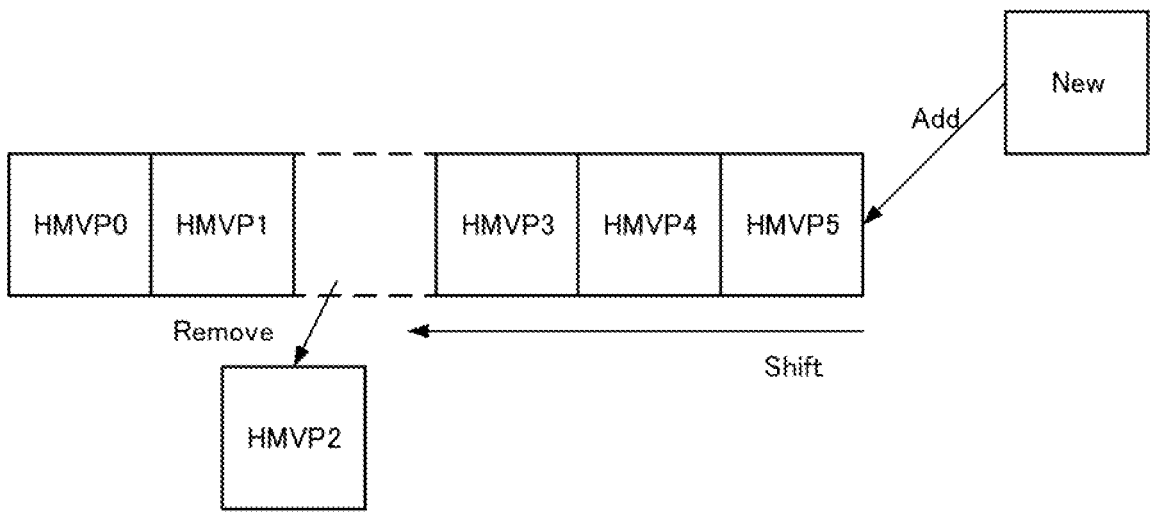
FIG. 31C
| HMVP0 | HMVP1 | HMVP3 ↓ HMVP2 | HMVP4 ↓ HMVP3 | HMVP5 ↓ HMVP4 | NEW ↓ HMVP5 |

FIG. 49
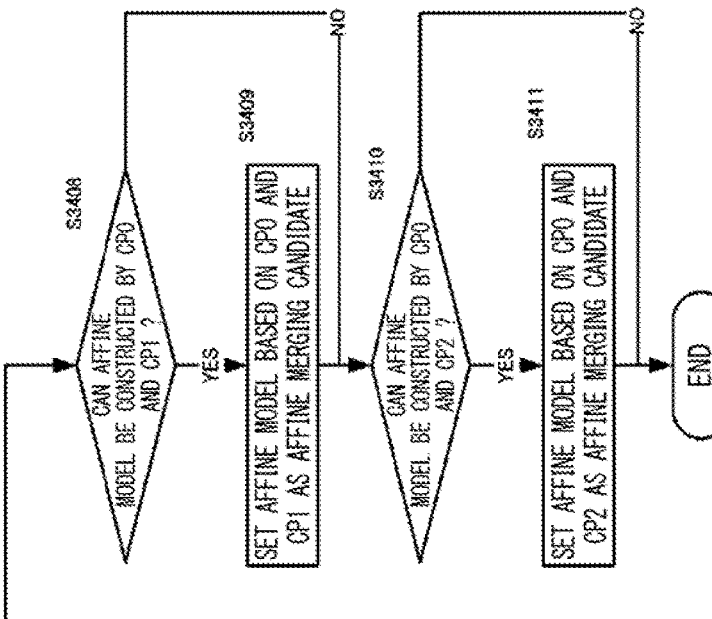
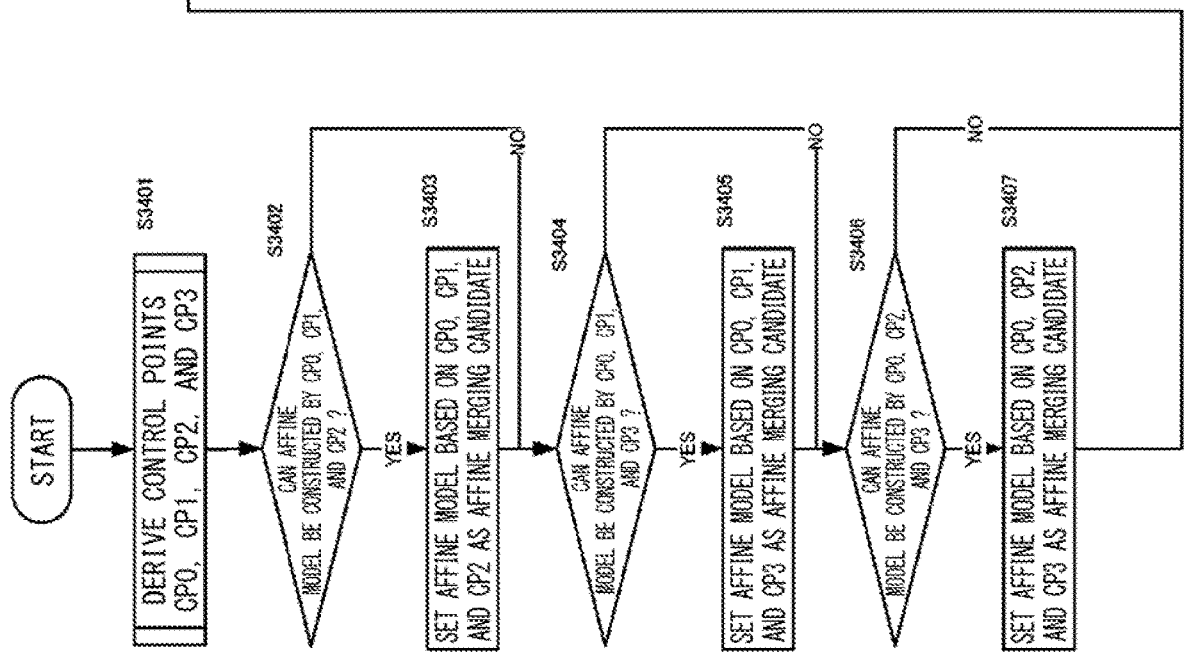

DEVICE FOR DERIVING AFFINE MERGE CANDIDATE

CROSS-REFERENCE TO RELATED APPLICATIONS

This application is a U.S. National Stage entry of PCT Application No: PCT/JP2019/050012 filed Dec. 20, 2019, which claims priority to Japanese Patent Application No. 2018-247409 filed Dec. 28, 2018, the contents of which are incorporated herein by reference.

FIELD OF THE INVENTION

The present invention relates to picture coding and decoding technology for dividing a picture into blocks and performing prediction.

DESCRIPTION OF RELATED ART

In picture coding and decoding, a target picture is divided into blocks, each of which is a set of a prescribed number of samples, and a process is performed in units of blocks. Coding efficiency is improved by dividing a picture into appropriate blocks and appropriately setting intra picture prediction (intra prediction) and inter picture prediction (inter prediction).

In moving-picture coding/decoding, coding efficiency is improved by inter prediction for performing prediction from a coded/decoded picture. Patent Document 1 describes technology for applying an affine transform at the time of inter prediction. It is not uncommon for an object to cause deformation such as enlargement/reduction and rotation in moving pictures and efficient coding is enabled by applying the technology of Patent Document 1.

PRIOR ART DOCUMENTS

Patent Documents

[Patent Document 1]
Japanese Unexamined Patent Application, First Publication No. H9-172644

SUMMARY OF THE INVENTION

However, because the technology of Patent Document 1 involves a picture transform, there is a problem that the processing load is great. In view of the above problem, the present invention provides efficient coding technology with a low load.

For example, embodiments to be described below may be associated with the following aspects.

According to a first aspect, there is provided a moving-picture coding device for performing an affine transform in units of coding blocks, the moving-picture coding device including: an affine inheritance merging candidate derivation unit configured to derive an affine inheritance merging candidate for inheriting an affine model of blocks neighboring a coding target block in a space domain; an affine construction merging candidate derivation unit configured to derive an affine construction merging candidate from a plurality of motion information elements of blocks neighboring the coding target block in a space or time domain; and an affine fixation merging candidate derivation unit configured to derive an affine fixation merging candidate in which motion information of an affine control point is fixed, wherein a motion vector of each affine control point is fixed to (0, 0) in the affine fixation merging candidate.

According to a second aspect, there is provided a moving-picture coding method of performing an affine transform in units of coding blocks, the moving-picture coding method including: an affine inheritance merging candidate derivation step of deriving an affine inheritance merging candidate for inheriting an affine model of blocks neighboring a coding target block in a space domain; an affine construction merging candidate derivation step of deriving an affine construction merging candidate from a plurality of motion information elements of blocks neighboring the coding target block in a space or time domain; and an affine fixation merging candidate derivation step of deriving an affine fixation merging candidate in which motion information of an affine control point is fixed, wherein a motion vector of each affine control point is fixed to (0, 0) in the affine fixation merging candidate.

According to a third aspect, there is provided a moving-picture coding program for performing an affine transform in units of coding blocks stored in a computer-readable non-transitory recording medium, the moving-picture coding program causing a computer to execute: an affine inheritance merging candidate derivation step of deriving an affine inheritance merging candidate for inheriting an affine model of blocks neighboring a coding target block in a space domain; an affine construction merging candidate derivation step of deriving an affine construction merging candidate from a plurality of motion information elements of blocks neighboring the coding target block in a space or time domain; and an affine fixation merging candidate derivation step of deriving an affine fixation merging candidate in which motion information of an affine control point is fixed, wherein a motion vector of each affine control point is fixed to (0, 0) in the affine fixation merging candidate.

According to a fourth aspect, there is provided a moving-picture decoding device for performing an affine transform in units of decoding blocks, the moving-picture decoding device including: an affine inheritance merging candidate derivation unit configured to derive an affine inheritance merging candidate for inheriting an affine model of blocks neighboring a decoding target block in a space domain; an affine construction merging candidate derivation unit configured to derive an affine construction merging candidate from a plurality of motion information elements of blocks neighboring the decoding target block in a space or time domain; and an affine fixation merging candidate derivation unit configured to derive an affine fixation merging candidate in which motion information of an affine control point is fixed, wherein a motion vector of each affine control point is fixed to (0, 0) in the affine fixation merging candidate.

According to a fifth aspect, there is provided a moving-picture decoding method of performing an affine transform in units of decoding blocks, the moving-picture decoding method including: an affine inheritance merging candidate derivation step of deriving an affine inheritance merging candidate for inheriting an affine model of blocks neighboring a decoding target block in a space domain; an affine construction merging candidate derivation step of deriving an affine construction merging candidate from a plurality of motion information elements of blocks neighboring the decoding target block in a space or time domain; and an affine fixation merging candidate derivation step of deriving an affine fixation merging candidate in which motion information of an affine control point is fixed, wherein a motion vector of each affine control point is fixed to (0, 0) in the affine fixation merging candidate.

According to a sixth aspect, there is provided a moving-picture decoding program for performing an affine transform in units of decoding blocks stored in a computer-readable non-transitory recording medium, the moving-picture decoding program causing a computer to execute: an affine inheritance merging candidate derivation step of deriving an affine inheritance merging candidate for inheriting an affine model of blocks neighboring a decoding target block in a space domain; an affine construction merging candidate derivation step of deriving an affine construction merging candidate from a plurality of motion information elements of blocks neighboring the decoding target block in a space or time domain; and an affine fixation merging candidate derivation step of deriving an affine fixation merging candidate in which motion information of an affine control point is fixed, wherein a motion vector of each affine control point is fixed to (0, 0) in the affine fixation merging candidate. Also, these descriptions are examples. The scope of the present application and the present invention is not limited or restricted to these descriptions. Also, it should be understood that the description of the "present invention" in the present specification does not limit the scope of the present invention or the present application, but is used as an example.

Advantageous Effects of Invention

According to the present invention, it is possible to implement a highly efficient picture coding/decoding process with a low load.

BRIEF DESCRIPTION OF THE DRAWINGS

FIG. 6B is a diagram showing a divided shape of a block.
FIG. 6C is a diagram showing a divided shape of a block.
FIG. 6D is a diagram showing a divided shape of a block.
FIG. 6E is a diagram showing a divided shape of a block.
FIG. 9 is syntax for expressing a shape of block split.
FIG. 12 is syntax for expressing a coding block prediction mode.
FIG. 13 is a diagram showing correspondence between a syntax element related to inter prediction and a mode.

FIG. 31A is an explanatory diagram showing an example of a history-based motion vector predictor candidate list update process.
FIG. 31B is an explanatory diagram showing an example of a history-based motion vector predictor candidate list update process.
FIG. 31C is an explanatory diagram showing an example of a history-based motion vector predictor candidate list update process.

FIG. 49 is a flowchart for describing affine construction merging candidate derivation.

DETAILED DESCRIPTION OF THE INVENTION

Technology and technical terms used in the embodiment will be defined.

<Tree Block>

Figure 4:
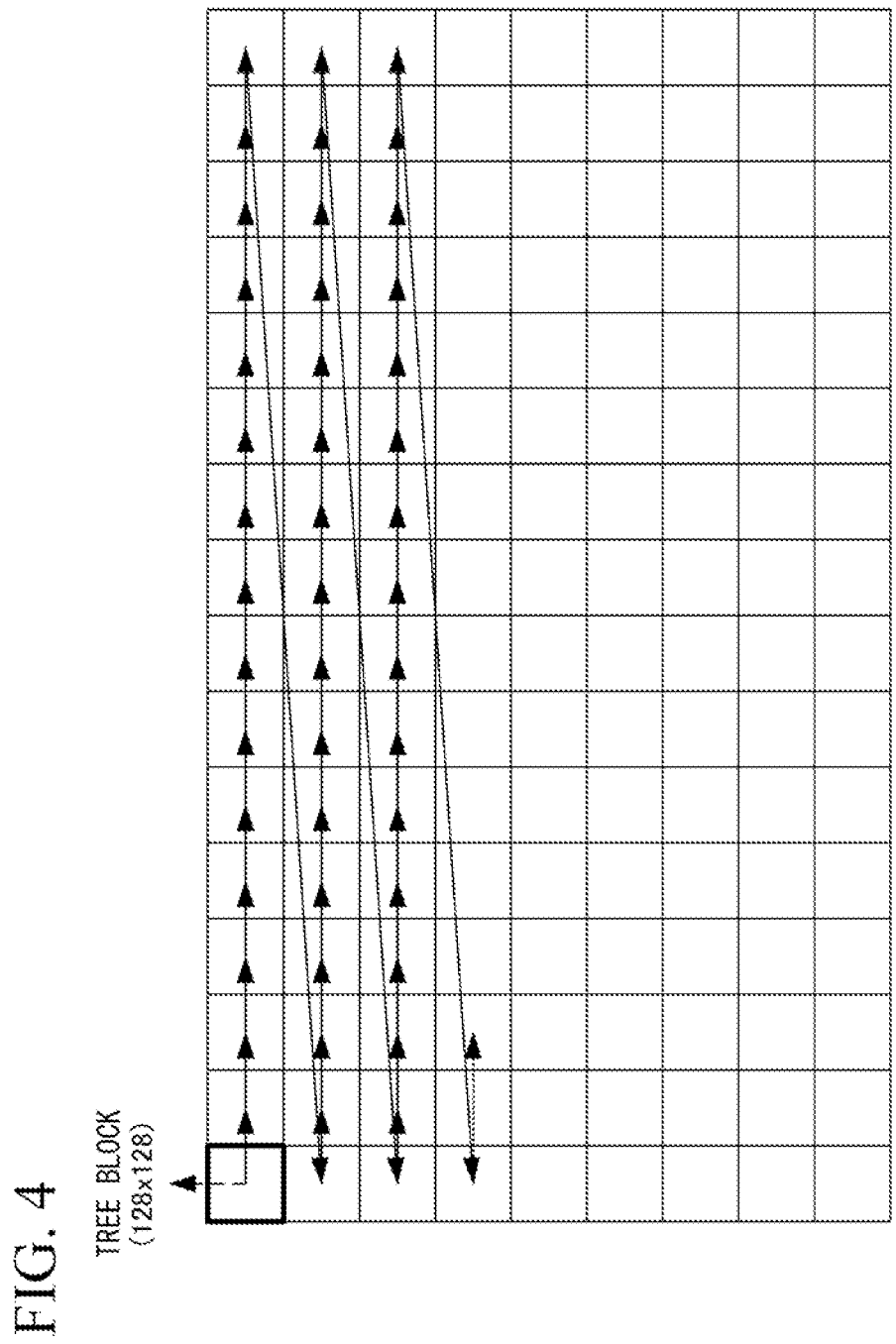
FIG. 4 is a diagram showing a state in which an input picture is divided into tree blocks.

In the embodiment, a coding/decoding target picture is equally divided into units of a predetermined size. This unit is defined as a tree block. Although the size of the tree block is 128×128 samples in FIG. 4, the size of the tree block is not limited thereto and any size may be set. The tree block of a target (corresponding to a coding target in a coding process or a decoding target in the decoding process) is switched in a raster scan order, i.e., from left to right and from top to bottom. The inside of each tree block can be further recursively divided. A block which is a coding/decoding target after the tree block is recursively divided is defined as a coding block. Also, a tree block and a coding block are collectively defined as blocks. Efficient coding is enabled by performing appropriate block split. The tree block size may be a fixed value predetermined by the coding device and the decoding device or the tree block size determined by the coding device may be configured to be transmitted to the decoding device. Here, a maximum size of the tree block is 128×128 samples and a minimum size of the tree block is 16×16 samples. Also, a maximum size of the coding block is 64×64 samples and a minimum size of the coding block is 4×4 samples.

<Prediction Mode>

Switching is performed between intra prediction (MODE_INTRA) in which prediction is performed from a processed picture signal of the target picture and inter prediction (MODE_INTER) in which prediction is performed from a picture signal of a processed picture in units of target coding blocks.

The processed picture is used for a picture, a picture signal, a tree block, a block, a coding block, and the like obtained by decoding a signal completely coded in the coding process and is used for a picture, a picture signal, a tree block, a block, a coding block, and the like obtained by completing decoding in a decoding process.

The mode in which the intra prediction (MODE_INTRA) and the inter prediction (MODE_INTER) are identified is defined as the prediction mode (PredMode). The prediction mode (PredMode) has intra prediction (MODE_INTRA) or inter prediction (MODE_INTER) as a value.

<Inter Prediction>

In inter prediction in which prediction is performed from a picture signal of a processed picture, a plurality of processed pictures can be used as reference pictures. In order to manage a plurality of reference pictures, two types of reference lists of L0 (reference list 0) and L1 (reference list 1) are defined and a reference picture is identified using each reference index. In a P slice, L0-prediction (Pred_L0) can be used. In a B slice, L0-prediction (Pred_L0), L1-prediction (Pred_L1), and bi-prediction (Pred_BI) can be used. The L0-prediction (Pred_L0) is inter prediction that refers to a reference picture managed in L0 and the L1-prediction (Pred_L1) is inter prediction that refers to a reference picture managed in L1. The bi-prediction (Pred_BI) is inter prediction in which both the L0-prediction and the L1-prediction are performed and one reference picture managed in each of L1 and L1 is referred to. Information for identifying the L0-prediction, the L1-prediction, and the bi-prediction is defined as an inter prediction mode. In the subsequent processing, constants and variables with the subscript LX in the output are assumed to be processed for each of L0 and L1.

<Motion Vector Predictor Mode>

The motion vector predictor mode is a mode for transmitting an index for identifying a motion vector predictor, a motion vector difference, an inter prediction mode, and a reference index and determining inter prediction information of a target block. The motion vector predictor is derived from a motion vector predictor candidate derived from a processed block neighboring the target block or a block located at the same position as or in the vicinity of (near) the target block among blocks belonging to the processed picture and an index for identifying a motion vector predictor.

<Merge Mode>

The merge mode is a mode in which inter prediction information of a target block is derived from inter prediction information of a processed block neighboring a target block or a block located at the same position as or in the vicinity of (near) the target block among blocks belonging to the processed picture without transmitting a motion vector difference and a reference index.

The processed block neighboring the target block and the inter prediction information of the processed block are defined as spatial merging candidates. The block located at the same position as or in the vicinity of (near) the target block among the blocks belonging to the processed picture and inter prediction information derived from the inter prediction information of the block are defined as temporal merging candidates. Each merging candidate is registered in a merging candidate list, and a merging candidate used for prediction of a target block is identified by a merge index.

<Neighboring Block>

Figure 11:
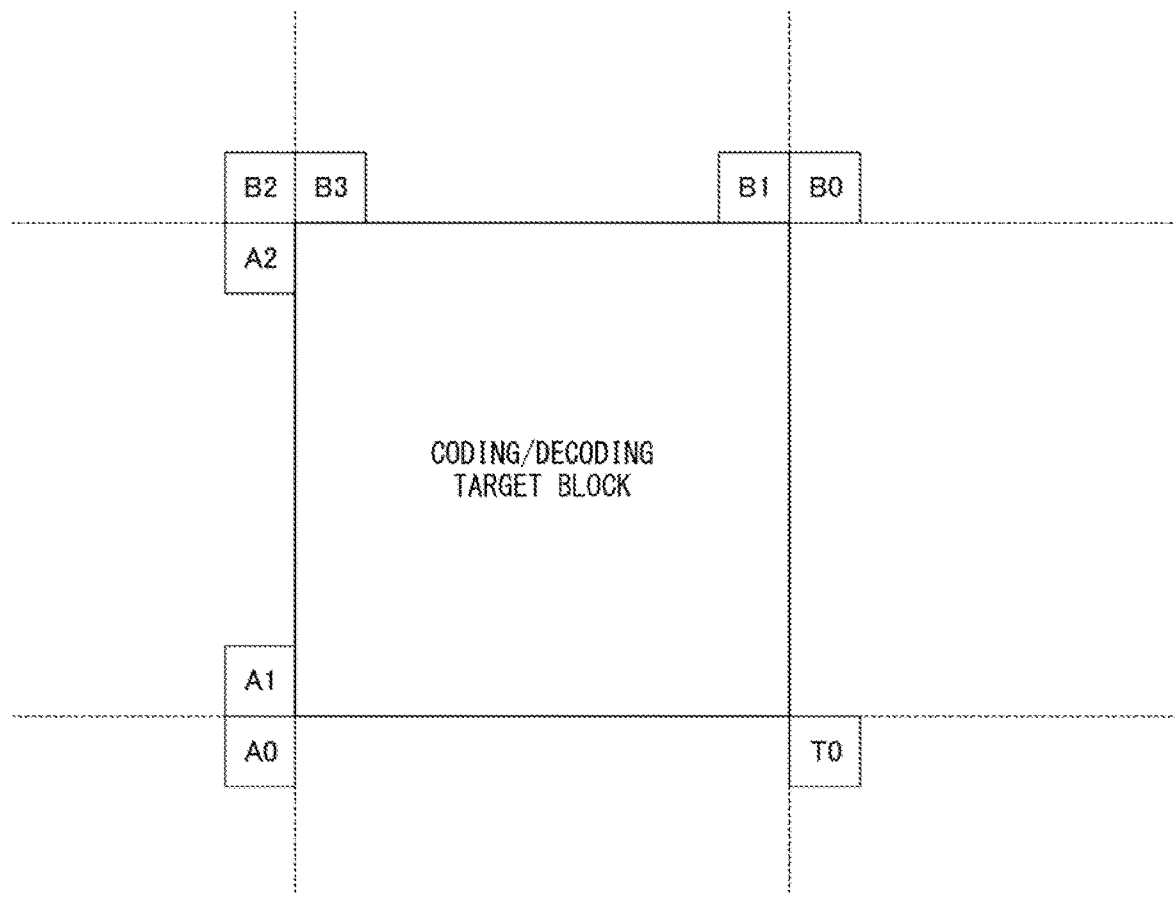
FIG. 11 is an explanatory diagram showing a reference block of inter prediction.

FIG. 11 is an explanatory diagram showing a reference block that is referred to in deriving inter prediction information in the motion vector predictor mode and the merge mode. A0, A1, A2, B0, B1, B2, and B3 are processed blocks neighboring the target block. T0 is a block located at the same position as or in the vicinity of (near) the target block in the target picture among blocks belonging to the processed picture.

A1 and A2 are blocks located on the left side of the target coding block and neighboring the target coding block. B1 and B3 are blocks located on the upper side of the target coding block and neighboring the target coding block. A0, B0, and B2 are blocks located at the lower left, upper right, and upper left of the target coding block, respectively.

Details of how to handle neighboring blocks in the motion vector predictor mode and the merge mode will be described below.

<Affine Motion Compensation>

The affine motion compensation is a process of performing motion compensation by dividing a coding block into subblocks of a predetermined unit and individually determining a motion vector for each of the subblocks into which the coding block is divided. The motion vector of each subblock is derived on the basis of one or more control points derived from inter prediction information of a processed block neighboring the target block or a block located at the same position as or in the vicinity of (near) the target block among blocks belonging to the processed picture. Although the size of the subblock is 4×4 samples in the present embodiment, the size of the subblock is not limited thereto and a motion vector may be derived in units of samples.

Figure 14:
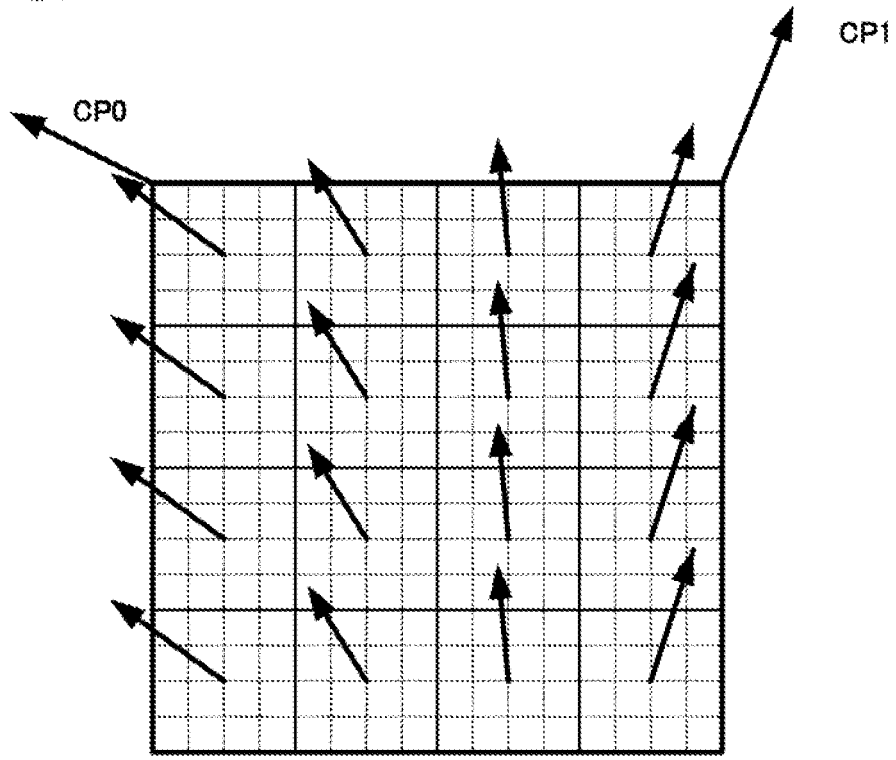
FIG. 14 is an explanatory diagram showing affine motion compensation of two control points.

An example of affine motion compensation in the case of two control points is shown in FIG. 14. In this case, the two control points have two parameters of a horizontal direction component and a vertical direction component. Thus, an affine transform in the case of two control points is referred to as a four-parameter affine transform. CP1 and CP2 of FIG. 14 are control points.

Figure 15:
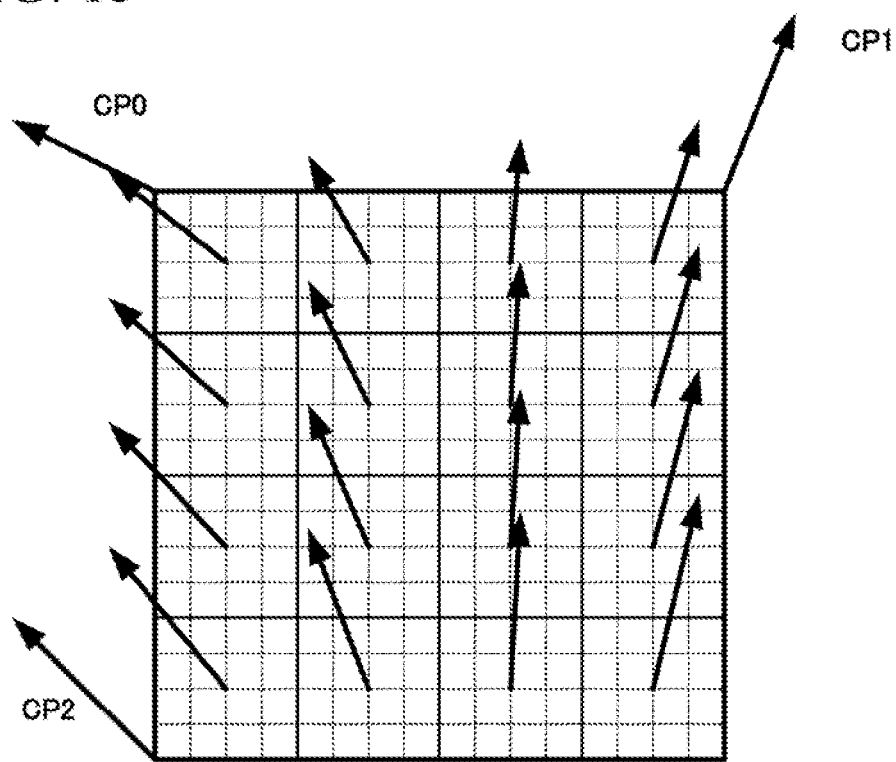
FIG. 15 is an explanatory diagram showing affine motion compensation of three control points.

An example of affine motion compensation in the case of three control points is shown in FIG. 15. In this case, the three control points have two parameters of a horizontal direction component and a vertical direction component. Thus, an affine transform in the case of three control points is referred to as a six-parameter affine transform. CP1, CP2, and CP3 of FIG. 15 are control points.

Affine motion compensation can be used in both the motion vector predictor mode and the merge mode. A mode in which the affine motion compensation is applied in the motion vector predictor mode is defined as a subblock-based motion vector predictor mode, and a mode in which the affine motion compensation is applied in the merge mode is defined as a subblock-based merge mode.

<Inter Prediction Syntax>

The syntax related to inter prediction will be described using FIGS. 12 and 13.

The flag merge_flag in FIG. 12 indicates whether the target coding block is set to the merge mode or the motion vector predictor mode. The flag merge_affine_flag indicates whether or not the subblock-based merge mode is applied to the target coding block of the merge mode. The flag inter_affine_flag indicates whether or not to apply the subblock-based motion vector predictor mode to the target coding block of the motion vector predictor mode. The flag cu_affine_type_flag is used to determine the number of control points in the subblock-based motion vector predictor mode.

FIG. 13 shows a value of each syntax element and a prediction method corresponding thereto. The normal merge mode corresponds to merge_flag=1 and merge_affine_flag=0 and is not a subblock-based merge mode. The subblock-based merge mode corresponds to merge_flag=1 and merge_affine_flag=1. The normal motion vector predictor mode corresponds to merge_flag=0 and inter_affine_flag=0. The normal motion vector predictor mode is a motion vector predictor merge mode that is not a subblock-based motion vector predictor mode. The subblock-based motion vector predictor mode corresponds to merge_flag=0 and inter_affine_flag=1. When merge_flag=0 and inter_affine_flag=1, cu_affine_type_flag is further transmitted to determine the number of control points.

<POC>

A picture order count (POC) is a variable associated with a picture to be coded and is set to a value that is incremented by 1 according to an output order of pictures. According to the POC value, it is possible to discriminate whether pictures are the same, to discriminate an anteroposterior relationship between pictures in the output order, or to derive the distance between pictures. For example, if the POCs of two pictures have the same value, it can be determined that they are the same picture. When the POCs of two pictures have different values, it can be determined that the picture with the smaller POC value is the picture to be output first. A difference between the POCs of the two pictures indicates an inter-picture distance in a time axis direction.

First Embodiment

The picture coding device 100 and the picture decoding device 200 according to the first embodiment of the present invention will be described.

Figure 1:
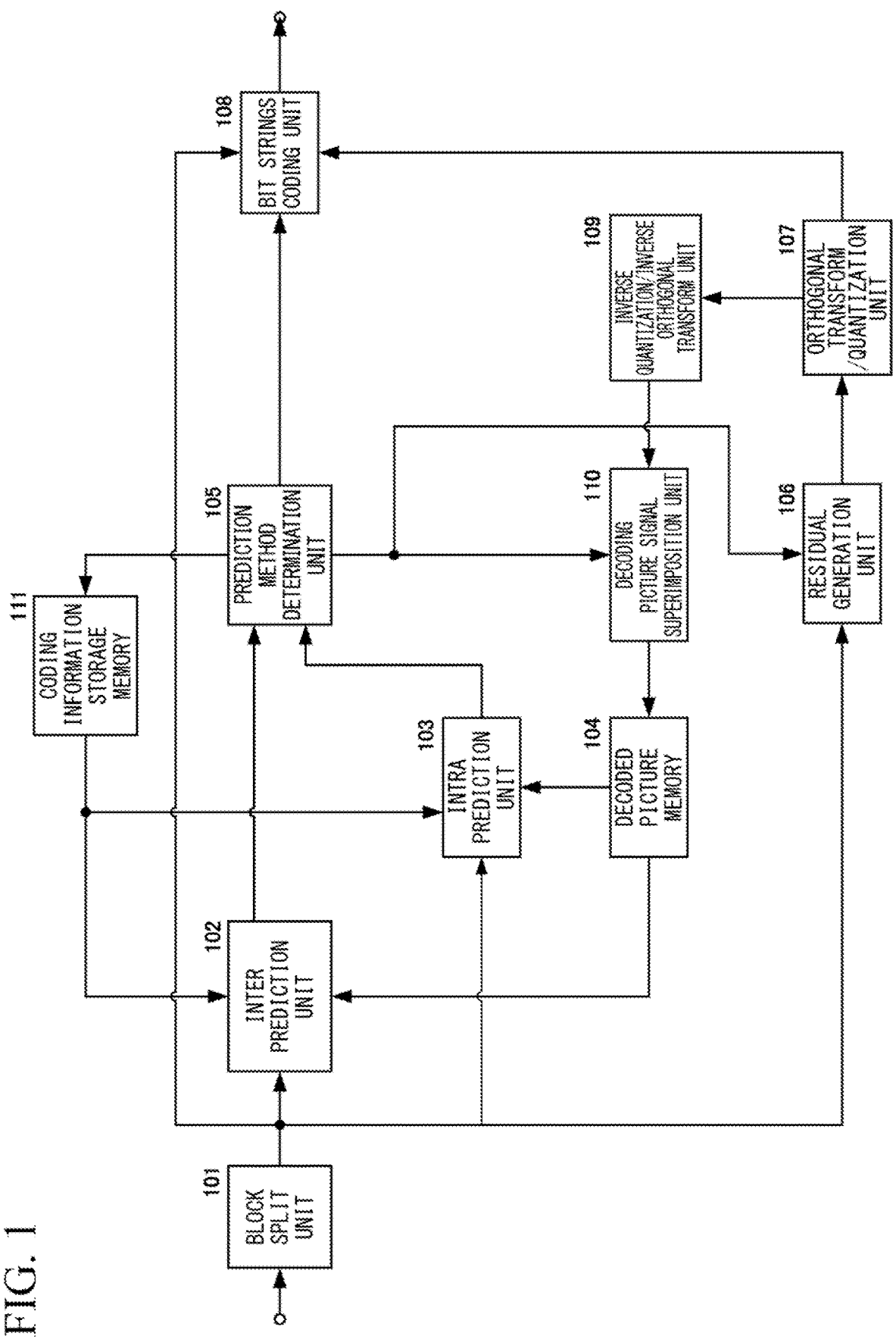
FIG. 1 is a block diagram of a picture coding device according to an embodiment of the present invention.

FIG. 1 is a block diagram of a picture coding device 100 according to the first embodiment. The picture coding device 100 according to the embodiment includes a block split unit 101, an inter prediction unit 102, an intra prediction unit 103, a decoded picture memory 104, a prediction method determination unit 105, a residual generation unit 106, an orthogonal transform/quantization unit 107, a bit strings coding unit 108, an inverse quantization/inverse orthogonal transform unit 109, a decoding picture signal superimposition unit 110, and a coding information storage memory 111.

The block split unit 101 recursively divides the input picture to generate a coding block. The block split unit 101 includes a quad split unit that divides a split target block in the horizontal direction and the vertical direction and a binary-ternary split unit that divides the split target block in either the horizontal direction or the vertical direction. The block split unit 101 sets the generated coding block as a target coding block and supplies a picture signal of the target coding block to the inter prediction unit 102, the intra prediction unit 103, and the residual generation unit 106. Also, the block split unit 101 supplies information indicating a determined recursive split structure to the bit strings coding unit 108. The detailed operation of the block split unit 101 will be described below.

The inter prediction unit 102 performs inter prediction of the target coding block. The inter prediction unit 102 derives a plurality of inter prediction information candidates from the inter prediction information stored in the coding information storage memory 111 and the decoded picture signal stored in the decoded picture memory 104, selects a suitable inter prediction mode from the plurality of derived candidates, and supplies the selected inter prediction mode and a predicted picture signal according to the selected inter prediction mode to the prediction method determination unit 105. A detailed configuration and operation of the inter prediction unit 102 will be described below.

The intra prediction unit 103 performs intra prediction of the target coding block. The intra prediction unit 103 refers to a decoded picture signal stored in the decoded picture memory 104 as a reference sample and generates a predicted picture signal according to intra prediction based on coding information such as an intra prediction mode stored in the coding information storage memory 111. In the intra prediction, the intra prediction unit 103 selects a suitable intra prediction mode from among a plurality of intra prediction modes and supplies a selected intra prediction mode and a predicted picture signal according to the selected intra prediction mode to the prediction method determination unit 105.

Figure 10A:
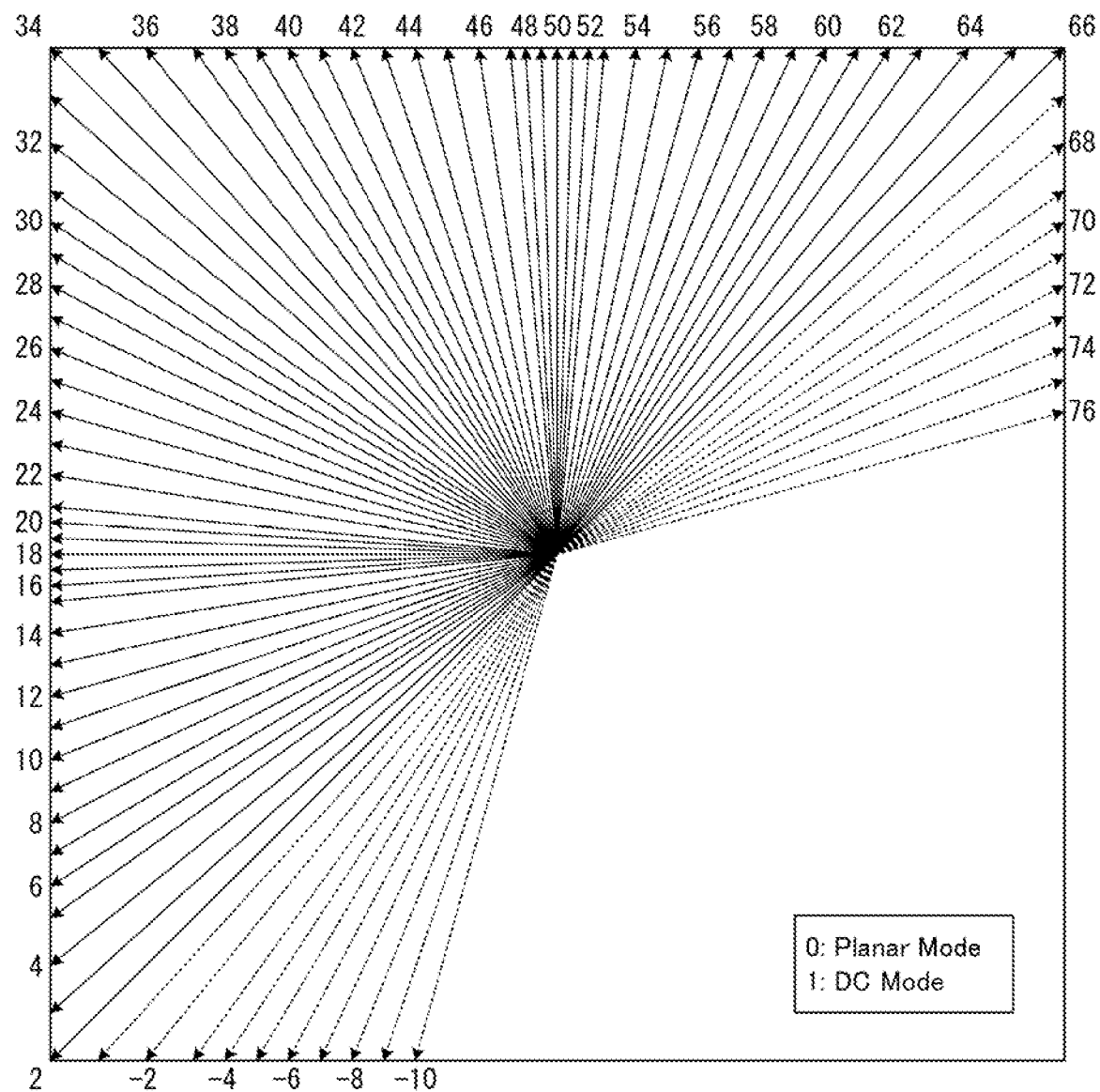
FIG. 10A is an explanatory diagram showing intra prediction.
Figure 10B:
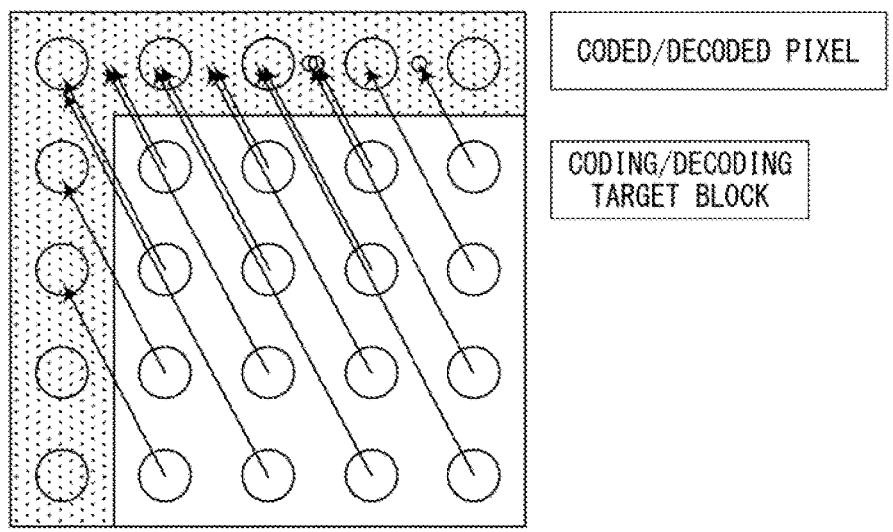
FIG. 10B is an explanatory diagram showing intra prediction.

Examples of intra prediction are shown in FIGS. 10A and 10B. FIG. 10A shows the correspondence between a prediction direction of intra prediction and an intra prediction mode number. For example, in intra prediction mode 50, an intra prediction picture is generated by copying reference samples in the vertical direction. Intra prediction mode 1 is a DC mode and is a mode in which all sample values of the target block are an average value of reference samples. Intra prediction mode 0 is a planar mode and is a mode for creating a two-dimensional intra prediction picture from reference samples in the vertical and horizontal directions. FIG. 10B is an example in which an intra prediction picture is generated in the case of intra prediction mode 40. The intra prediction unit 103 copies the value of the reference sample in the direction indicated by the intra prediction mode with respect to each sample of the target block. When the reference sample of the intra prediction mode is not at an integer position, the intra prediction unit 103 determines a reference sample value according to an interpolation from reference sample values of neighboring integer positions.

The decoded picture memory 104 stores a decoded picture generated by the decoding picture signal superimposition unit 110. The decoded picture memory 104 supplies the stored decoded picture to the inter prediction unit 102 and the intra prediction unit 103.

The prediction method determination unit 105 determines the optimum prediction mode by evaluating each of intra prediction and inter prediction using coding information, a residual code amount, an amount of distortion between a predicted picture signal and a target picture signal, and the like. In the case of intra prediction, the prediction method determination unit 105 supplies intra prediction information such as an intra prediction mode as the coding information to the bit strings coding unit 108. In the case of the inter prediction merge mode, the prediction method determination unit 105 supplies inter prediction information such as a merge index and information indicating whether or not the mode is a subblock-based merge mode (a subblock-based merge flag) as the coding information to the bit strings coding unit 108. In the case of the motion vector predictor mode of inter prediction, the prediction method determination unit 105 supplies inter prediction information such as the inter prediction mode, a motion vector predictor index, reference indices of L0 and L1, a motion vector difference, and information indicating whether or not the mode is a subblock-based motion vector predictor mode (a subblock-based motion vector predictor flag) as the coding information to the bit strings coding unit 108. Further, the prediction method determination unit 105 supplies the determined coding information to the coding information storage memory 111. The prediction method determination unit 105 supplies a predicted picture signal to the residual generation unit 106 and the decoding picture signal superimposition unit 110.

The residual generation unit 106 generates a residual by subtracting the predicted picture signal from the target picture signal and supplies the residual to the orthogonal transform/quantization unit 107.

The orthogonal transform/quantization unit 107 performs an orthogonal transform and quantization on the residual in accordance with the quantization parameter to generate an orthogonally transformed/quantized residual and supplies the generated residual to the bit strings coding unit 108 and the inverse quantization/inverse orthogonal transform unit 109.

The bit strings coding unit 108 codes coding information according to the prediction method determined by the prediction method determination unit 105 for each coding block in addition to information of units of sequences, pictures, slices, and coding blocks. Specifically, the bit strings coding unit 108 codes the prediction mode PredMode for each coding block. When the prediction mode is inter prediction (MODE_INTER), the bit strings coding unit 108 codes coding information (inter prediction information) such as a flag for discriminating whether or not the mode is a merge mode, a subblock-based merge flag, a merge index when the mode is the merge mode, an inter prediction mode when the mode is not the merge mode, a motion vector predictor index, information about a motion vector difference, and a subblock-based motion vector predictor flag in accordance with specified syntax (a bit strings syntax rule) and generates first bit strings. When the prediction mode is intra prediction (MODE_INTRA), coding information (intra prediction information) such as the intra prediction mode is coded in accordance with specified syntax (a bit strings syntax rule) and first bit strings is generated. Also, the bit strings coding unit 108 entropy-codes the orthogonally transformed and quantized residual in accordance with specified syntax to generate second bit strings. The bit strings coding unit 108 multiplexes the first bit strings and the second bit strings in accordance with specified syntax and outputs a bitstream.

The inverse quantization/inverse orthogonal transform unit 109 calculates the residual by performing inverse quantization and an inverse orthogonal transform on the orthogonally transformed/quantized residual supplied from the orthogonal transform/quantization unit 107 and supplies the calculated residual to the decoding picture signal superimposition unit 110.

The decoding picture signal superimposition unit 110 superimposes the predicted picture signal according to the determination of the prediction method determination unit 105 and the residual inversely quantized and inversely orthogonally transformed by the inverse quantization/inverse orthogonal transform unit 109 to generate a decoded picture and stores the decoded picture in the decoded picture memory 104. Also, the decoding picture signal superimposition unit 110 may store the decoded picture in the decoded picture memory 104 after performing a filtering process of reducing distortion such as block distortion due to coding on the decoded picture.

The coding information storage memory 111 stores coding information such as a prediction mode (inter prediction or intra prediction) determined by the prediction method determination unit 105. In the case of the inter prediction, the coding information stored in the coding information storage memory 111 includes inter prediction information such as a determined motion vector, reference indices of reference lists L0 and L1, and a history-based motion vector predictor candidate list. Also, in the case of the inter prediction merge mode, the coding information stored in the coding information storage memory 111 includes inter prediction information such as a merge index and information indicating whether or not the mode is the subblock-based merge mode (a subblock-based merge flag) in addition to the above-described information. Also, in the case of the motion vector predictor mode of the inter prediction, the coding information stored in the coding information storage memory 111 includes inter prediction information such as an inter prediction mode, a motion vector predictor index, a motion vector difference, and information indicating whether or not the mode is the subblock-based motion vector predictor mode (a subblock-based motion vector predictor flag) in addition to the above-described information. In the case of the intra prediction, the coding information stored in the coding information storage memory 111 includes intra prediction information such as the determined intra prediction mode.

Figure 2:
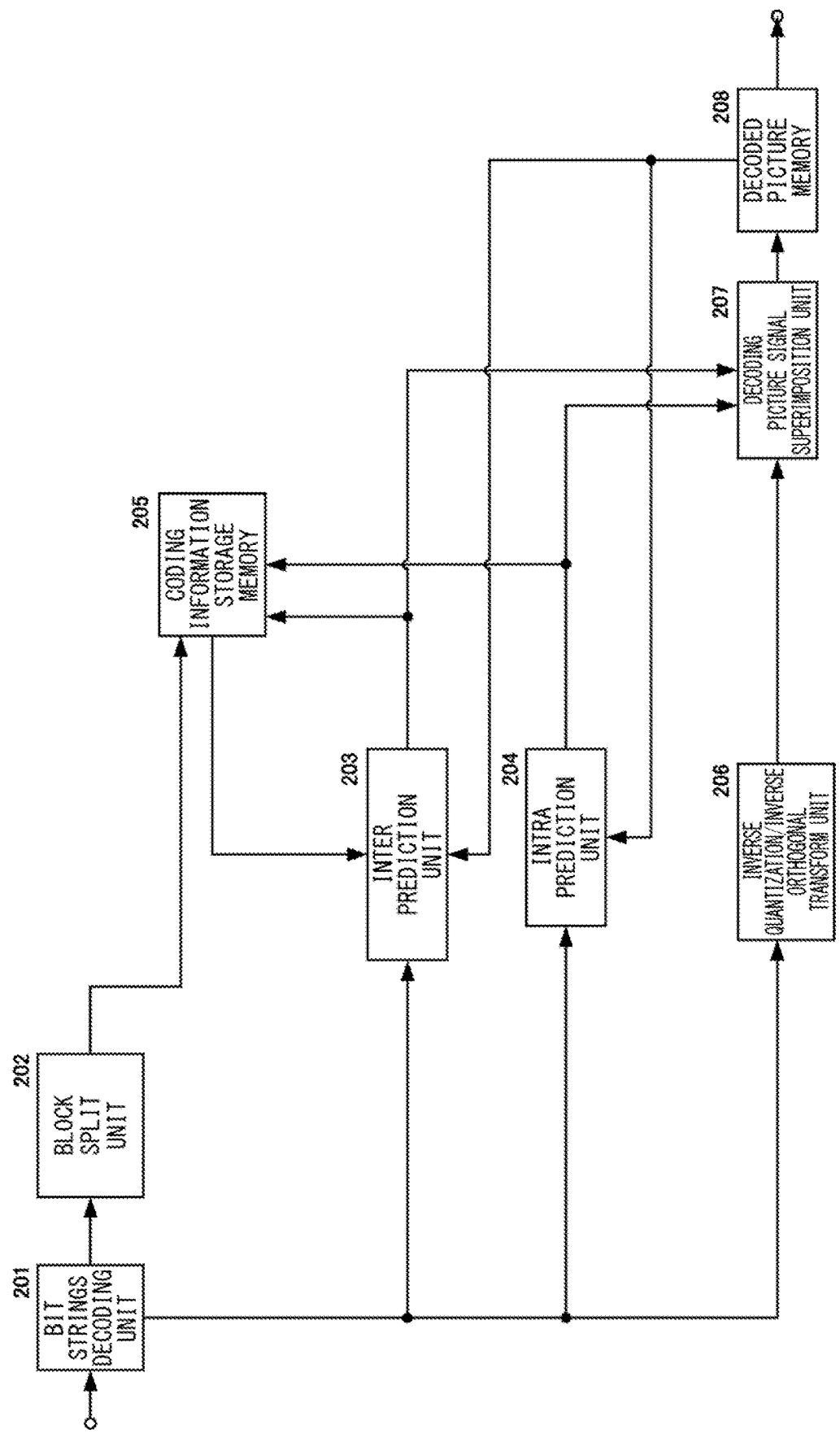
FIG. 2 is a block diagram of a picture decoding device according to an embodiment of the present invention.

FIG. 2 is a block diagram showing a configuration of the picture decoding device according to the embodiment of the present invention corresponding to the picture coding device of FIG. 1. The picture decoding device according to the embodiment includes a bit strings decoding unit 201, a block split unit 202, an inter prediction unit 203, an intra prediction unit 204, a coding information storage memory 205, an inverse quantization/inverse orthogonal transform unit 206, a decoding picture signal superimposition unit 207, and a decoded picture memory 208.

Because a decoding process of the picture decoding device of FIG. 2 corresponds to a decoding process provided in the picture coding device of FIG. 1, the components of the coding information storage memory 205, the inverse quantization/inverse orthogonal transform unit 206, the decoding picture signal superimposition unit 207, and the decoded picture memory 208 of FIG. 2 have functions corresponding to the components of the coding information storage memory 111, the inverse quantization/inverse orthogonal transform unit 109, the decoding picture signal superimposition unit 110, and the decoded picture memory 104 of the picture coding device of FIG. 1.

A bitstream supplied to the bit strings decoding unit 201 is separated in accordance with a specified syntax rule. The bit strings decoding unit 201 decodes a separated first bit string, and obtains information of units of sequences, pictures, slices, coding blocks and coding information of units of coding blocks. Specifically, the bit strings decoding unit 201 decodes a prediction mode PredMode for discriminating inter prediction (MODE_INTER) or intra prediction (MODE_INTRA) in units of coding blocks. When the prediction mode is inter prediction (MODE_INTER), the bit strings decoding unit 201 decodes coding information (inter prediction information) about a flag for discriminating whether or not the mode is a merge mode, a merge index when the mode is the merge mode, a subblock-based merge flag, an inter prediction mode when the mode is a motion vector predictor mode, a motion vector predictor index, a motion vector difference, a subblock-based motion vector predictor flag, and the like in accordance with specified syntax and supplies the coding information (the inter prediction information) to the coding information storage memory 205 via the inter prediction unit 203 and the block split unit 202. When the prediction mode is intra prediction (MODE_INTRA), coding information (intra prediction information) such as the intra prediction mode is decoded in accordance with specified syntax and the coding information (the intra prediction information) is supplied to the coding information storage memory 205 via the inter prediction unit 203 or the intra prediction unit 204 and the block split unit 202. The bit strings decoding unit 201 decodes separated second bit strings to calculate an orthogonally transformed/quantized residual and supplies the orthogonally transformed/quantized residual to the inverse quantization/inverse orthogonal transform unit 206.

When the prediction mode PredMode of the target coding block is the motion vector predictor mode in the inter prediction (MODE_INTER), the inter prediction unit 203 derives a plurality of motion vector predictor candidates using coding information of the previously decoded picture signal stored in the coding information storage memory 205 and registers the plurality of derived motion vector predictor candidates in the motion vector predictor candidate list to be described below. The inter prediction unit 203 selects a motion vector predictor according to the motion vector predictor index decoded and supplied by the bit strings decoding unit 201 from among the plurality of motion vector predictor candidates registered in the motion vector predictor candidate list, calculates a motion vector from the motion vector difference decoded by the bit strings decoding unit 201 and the selected motion vector predictor, and stores the calculated motion vector in the coding information storage memory 205 together with other coding information. The coding information of the coding block supplied/stored here is a prediction mode PredMode, flags predFlagL0[xP][yP] and predFagL1[xP][yP] indicating whether or not to use L0-prediction and L1-prediction, reference indices refIdxL0 [xP][yP] and refIdxL1[xP][yP] of L0 and L1, motion vectors mvL0[xP][yP] and mvL1[xP][yP] of L0 and L1, and the like. Here, xP and yP are indices indicating a position of an upper left sample of the coding block within the picture. When the prediction mode PredMode is inter prediction (MODE_INTER) and the inter prediction mode is L0-prediction (Pred_L0), the flag predFlagL0 indicating whether or not to use L0-prediction is 1, and the flag predFlagL1 indicating whether or not to use L1-prediction is 0. When the inter prediction mode is L1-prediction (Pred_L1), the flag predFlagL0 indicating whether or not to use L0-prediction is 0 and the flag predFlagL1 indicating whether or not to use L1-prediction is 1. When the inter prediction mode is bi-prediction (Pred_BI), both the flag predFlagL0 indicating whether or not to use L0-prediction and the flag predFlagL1 indicating whether or not to use L1-prediction are 1. Further, merging candidates are derived in the merge mode in which the prediction mode PredMode of the coding block of the target is inter prediction (MODE_INTER). A plurality of merging candidates are derived using the coding information of the previously decoded coding blocks stored in the coding information storage memory 205 and are registered in a merging candidate list to be described below, a merging candidate corresponding to a merge index to be decoded and supplied by the bit strings decoding unit 201 is selected from among the plurality of merging candidates registered in the merging candidate list, and inter prediction information such as the flags predFlagL0[xP][yP] and predFlagL1[xP][yP] indicating whether or not to use L0-prediction and L1-prediction of the selected merging candidate, the reference indices refIdxL0[xP][yP] and refIdxL1[xP][yP] of L0 and L1, and the motion vectors mvL0[xP][yP] and mvL1[xP] [yP] of L0 and L1 is stored in the coding information storage memory 205. Here, xP and yP are indices indicating the position of the upper left sample of the coding block in the picture. A detailed configuration and operation of the inter prediction unit 203 will be described below.

The intra prediction unit 204 performs intra prediction when the prediction mode PredMode of the coding block of the target is intra prediction (MODE_INTRA). The coding information decoded by the bit strings decoding unit 201 includes an intra prediction mode. The intra prediction unit 204 generates a predicted picture signal according to intra prediction from the decoded picture signal stored in the decoded picture memory 208 in accordance with the intra prediction mode included in the coding information decoded by the bit strings decoding unit 201 and supplies the generated predicted picture signal to the decoding picture signal superimposition unit 207. Because the intra prediction unit 204 corresponds to the intra prediction unit 103 of the picture coding device 100, a process similar to that of the intra prediction unit 103 is performed.

The inverse quantization/inverse orthogonal transform unit 206 performs an inverse orthogonal transform and inverse quantization on the orthogonally transformed/quantized residual decoded by the bit strings decoding unit 201 and obtains the inversely orthogonally transformed/inversely quantized residual.

The decoding picture signal superimposition unit 207 decodes a decoding picture signal by superimposing a predicted picture signal inter-predicted by the inter prediction unit 203 or a predicted picture signal intra-predicted by the intra prediction unit 204 and the residual inversely orthogonally transformed/inversely quantized by the inverse quantization/inverse orthogonal transform unit 206 and stores the decoded decoding picture signal in the decoded picture memory 208. At the time of storage in the decoded picture memory 208, the decoding picture signal superimposition unit 207 may store a decoded picture in the decoded picture memory 208 after a filtering process of reducing block distortion or the like due to coding is performed on the decoded picture.

Figure 3:
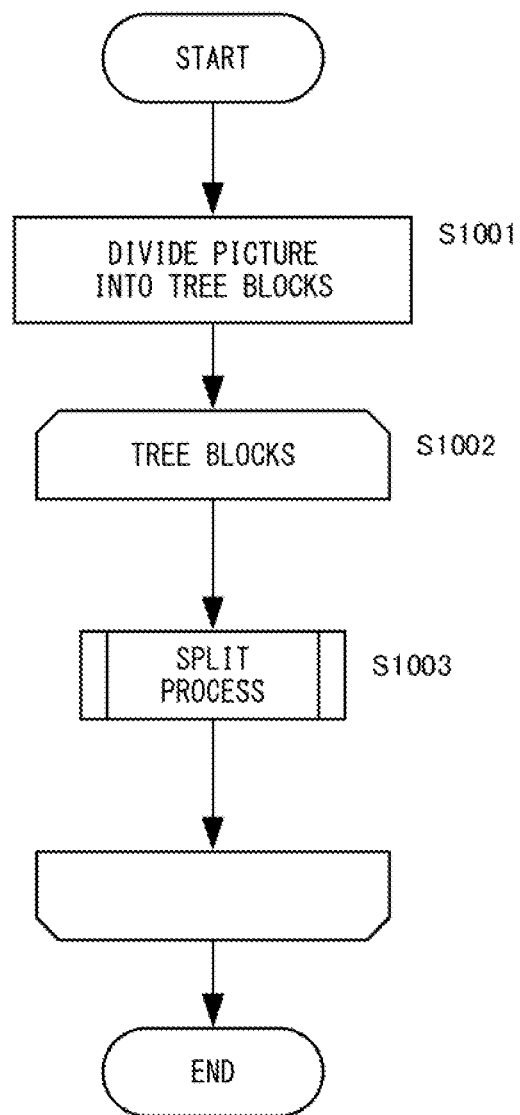
FIG. 3 is an explanatory flowchart showing an operation of dividing a tree block.

Next, an operation of the block split unit 101 in the picture coding device 100 will be described. FIG. 3 is a flowchart showing an operation of dividing a picture into tree blocks and further dividing each tree block. First, an input picture is divided into tree blocks having a predetermined size (step S1001). Each tree block is scanned in a predetermined order, i.e., raster scan order (step S1002), and the inside of the tree block of a target is divided (step S1003).

Figure 7:
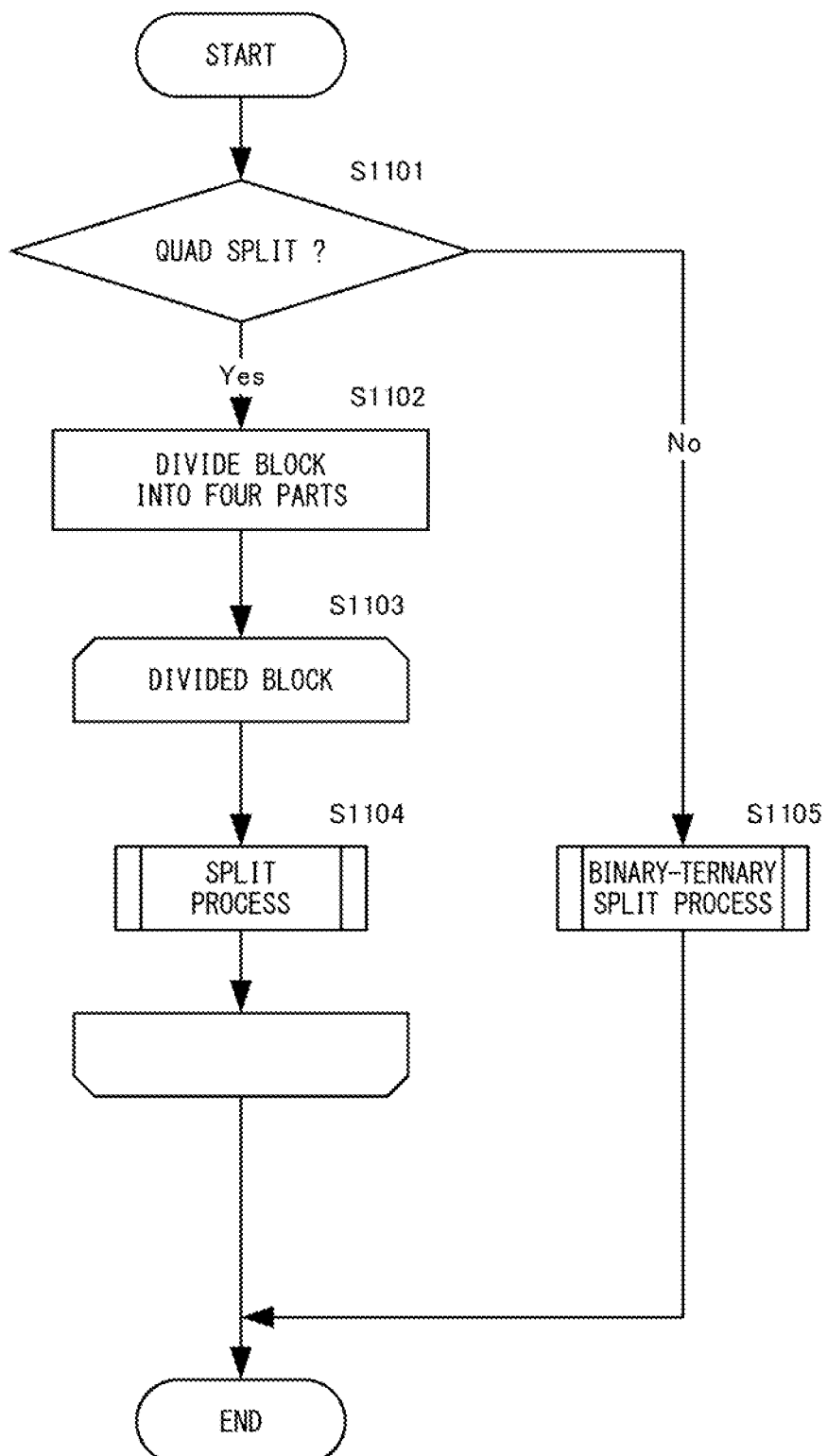
FIG. 7 is an explanatory flowchart showing an operation of dividing a block into four parts.

FIG. 7 is a flowchart showing a detailed operation of a split process of step S1003. First, it is determined whether or not a target block will be divided into four parts (step S1101).

Figure 5:
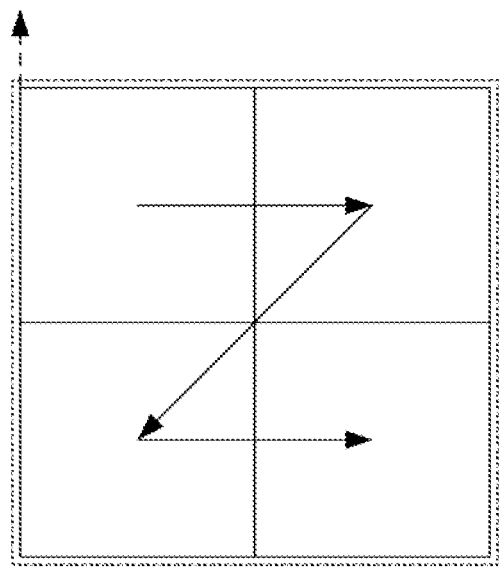
FIG. 5 is an explanatory diagram showing Z-scan.
Figure 6A:
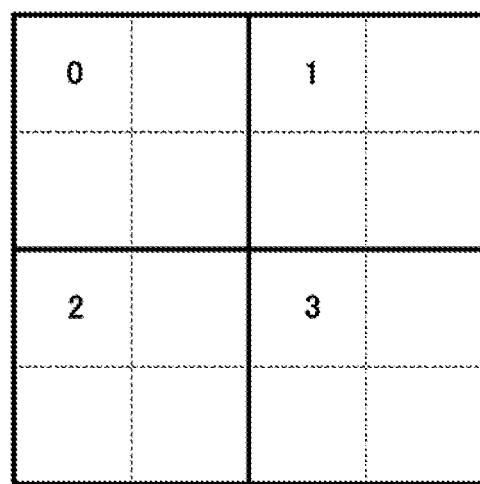
FIG. 6A is a diagram showing a divided shape of a block.

When it is determined that the target block will be divided into four parts, the target block is divided into four parts (step S1102). Each block obtained by dividing the target block is scanned in a Z-scan order, i.e., in the order of upper left, upper right, lower left, and lower right (step S1103). FIG. 5 shows an example of the Z-scan order, and reference numeral 601 of FIG. 6A shows an example in which the target block is divided into four parts. Numbers 0 to 3 of reference numeral 601 of FIG. 6A indicate the order of processing. Then, the split process of FIG. 7 is recursively executed for each block from the division in step S1101 (step S1104).

When it is determined that the target block will not be divided into four parts, a binary-ternary split is performed (step S1105).

Figure 8:
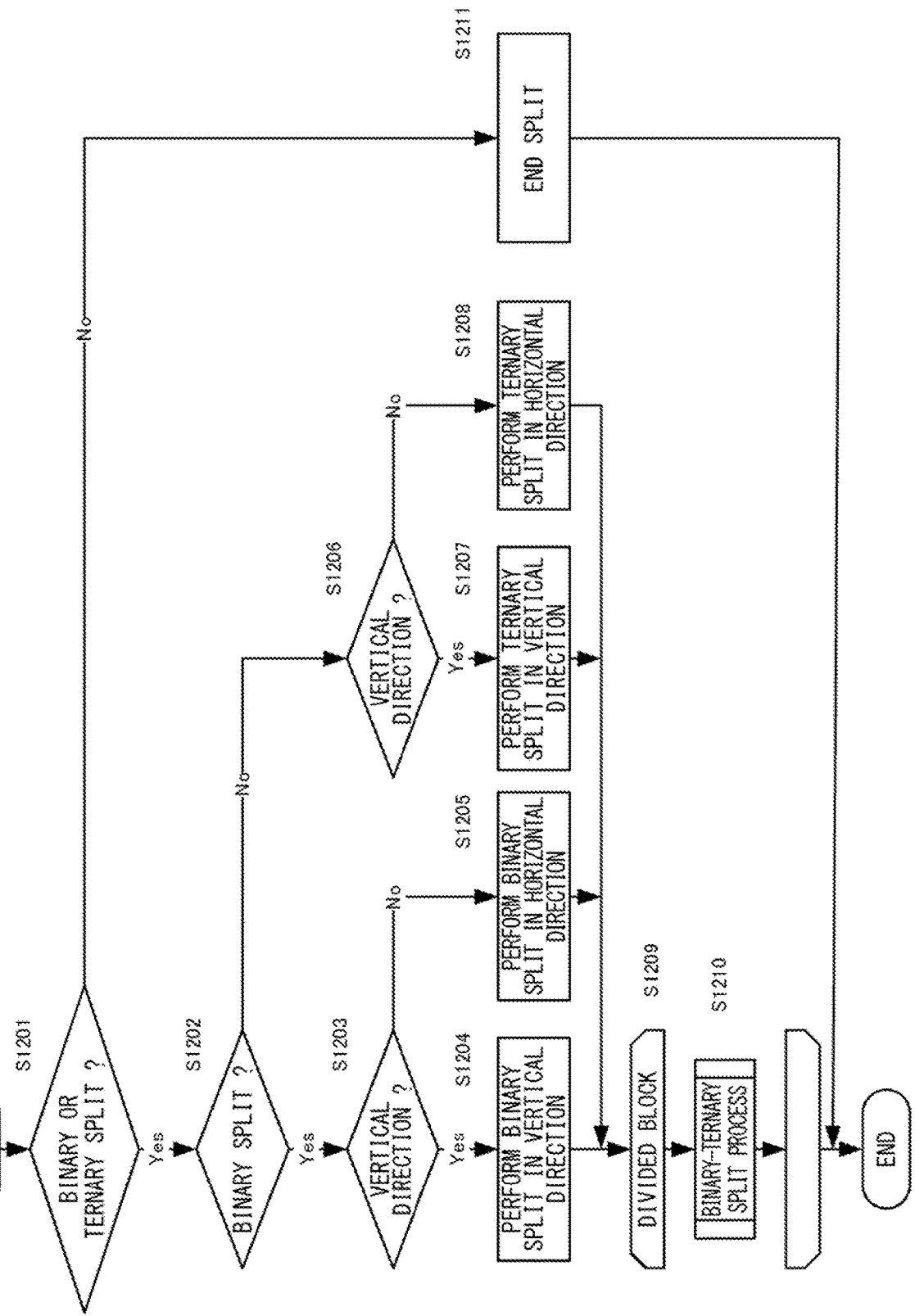
FIG. 8 is an explanatory flowchart showing an operation of dividing a block into two or three parts.

FIG. 8 is a flowchart showing the detailed operation of a binary-ternary split process of step S1105. First, it is determined whether or not a target block will be divided into two or three parts, i.e., whether or not either a binary or ternary split will be performed (step S1201).

When it is not determined that the target block will be divided into two or three parts, i.e., when it is determined that the target block will not be divided, the split ends (step S1211). That is, a recursive split process is not further performed on blocks divided according to the recursive split process.

When it is determined that the target block will be divided into two or three parts, it is further determined whether or not the target block will be divided into two parts (step S1202).

Figures 6B, 6C:
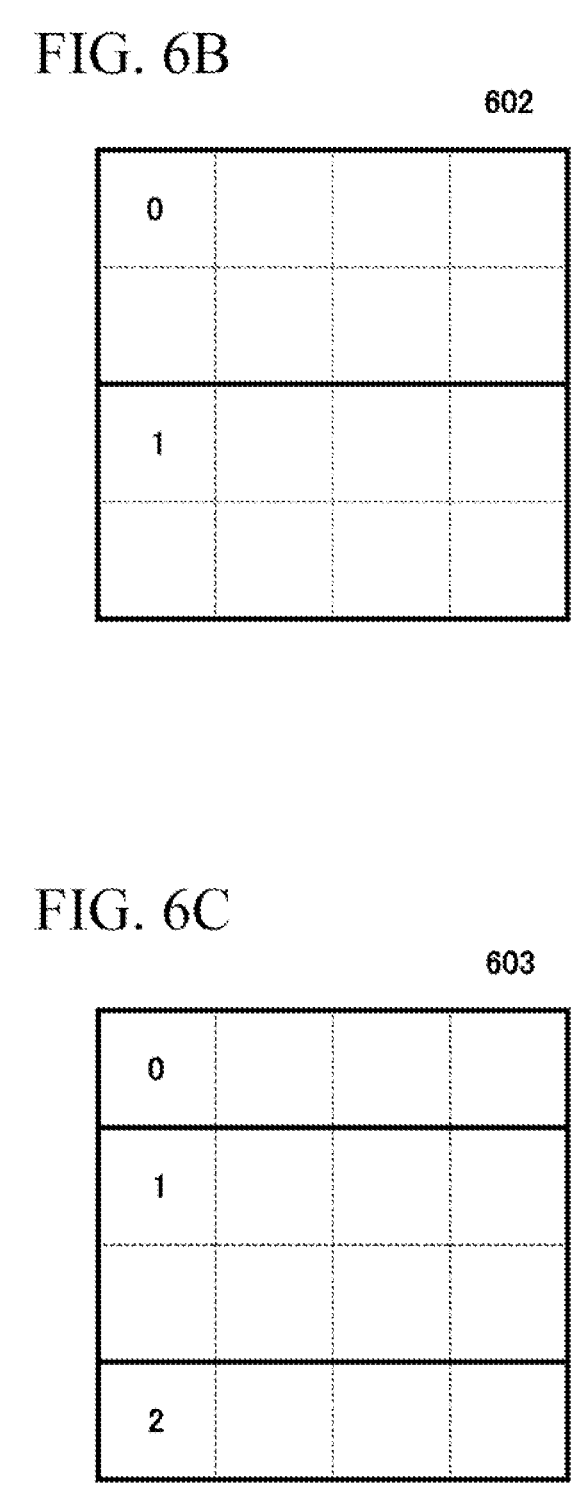
Figures 6D, 6E:
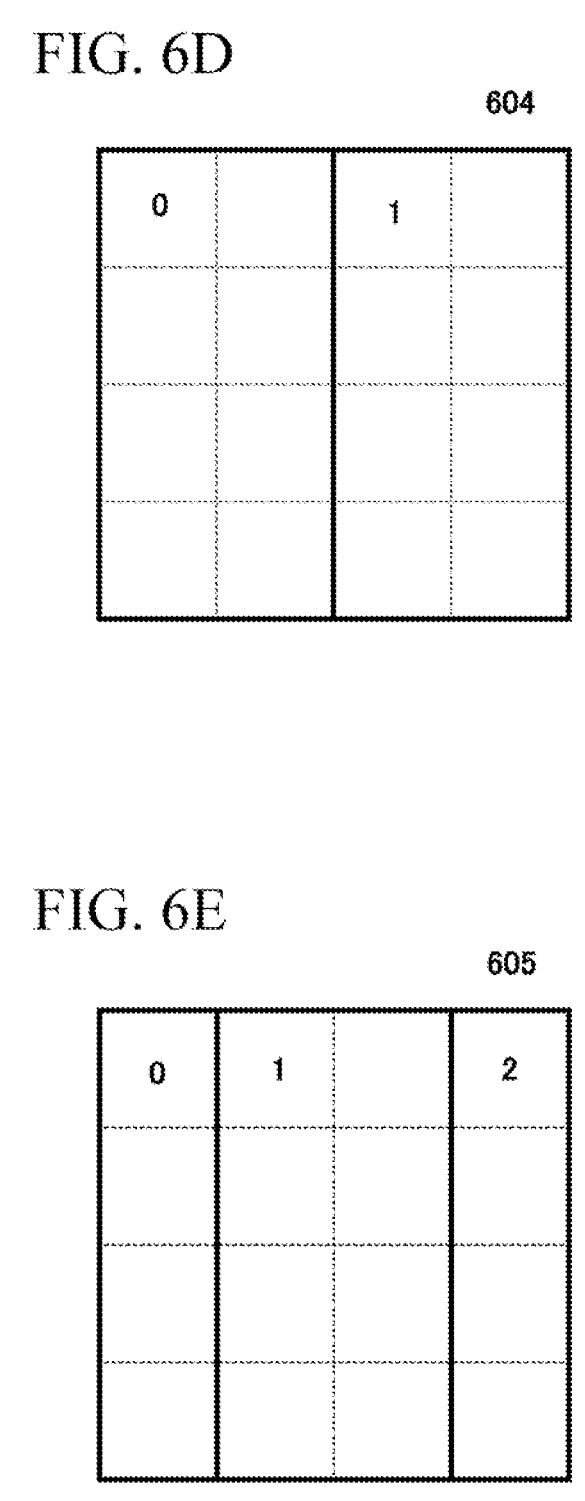

When it is determined that the target block will be divided into two parts, it is determined whether or not the target block will be divided into upper and lower parts (in a vertical direction) (step S1203). On the basis of a determination result, the target block is divided into two parts that are upper and lower parts (in the vertical direction) (step S1204) or the target block is divided into two parts that are left and right parts (in a horizontal direction) (step S1205). As a result of step S1204, the target block is divided into two parts that are upper and lower parts (in the vertical direction) as indicated by reference numeral 602 in FIG. 6B. As a result of step S1205, the target block is divided into two parts that are left and right parts (in the horizontal direction) as indicated by reference numeral 604 of FIG. 6D.

When it is not determined that the target block will be divided into two parts, i.e., when it is determined that the target block will be divided into three parts, in step S1202, it is determined whether or not the target block will be divided into upper, middle, and lower parts (in the vertical direction) (step S1206). On the basis of a determination result, the target block is divided into three parts that are upper, middle and lower parts (in the vertical direction) (step S1207) or the target block is divided into three parts that are left, middle, and right parts (in the horizontal direction) (step S1208). As a result of step S1207, the target block is divided into three parts that are upper, middle, and lower parts (in the vertical direction) as indicated by reference numeral 603 of FIG. 6C. As a result of step S1208, the target block is divided into three parts that are left, middle, and right parts (in the horizontal direction) as indicated by reference numeral 605 of FIG. 6E.

After any one of steps S1204, S1205, S1207, and S1208 is executed, each of blocks into which the target block is divided is scanned in order from left to right and from top to bottom (step S1209). Numbers 0 to 2 of reference numerals 602 to 605 of FIGS. 6B to 6E indicate the order of processing. For each of the blocks into which the target block is divided, a binary-ternary split process of FIG. 8 is recursively executed (step S1210).

The recursive block split described here may limit the necessity of a split according to the number of splits or a size of the target block or the like. Information that limits the necessity of a split may be implemented by a configuration in which information is not delivered by making an agreement between the coding device and the decoding device in advance or implemented by a configuration in which the coding device determines information that limits the necessity of a split, records the information in a bit string, and delivers the information to the decoding device.

When a certain block is divided, a block before the split is referred to as a parent block and each block after the split is referred to as a child block.

Next, an operation of the block split unit 202 in the picture decoding device 200 will be described. The block split unit 202 divides the tree block according to a processing procedure similar to that of the block split unit 101 of the picture coding device 100. However, there is a difference in that the block split unit 101 of the picture coding device 100 applies an optimization technique such as estimation of an optimum shape based on picture recognition or distortion rate optimization to determine an optimum block split shape, whereas the block split unit 202 of the picture decoding device 200 determines a block split shape by decoding the block split information recorded in the bit string.

Syntax (a bit strings syntax rule) related to a block split according to the first embodiment is shown in FIG. 9. coding_quadtree( ) represents syntax related to a quad split process on the block. multi_type_tree( ) represents syntax related to a binary or ternary split process on a block. qt_split is a flag indicating whether or not a block is divided into four parts. qt_split=1 when the block is divided into four parts and qt_split=0 when the block is not divided into four parts. When the block is divided into four parts (qt_split=1), a quad split process is recursively performed on blocks, each of which has been divided into four parts (coding_quadtree (0), coding_quadtree(1), coding_quadtree(2), coding_quadtree(3), and arguments 0 to 3 correspond to numbers indicated by reference numeral 601 of FIG. 6A). When the block is not divided into four parts (qtsplit=0), the subsequent split is determined according to multi_type_tree ( ). mtt_split is a flag indicating whether or not a split is further performed. When a split is further performed (mtt_split=1), mtt_split_vertical which is a flag indicating whether the block is divided vertically or horizontally and mtt_split_binary which is a flag for determining whether a binary or ternary split is performed are transmitted. mtt_split_vertical=1 indicates a split in the vertical direction and mtt_split_vertical=0 indicates a split in the horizontal direction. mtt_split_binary=1 indicates a binary split and mtt_split_binary=0 indicates a ternary split. In the binary split (mtt_split_binary=1), a split process is recursively performed on blocks, each of which is divided into two parts (multi_type_tree(0), multi_type_tree(1), and arguments 0 to 1 correspond to numbers indicated by reference numeral 602 or 604 in FIGS. 6B to 6D). In the case of the ternary split (mtt_split_binary=0), a split process is recursively performed on blocks, each of which is divided into three parts (multi_type_tree(0), multi_type_tree(1), multi_type_tree(2), and arguments 0 to 2 correspond to numbers indicated by reference numeral 603 of FIG. 6B or numbers indicated by reference numeral 605 of FIG. 6E). Until mtt_split=0 is reached, a hierarchical block split is performed by recursively calling multi_type_tree.

<Inter Prediction>

An inter prediction method according to the embodiment is performed in the inter prediction unit 102 of the picture coding device of FIG. 1 and the inter prediction unit 203 of the picture decoding device of FIG. 2.

The inter prediction method according to the embodiment will be described with reference to the drawings. The inter prediction method is performed in both coding and decoding processes in units of coding blocks.

<Description of Inter Prediction Unit 102 of Coding Side>

Figure 16:
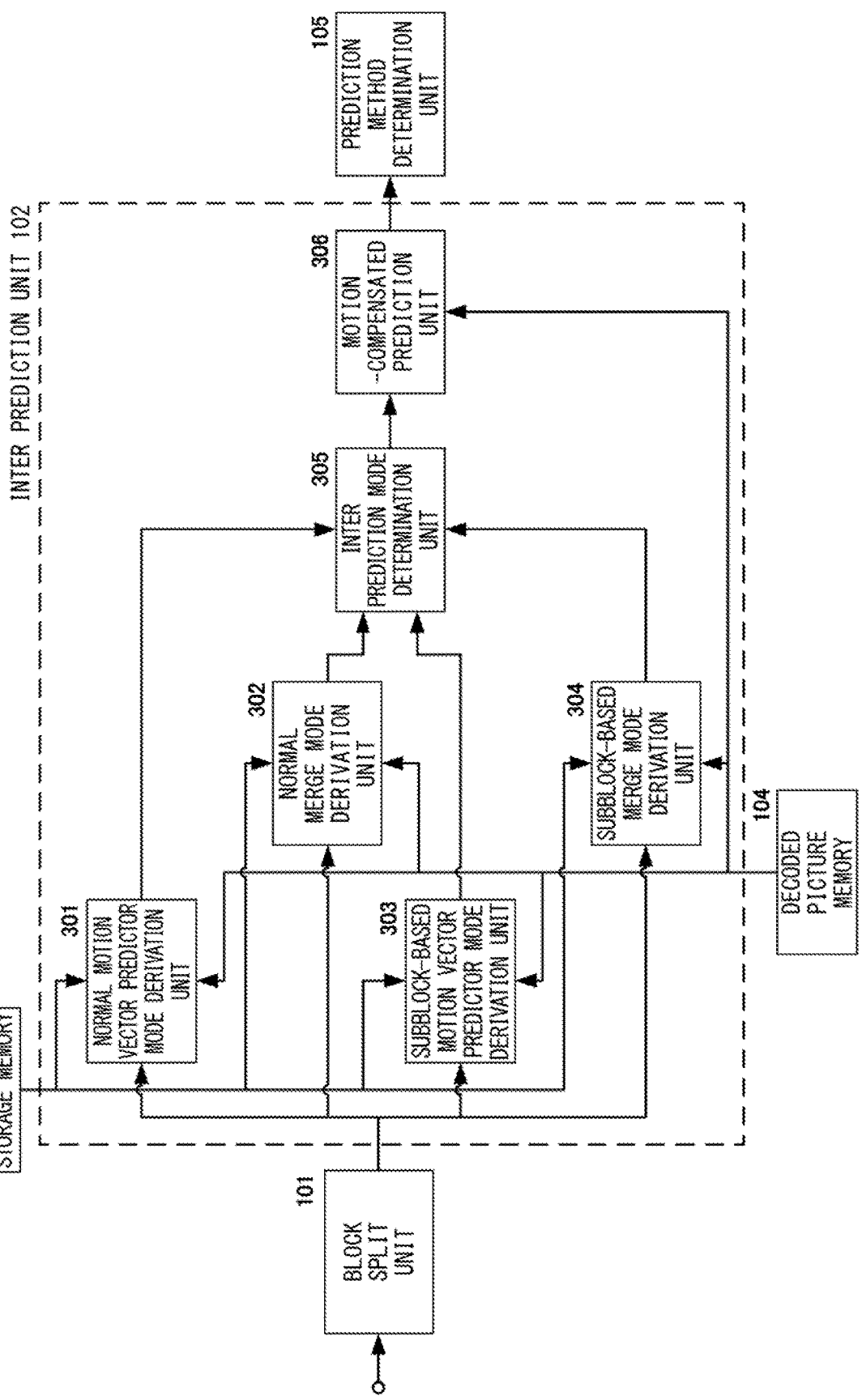
FIG. 16 is a block diagram of a detailed configuration of an inter prediction unit 102 of FIG. 1.

FIG. 16 is a diagram showing a detailed configuration of the inter prediction unit 102 of the picture coding device in FIG. 1. The normal motion vector predictor mode derivation unit 301 derives a plurality of normal motion vector predictor candidates to select a motion vector predictor, and calculates a motion vector difference between the selected motion vector predictor and a detected motion vector. A detected inter prediction mode, reference index, and motion vector and the calculated motion vector difference become inter prediction information of the normal motion vector predictor mode. This inter prediction information is supplied to the inter prediction mode determination unit 305. A detailed configuration and a process of the normal motion vector predictor mode derivation unit 301 will be described below.

The normal merge mode derivation unit 302 derives a plurality of normal merging candidates to select a normal merging candidate and obtains inter prediction information of the normal merge mode. This inter prediction information is supplied to the inter prediction mode determination unit 305. A detailed configuration and a process of the normal merge mode derivation unit 302 will be described below.

A subblock-based motion vector predictor mode derivation unit 303 derives a plurality of subblock-based motion vector predictor candidates to select a subblock-based motion vector predictor and calculates a motion vector difference between the selected subblock-based motion vector predictor and the detected motion vector. A detected inter prediction mode, reference index, and motion vector and the calculated motion vector difference become the inter prediction information of the subblock-based motion vector predictor mode. This inter prediction information is supplied to the inter prediction mode determination unit 305.

The subblock-based merge mode derivation unit 304 derives a plurality of subblock-based merging candidates to select a subblock-based merging candidate, and obtains inter prediction information of the subblock-based merge mode.

This inter prediction information is supplied to the inter prediction mode determination unit 305.

The inter prediction mode determination unit 305 determines inter prediction information on the basis of the inter prediction information supplied from the normal motion vector predictor mode derivation unit 301, the normal merge mode derivation unit 302, the subblock-based motion vector predictor mode derivation unit 303, and the subblock-based merge mode derivation unit 304. Inter prediction information according to the determination result is supplied from the inter prediction mode determination unit 305 to the motion-compensated prediction unit 306.

The motion-compensated prediction unit 306 performs inter prediction on the reference picture signal stored in the decoded picture memory 104 on the basis of the determined inter prediction information. A detailed configuration and a process of the motion-compensated prediction unit 306 will be described below.

<Description of Inter Prediction Unit 203 of Decoding Side>

Figure 22:
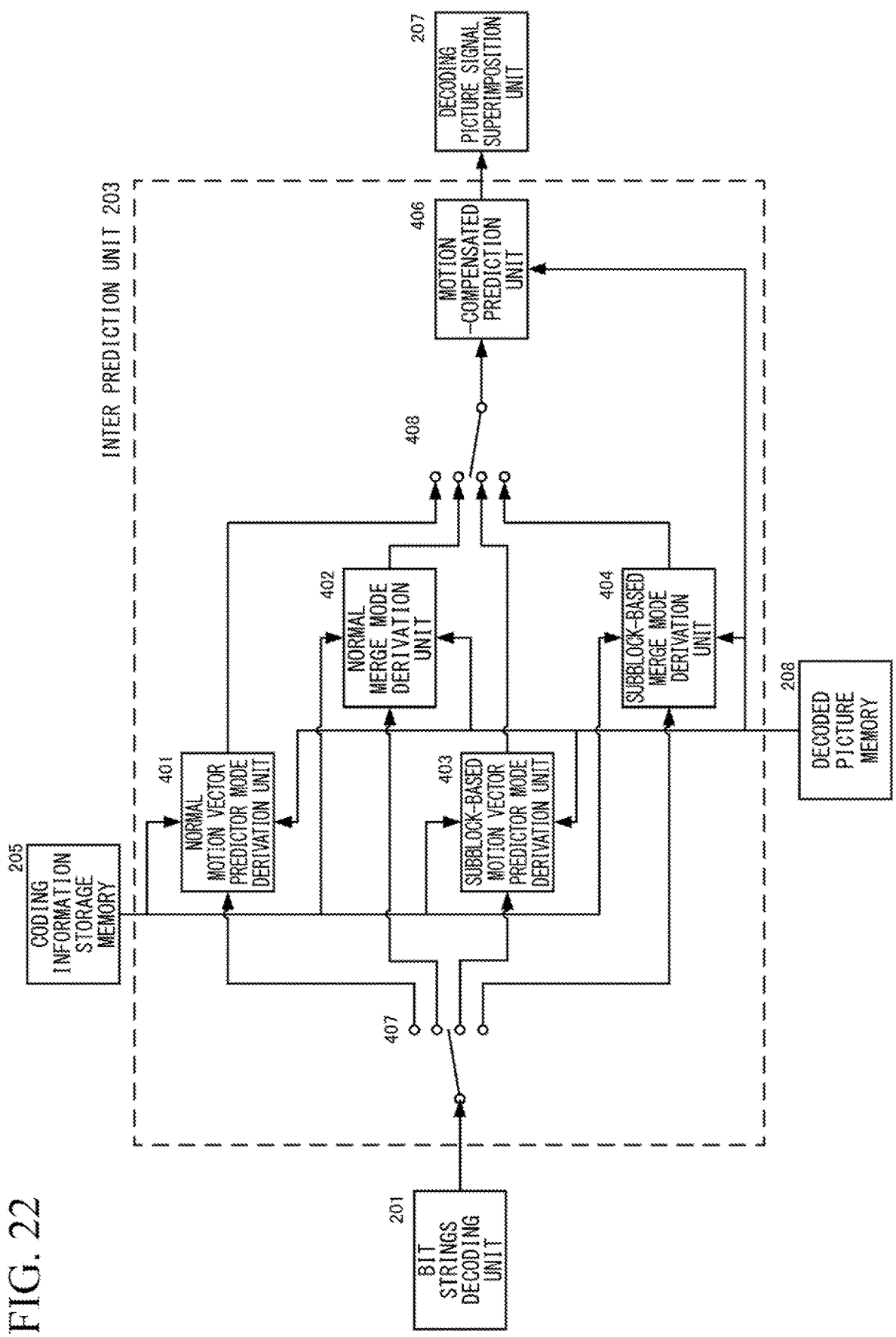
FIG. 22 is a block diagram of a detailed configuration of an inter prediction unit 203 of FIG. 2.

FIG. 22 is a diagram showing a detailed configuration of the inter prediction unit 203 of the picture decoding device of FIG. 2.

A normal motion vector predictor mode derivation unit 401 derives a plurality of normal motion vector predictor candidates to select a motion vector predictor, calculates a sum of the selected motion vector predictor and the decoded motion vector difference, and sets the calculated sum as a motion vector. A decoded inter prediction mode, reference index, and motion vector become inter prediction information of the normal motion vector predictor mode. This inter prediction information is supplied to a motion-compensated prediction unit 406 via the switch 408. A detailed configuration and a process of the normal motion vector predictor mode derivation unit 401 will be described below.

A normal merge mode derivation unit 402 derives a plurality of normal merging candidates to select a normal merging candidate and obtains inter prediction information of the normal merge mode. This inter prediction information is supplied to the motion-compensated prediction unit 406 via the switch 408. A detailed configuration and a process of the normal merge mode derivation unit 402 will be described below.

A subblock-based motion vector predictor mode derivation unit 403 derives a plurality of subblock-based motion vector predictor candidates to select a subblock-based motion vector predictor, calculates a sum of the selected subblock-based motion vector predictor and the decoded motion vector difference, and sets the calculated sum as a motion vector. A decoded inter prediction mode, reference index, and motion vector become the inter prediction information of the subblock-based motion vector predictor mode. This inter prediction information is supplied to the motion-compensated prediction unit 406 via the switch 408.

A subblock-based merge mode derivation unit 404 derives a plurality of subblock-based merging candidates to select a subblock-based merging candidate and obtains inter prediction information of the subblock-based merge mode. This inter prediction information is supplied to the motion-compensated prediction unit 406 via the switch 408.

The motion-compensated prediction unit 406 performs inter prediction on the reference picture signal stored in the decoded picture memory 201 on the basis of the determined inter prediction information. A detailed configuration and a process of the motion-compensated prediction unit 406 are similar to those of the motion-compensated prediction unit 306 of the coding side.

<Normal Motion Vector Predictor Mode Derivation Unit (Normal AMVP)>

Figure 17:
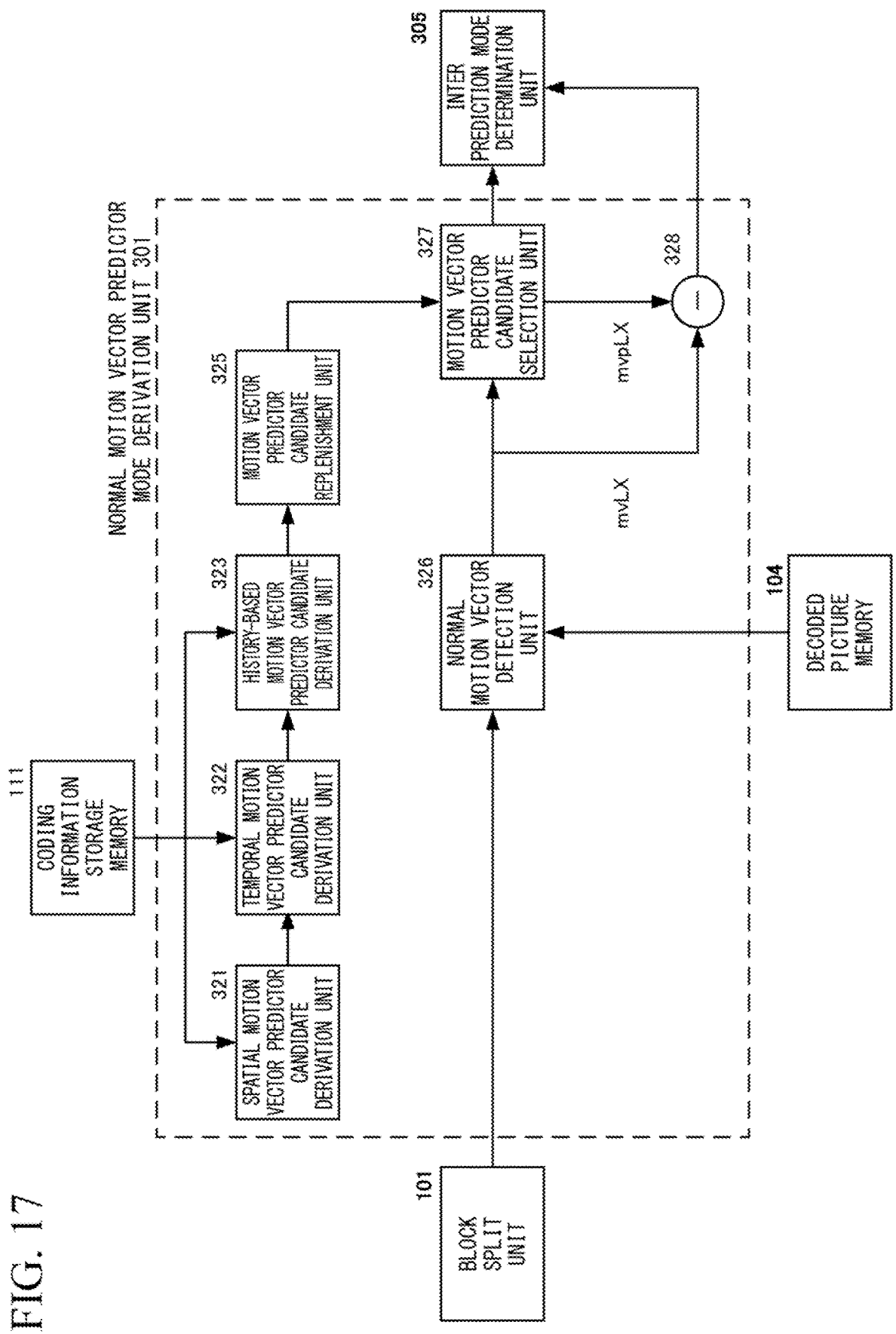
FIG. 17 is a block diagram of a detailed configuration of a normal motion vector predictor mode derivation unit 301 of FIG. 16.

The normal motion vector predictor mode derivation unit 301 of FIG. 17 includes a spatial motion vector predictor candidate derivation unit 321, a temporal motion vector predictor candidate derivation unit 322, a history-based motion vector predictor candidate derivation unit 323, a motion vector predictor candidate replenishment unit 325, a normal motion vector detection unit 326, a motion vector predictor candidate selection unit 327, and a motion vector subtraction unit 328.

Figure 23:
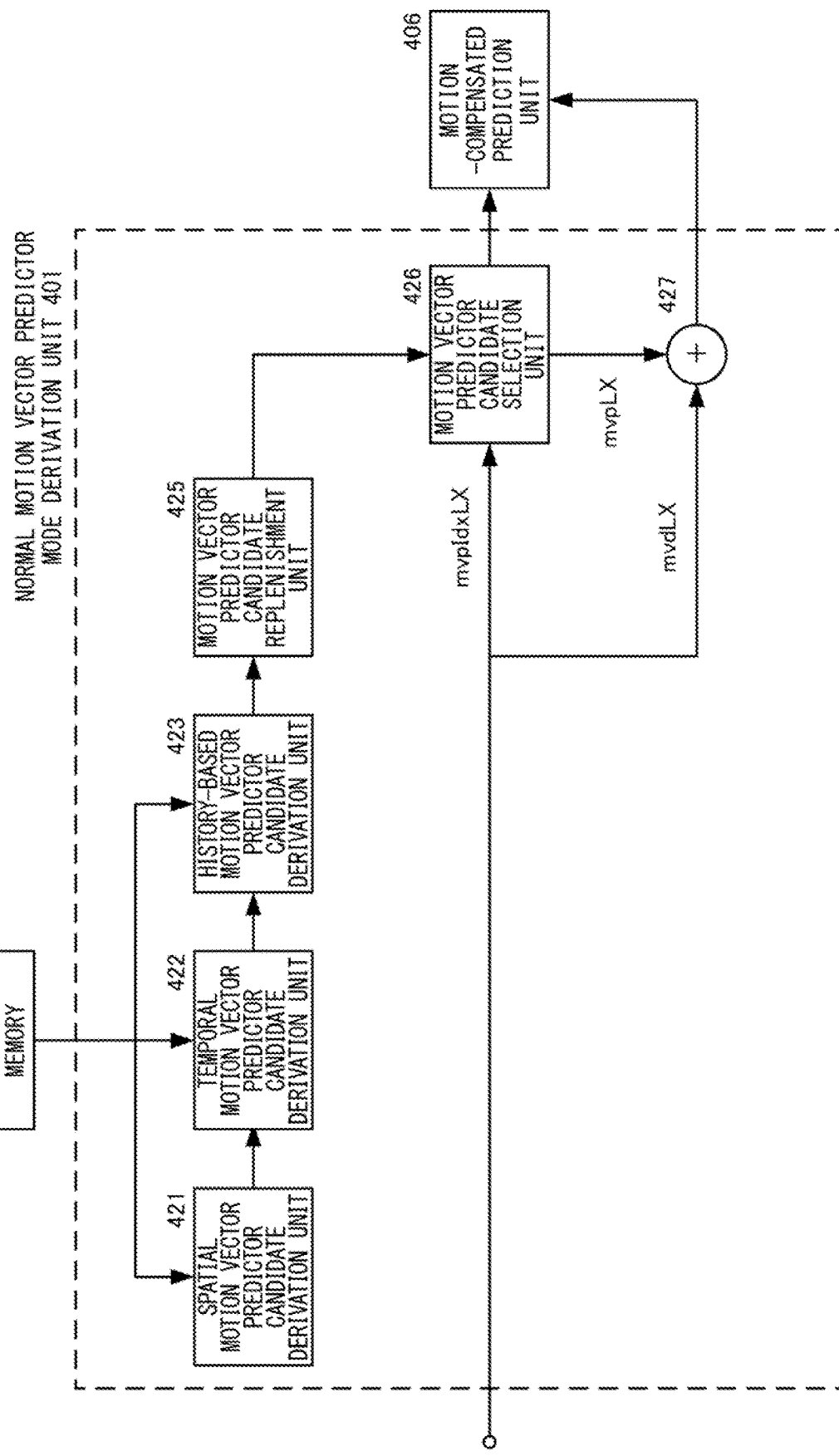
FIG. 23 is a block diagram of a detailed configuration of a normal motion vector predictor mode derivation unit 401 of FIG. 22.

The normal motion vector predictor mode derivation unit 401 of FIG. 23 includes a spatial motion vector predictor candidate derivation unit 421, a temporal motion vector predictor candidate derivation unit 422, a history-based motion vector predictor candidate derivation unit 423, a motion vector predictor candidate replenishment unit 425, a motion vector predictor candidate selection unit 426, and a motion vector addition unit 427.

Figure 19:
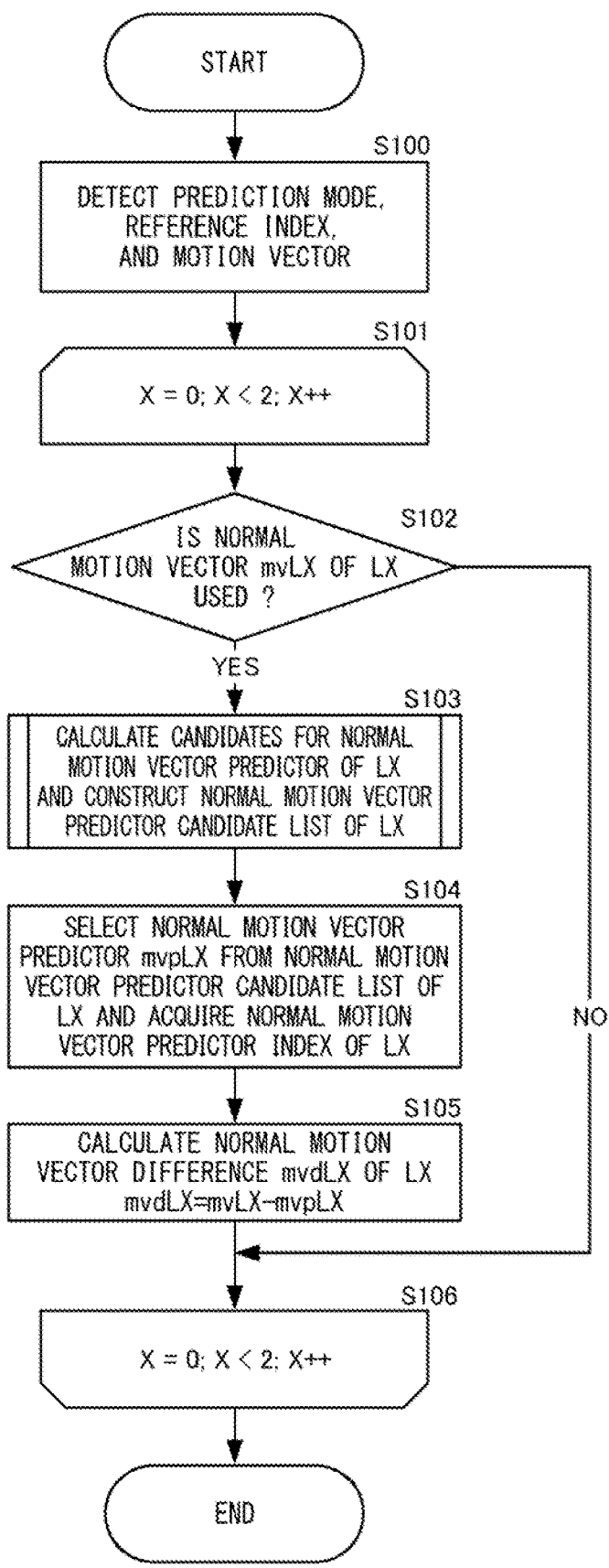
FIG. 19 is an explanatory flowchart showing a normal motion vector predictor mode derivation process of the normal motion vector predictor mode derivation unit 301 of FIG. 16.
Figure 25:
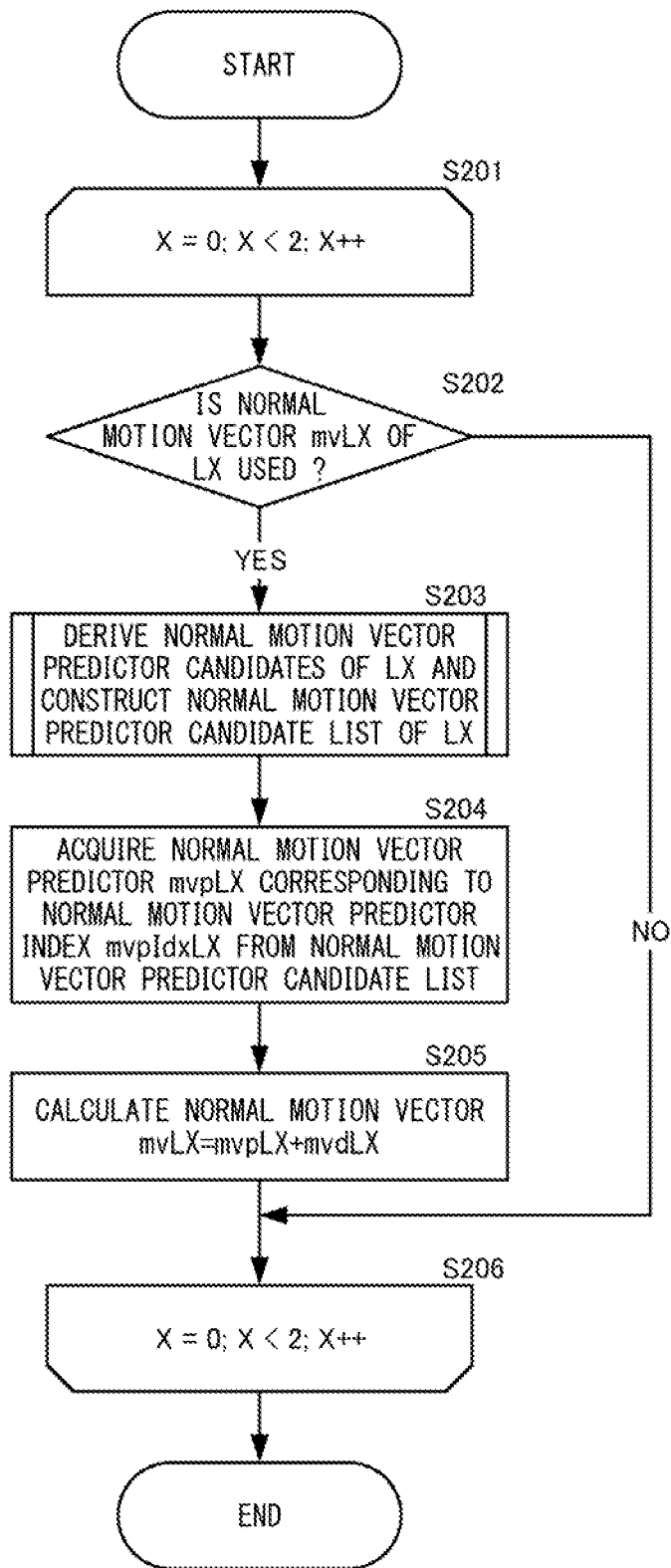
FIG. 25 is an explanatory flowchart showing a normal motion vector predictor mode derivation process of the normal motion vector predictor mode derivation unit 401 of FIG. 22.

Processing procedures of the normal motion vector predictor mode derivation unit 301 of the coding side and the normal motion vector predictor mode derivation unit 401 of the decoding side will be described using the flowcharts of FIGS. 19 and 25, respectively. FIG. 19 is a flowchart showing a normal motion vector predictor mode derivation processing procedure of the normal motion vector predictor mode derivation unit 301 of the coding side and FIG. 25 is a flowchart showing a normal motion vector predictor mode derivation processing procedure of the normal motion vector predictor mode derivation unit 401 of the decoding side.

<Normal Motion Vector Predictor Mode Derivation Unit (Normal AMVP): Description of Coding Side>

The normal motion vector predictor mode derivation processing procedure of the coding side will be described with reference to FIG. 19. In the description of the processing procedure of FIG. 19, the term "normal" shown in FIG. 19 may be omitted.

First, the normal motion vector detection unit 326 detects a normal motion vector for each inter prediction mode and each reference index (step S100 of FIG. 19).

Subsequently, in the spatial motion vector predictor candidate derivation unit 321, the temporal motion vector predictor candidate derivation unit 322, the history-based motion vector predictor candidate derivation unit 323, the motion vector predictor candidate replenishment unit 325, the motion vector predictor candidate selection unit 327, and the motion vector subtraction unit 328, a motion vector difference of a motion vector used for inter prediction of the normal motion vector predictor mode is calculated for each of L0 and L1 (steps S101 to S106 of FIG. 19). Specifically, when the prediction mode PredMode of the target block is inter prediction (MODE_INTER) and the inter prediction mode is L0-prediction (Pred_L0), the motion vector predictor candidate list mvpListL0 of L0 is calculated to select the motion vector predictor mvpL0 and the motion vector difference mvdL0 of the motion vector mvL0 of L0 is calculated. When the inter prediction mode of the target block is L1-prediction (Pred_L1), the motion vector predictor candidate list mvpListL1 of L1 is calculated to select the motion vector predictor mvpL1 and the motion vector difference mvdL1 of the motion vector mvL1 of L1 is calculated. When the inter prediction mode of the target block is bi-prediction (Pred_BI), both L0-prediction and L1-prediction are performed, the motion vector predictor candidate list mvpListL0 of L0 is calculated to select a motion vector predictor mvpL0 of L0, the motion vector difference mvdL0 of a motion vector mvL0 of L0 is calculated, the motion vector predictor candidate list mvpListL1 of L1 is calculated to select a motion vector predictor mvpL1 of L1, and a motion vector difference mvdL1 of a motion vector mvL1 of L1 is calculated.

Although a motion vector difference calculation process is performed for each of L0 and L1, the motion vector difference calculation process becomes a process common to both L0 and L1. Therefore, in the following description, L0 and L1 are represented as common LX. X of LX is 0 in the process of calculating the motion vector difference of L0 and X of LX is 1 in the process of calculating the motion vector difference of L1. Also, when information of another list instead of LX is referred to during the process of calculating the motion vector difference of LX, the other list is represented as LY.

When the motion vector mvLX of LX is used (step S102 of FIG. 19: YES), the motion vector predictor candidates of LX are calculated to construct the motion vector predictor candidate list mvpListLX of LX (step S103 of FIG. 19). In the spatial motion vector predictor candidate derivation unit 321, the temporal motion vector predictor candidate derivation unit 322, the history-based motion vector predictor candidate derivation unit 323, and the motion vector predictor candidate replenishment unit 325 of the normal motion vector predictor mode derivation unit 301, a plurality of motion vector predictor candidates are derived to construct the motion vector predictor candidate list mvpListLX. The detailed processing procedure of step S103 of FIG. 19 will be described below using the flowchart of FIG. 20.

Subsequently, the motion vector predictor candidate selection unit 327 selects a motion vector predictor mvpLX of LX from the motion vector predictor candidate list mvpListLX of LX (step S104 of FIG. 19). Here, one element (an $i^{th}$ element when counted from a $0^{th}$ element) in the motion vector predictor candidate list mvpListLX is represented as mvpListLX[i]. Each motion vector difference that is a difference between the motion vector mvLX and each motion vector predictor candidate mvpListLX[i] stored in the motion vector predictor candidate list mvpListLX is calculated. A code amount when the motion vector differences are coded is calculated for each element (motion vector predictor candidate) of the motion vector predictor candidate list mvpListLX. Then, a motion vector predictor candidate mvpListLX[i] that minimizes the code amount for each motion vector predictor candidate among the elements registered in the motion vector predictor candidate list mvpListLX is selected as the motion vector predictor mvpLX and its index i is acquired. When there are a plurality of motion vector predictor candidates having the smallest generated code amount in the motion vector predictor candidate list mvpListLX, a motion vector predictor candidate mvpListLX[i] represented by a smaller number in the index i in the motion vector predictor candidate list mvpListLX is selected as an optimum motion vector predictor mvpLX and its index i is acquired.

Subsequently, the motion vector subtraction unit 328 subtracts the selected motion vector predictor mvpLX of LX from the motion vector mvLX of LX and calculates a motion vector difference mvdLX of LX as mvdLX=mvLX−mvpLX (step S105 of FIG. 19).

<Normal Motion Vector Predictor Mode Derivation Unit (Normal AMVP): Description of Decoding Side>

Next, the normal motion vector predictor mode processing procedure of the decoding side will be described with reference to FIG. 25. On the decoding side, in the spatial motion vector predictor candidate derivation unit 421, the temporal motion vector predictor candidate derivation unit 422, the history-based motion vector predictor candidate derivation unit 423, and the motion vector predictor candidate replenishment unit 425, a motion vector for use in inter prediction of the normal motion vector predictor mode is calculated for each of L0 and L1 (steps S201 to S206 of FIG. 25). Specifically, when the prediction mode PredMode of the target block is inter prediction (MODE_INTER) and the inter prediction mode of the target block is L0-prediction (Pred_L0), the motion vector predictor candidate list mvpListL0 of L0 is calculated to select the motion vector predictor mvpL0 and a motion vector mvL0 of L0 is calculated. When the inter prediction mode of the target block is L1-prediction (Pred_L1), the motion vector predictor candidate list mvpListL1 of L1 is calculated to select the motion vector predictor mvpL1 and the motion vector mvL1 of L1 is calculated. When the inter prediction mode of the target block is bi-prediction (Pred_BI), both L0-prediction and L1-prediction are performed, the motion vector predictor candidate list mvpListL0 of L0 is calculated to select a motion vector predictor mvpLf0 of L0, a motion vector mvL0 of L0 is calculated, the motion vector predictor candidate list mvpListL1 of L1 is calculated to select a motion vector predictor mvpL1 of L1, and each motion vector mvL1 of L1 is calculated.

Although a motion vector calculation process is performed for each of L0 and L1 on the decoding side as on the coding side, the motion vector calculation process becomes a process common to both L0 and L1. Therefore, in the following description, L0 and L1 are represented as common LX. LX represents an inter prediction mode for use in the inter prediction of a target coding block. X is 0 in the process of calculating the motion vector of L0 and X is 1 in the process of calculating the motion vector of L1. Also, when information of another reference list instead of a reference list identical to that of LX of a calculation target is referred to during the process of calculating the motion vector of LX, the other reference list is represented as LY.

When the motion vector mvLX of LX is used (step S202 of FIG. 25: YES), the motion vector predictor candidates of LX are calculated to construct the motion vector predictor candidate list mvpListLX of LX (step S203 of FIG. 25). In the spatial motion vector predictor candidate derivation unit 421, the temporal motion vector predictor candidate derivation unit 422, the history-based motion vector predictor candidate derivation unit 423, and the motion vector predictor candidate replenishment unit 425 of the normal motion vector predictor mode derivation unit 401, a plurality of motion vector predictor candidates are calculated to construct a motion vector predictor candidate list mvpListLX. A detailed processing procedure of step S203 of FIG. 25 will be described below using the flowchart of FIG. 20.

Subsequently, the motion vector predictor candidate mvpListLX[mvpIdxLX] corresponding to the index mvpIdxLX of the motion vector predictor decoded and supplied by the bit strings decoding unit 201 from the motion vector predictor candidate list mvpListLX is extracted as a selected motion vector predictor mvpLX in the motion vector predictor candidate selection unit 426 (step S204 of FIG. 25).

Subsequently, the motion vector addition unit 427 sums the motion vector difference mvdLX of LX that is decoded and supplied by the bit strings decoding unit 201 and the motion vector predictor mvpLX of LX and calculates the motion vector mvLX of LX as mvLX=mvpLX+mvdLX (step S205 of FIG. 25).

<Normal Motion Vector Predictor Mode Derivation Unit (Normal AMVP): Motion Vector Prediction Method>

Figure 20:
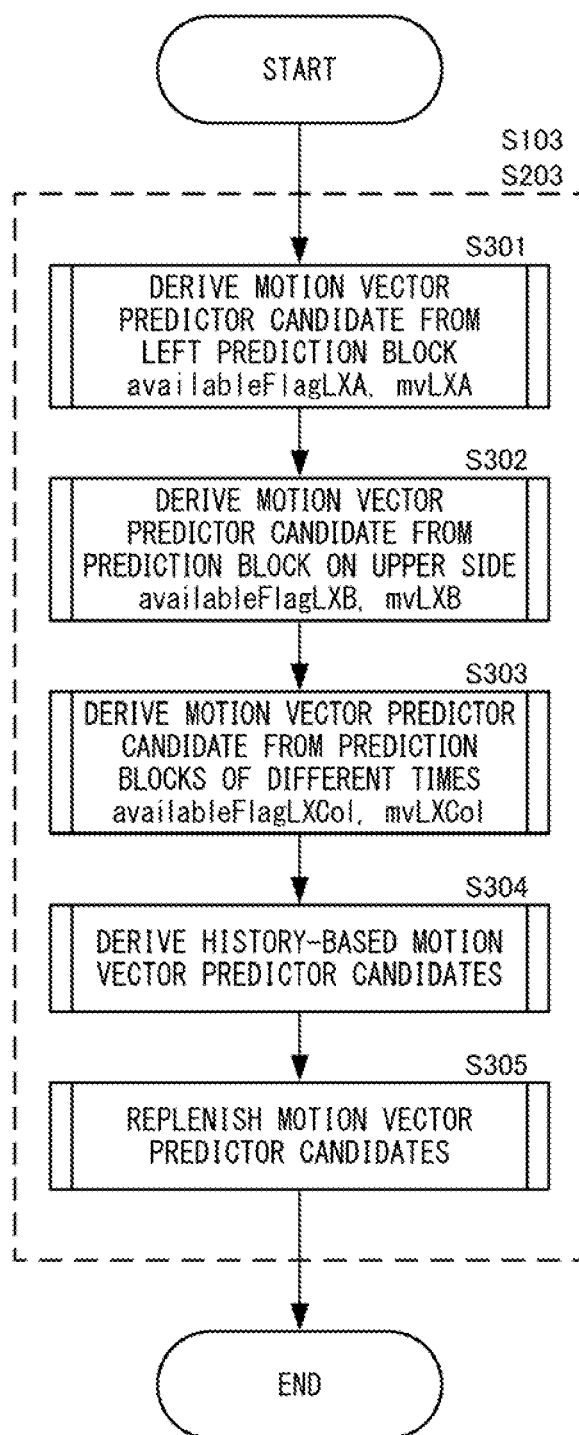
FIG. 20 is a flowchart showing a processing procedure of the normal motion vector predictor mode derivation process.

FIG. 20 is a flowchart showing a processing procedure of a normal motion vector predictor mode derivation process having a function common to the normal motion vector predictor mode derivation unit 301 of the picture coding device and the normal motion vector predictor mode derivation unit 401 of the picture decoding device according to the embodiment of the present invention.

The normal motion vector predictor mode derivation unit 301 and the normal motion vector predictor mode derivation unit 401 include a motion vector predictor candidate list mvpListLX. The motion vector predictor candidate list mvpListLX has a list structure and is provided with a storage area where a motion vector predictor index indicating the location inside the motion vector predictor candidate list and a motion vector predictor candidate corresponding to the index are stored as elements. The number of the motion vector predictor index starts from 0 and motion vector predictor candidates are stored in the storage area of the motion vector predictor candidate list mvpListLX. In the present embodiment, it is assumed that at least two motion vector predictor candidates (inter prediction information) can be registered in the motion vector predictor candidate list mvpListLX. Furthermore, a variable numCurrMvpCand indicating the number of motion vector predictor candidates registered in the motion vector predictor candidate list mvpListLX is set to 0.

The spatial motion vector predictor candidate derivation units 321 and 421 derive motion vector predictor candidates from neighboring blocks on the left side. In this process, a motion vector predictor mvLXA is derived with reference to the inter prediction information of the neighboring block on the left side (A0 or A1 of FIG. 1), i.e., a flag indicating whether or not a motion vector predictor candidate can be used, a motion vector, a reference index, and the like, and the derived mvLXA is added to the motion vector predictor candidate list mvpListLX (step S301 of FIG. 20). Also, X is 0 at the time of L0-prediction and X is 1 at the time of L1-prediction (the same is true hereinafter). Subsequently, the spatial motion vector predictor candidate derivation units 321 and 421 derive a motion vector predictor candidate from a neighboring block on the upper side. In this process, the motion vector predictor mvLXB is derived with reference to inter prediction information of a neighboring block on the upper side (B0, B1, or B2 of FIG. 11), i.e., a flag indicating whether or not a motion vector predictor candidate can be used, a motion vector, a reference index, and the like, and mvLXB is added to the motion vector predictor candidate list mvpListLX if the derived mvLXA is not equal to the derived mvLXB (step S302 of FIG. 20). The processing of steps S301 and S302 of FIG. 20 is common except that positions of neighboring blocks to be referred to and the number of neighboring blocks to be referred to are different, and a flag availableFlagLXN indicating whether or not a motion vector predictor candidate of the coding block can be used, a motion vector mvLXN, and a reference index refIdxN (N represents A or B and the same is true hereinafter) are derived.

Subsequently, the temporal motion vector predictor candidate derivation units 322 and 422 derive motion vector predictor candidates from blocks in a picture whose time is different from that of the current target picture. In this process, a flag availableFlagLXCol indicating whether or not a motion vector predictor candidate of a coding block of a picture of different time can be used, a motion vector mvLXCol, a reference index refIdxCol, and a reference list listCol are derived, and mvLXCol is added to the motion vector predictor candidate list mvpListLX (step S303 of FIG. 20).

Also, it is assumed that the processes of the temporal motion vector predictor candidate derivation units 322 and 422 can be omitted in units of sequences (SPS), pictures (PPS), or slices.

Subsequently, the history-based motion vector predictor candidate derivation units 323 and 423 add the history-based motion vector predictor candidates registered in the history-based motion vector predictor candidate list HmvpCandList to the motion vector predictor candidate list mvpListLX (step S304 of FIG. 20). Details of the registration processing procedure of step S304 will be described below using the flowchart of FIG. 29.

Subsequently, the motion vector predictor candidate replenishment units 325 and 425 add motion vector predictor candidates having a predetermined value such as (0, 0) until the motion vector predictor candidate list mvpListLX is satisfied (S305 of FIG. 20).

<Normal Merge Mode Derivation Unit (Normal Merge)>

Figure 18:
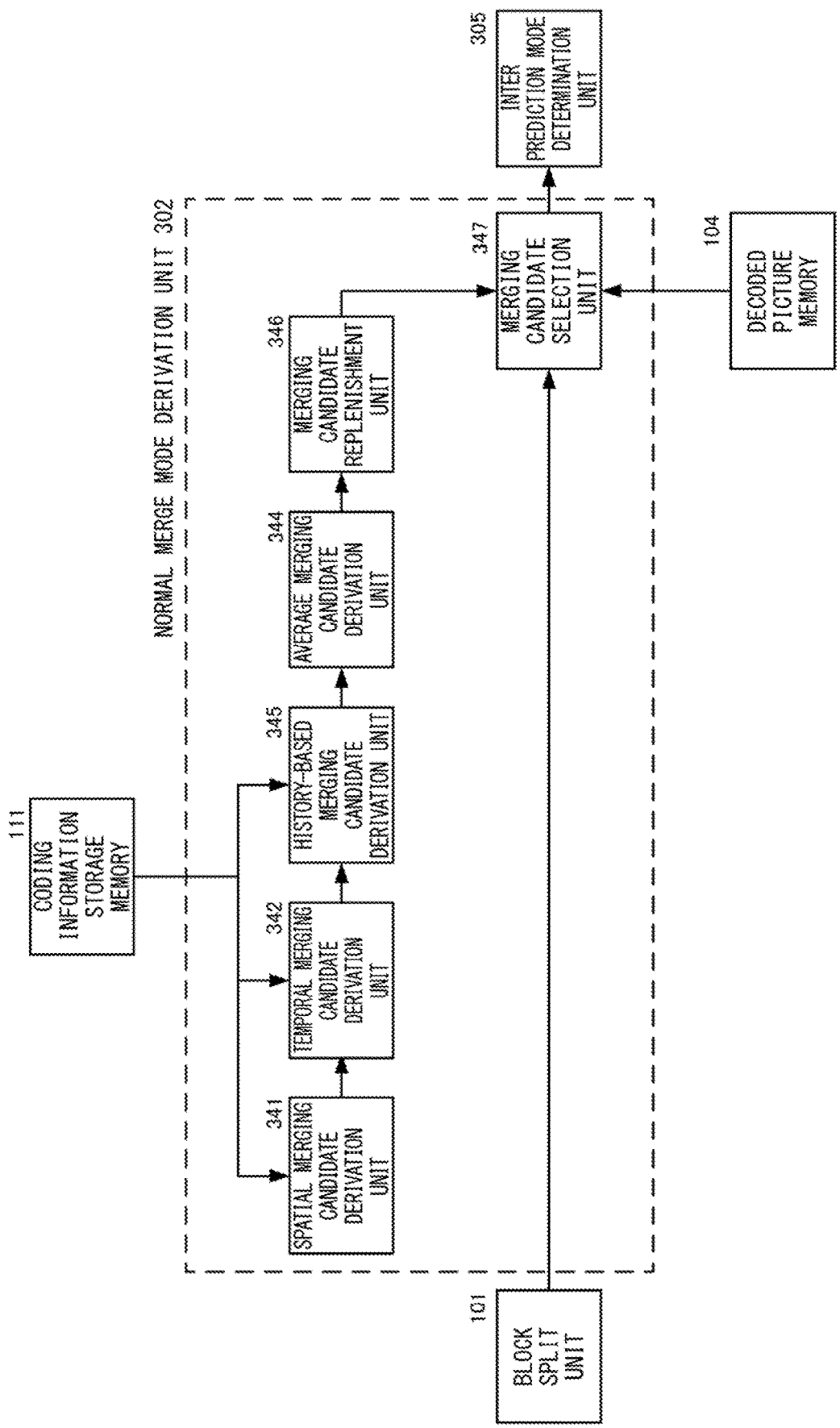
FIG. 18 is a block diagram of a detailed configuration of a normal merge mode derivation unit 302 of FIG. 16.

The normal merge mode derivation unit 302 of FIG. 18 includes a spatial merging candidate derivation unit 341, a temporal merging candidate derivation unit 342, an average merging candidate derivation unit 344, a history-based merging candidate derivation unit 345, a merging candidate replenishment unit 346, and a merging candidate selection unit 347.

Figure 24:
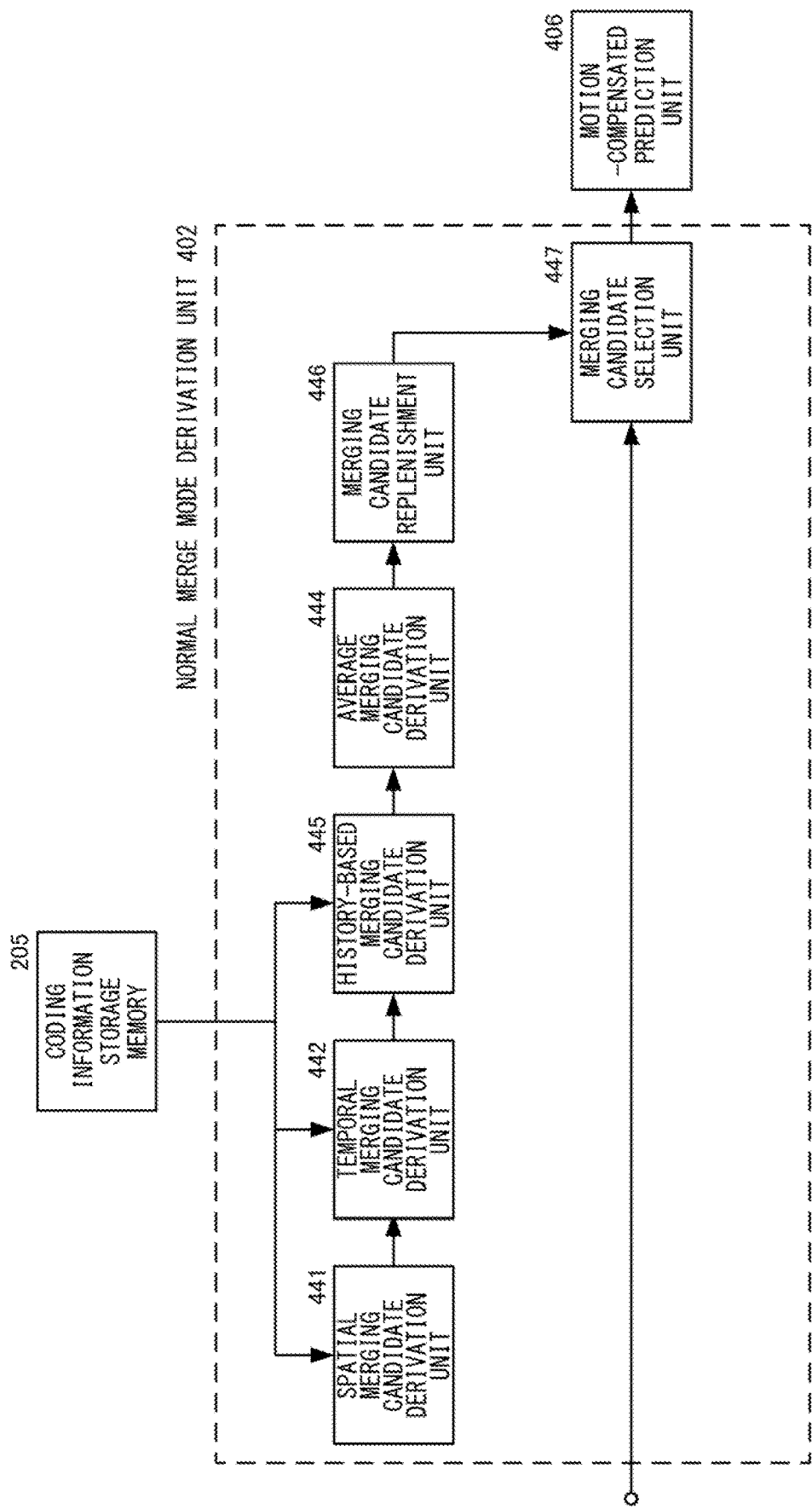
FIG. 24 is a block diagram of a detailed configuration of a normal merge mode derivation unit 402 of FIG. 22.

The normal merge mode derivation unit 402 of FIG. 24 includes a spatial merging candidate derivation unit 441, a temporal merging candidate derivation unit 442, an average merging candidate derivation unit 444, a history-based merging candidate derivation unit 445, a merging candidate replenishment unit 446, and a merging candidate selection unit 447.

Figure 21:
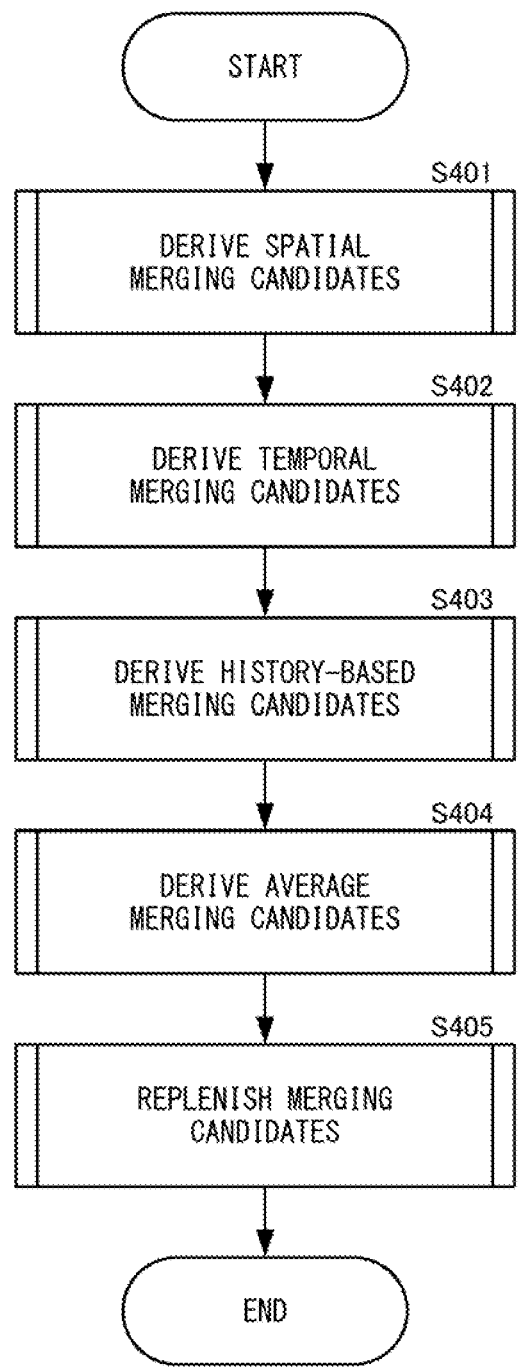
FIG. 21 is an explanatory flowchart showing a processing procedure of a normal merge mode derivation process.

FIG. 21 is an explanatory flowchart showing a procedure of a normal merge mode derivation process having a function common to the normal merge mode derivation unit 302 of the picture coding device and the normal merge mode derivation unit 402 of the picture decoding device according to the embodiment of the present invention.

Hereafter, various processes will be described step by step. Although a case in which a type of slice slice_type is a B slice will be described unless otherwise specified in the following description, the present invention can also be applied to the case of a P slice. However, when the type of slice slice_type is a P slice, because only the L0-prediction (Pred_L0) is provided as the inter prediction mode and L1-prediction (Pred_L1) and bi-prediction (Pred_BI) are absent, a process related to L1 can be omitted.

The normal merge mode derivation unit 302 and the normal merge mode derivation unit 402 have a merging candidate list mergeCandList. The merging candidate list mergeCandList has a list structure and is provided with a merge index indicating the location within the merging candidate list and a storage area where merging candidates corresponding to the index are stored as elements. The number of the merge index starts from 0 and merging candidates are stored in the storage area of the merging candidate list mergeCandList. In the subsequent process, the merging candidate of the merge index i registered in the merging candidate list mergeCandList is represented by mergeCandList[i]. In the present embodiment, it is assumed that at least six merging candidates (inter prediction information) can be registered in the merging candidate list mergeCandList. Further, a variable numCurrMergeCand indicating the number of merging candidates registered in the merging candidate list mergeCandList is set to 0.

A spatial merging candidate derivation unit 341 and a spatial merging candidate derivation unit 441 derive spatial merging candidates from blocks (B1, A1, B0, A0, and B2 of FIG. 11) neighboring a target block in the order of B1, A1, B0, A0, and B2 from the coding information stored in the coding information storage memory 111 of the picture coding device or the coding information storage memory 205 of the picture decoding device and register the derived spatial merging candidates in the merging candidate list mergeCandList (step S401 of FIG. 21). Here, N indicating anyone of B1, A1, B0, A0, B2, and the temporal merging candidate Col is defined. A flag availableFlagN indicating whether or not inter prediction information of block N is available as a spatial merging candidate, a reference index refIdxL0N of L0 and a reference index refIdxL1N of L1 of spatial merging candidate N, an L0-prediction flag predFlagL0N indicating whether or not L0-prediction is to be performed, an L1-prediction flag predFlagL1N indicating whether or not L1-prediction is to be performed, a motion vector mvL0N of L0, and a motion vector mvL1N of L1 are derived. However, in the present embodiment, because the merging candidate is derived without referring to inter prediction information of a block included in a coding block serving as a target, a spatial merging candidate using the inter prediction information of the block included in the target coding block is not derived.

Subsequently, the temporal merging candidate derivation unit 342 and the temporal merging candidate derivation unit 442 derive temporal merging candidates from pictures of different times and register the derived temporal merging candidates in the merging candidate list mergeCandList (step S402 of FIG. 21). A flag availableFlagCol indicating whether or not the temporal merging candidate can be used, an L0-prediction flag predFlagL0Col indicating whether or not L0-prediction of the temporal merging candidate is performed, an L1-prediction flag predFlagL1Col indicating whether or not L1-prediction is performed, a motion vectormvL0Col of L0, and a motion vector mvL1Col of L1 are derived.

Also, it is assumed that the processes of the temporal merging candidate derivation unit 342 and the temporal merging candidate derivation unit 442 can be omitted in units of sequences (SPS), pictures (PPS), or slices.

Subsequently, the history-based merging candidate derivation unit 345 and the history-based merging candidate derivation unit 445 register history-based motion vector predictor candidates registered in the history-based motion vector predictor candidate list HmvpCandList in the merging candidate list mergeCandList (step S403 of FIG. 21).

Also, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList and history-based merging candidates are derived and registered in the merging candidate list mergeCandList.

Subsequently, the average merging candidate derivation unit 344 and the average merging candidate derivation unit 444 derive an average merging candidate from the merging candidate list mergeCandList and adds the derived average merging candidate to the merging candidate list mergeCandList (step S404 of FIG. 21).

Also, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList and average merging candidates are derived and registered in the merging candidate list mergeCandList.

Here, the average merging candidate is a new merging candidate having a motion vector obtained by averaging motion vectors of a first merging candidate and a second merging candidate registered in the merging candidate list mergeCandList for each of the L0-prediction and the L1-prediction.

Subsequently, in the merging candidate replenishment unit 346 and the merging candidate replenishment unit 446, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList and an additional merging candidate is derived and registered in the merging candidate list mergeCandList (step S405 of FIG. 21). In the P slice, a merging candidate for which a motion vector has a value of (0, 0) and the prediction mode is L0-prediction (Pred_L0) is added using the maximum number of merging candidates MaxNumMergeCand as the upper limit. In the B slice, a merging candidate for which a motion vector has a value of (0, 0) and the prediction mode is bi-prediction (Pred_BI) is added. A reference index when the merging candidate is added is different from the previously added reference index.

Subsequently, the merging candidate selection unit 347 and the merging candidate selection unit 447 select merging candidates from the merging candidates registered within the merging candidate list mergeCandList. The merging candidate selection unit 347 of the coding side selects a merging candidate by calculating a code amount and a distortion amount, and supplies a merge index indicating the selected merging candidate and inter prediction information of the merging candidate to the motion-compensated prediction unit 306 via the inter prediction mode determination unit 305. On the other hand, the merging candidate selection unit 447 of the decoding side selects a merging candidate on the basis of a decoded merge index and supplies the selected merging candidate to the motion-compensated prediction unit 406.

<Subblock-Based Motion Vector Predictor Mode Derivation>

Subblock-based motion vector predictor mode derivation will be described.

Figure 38:
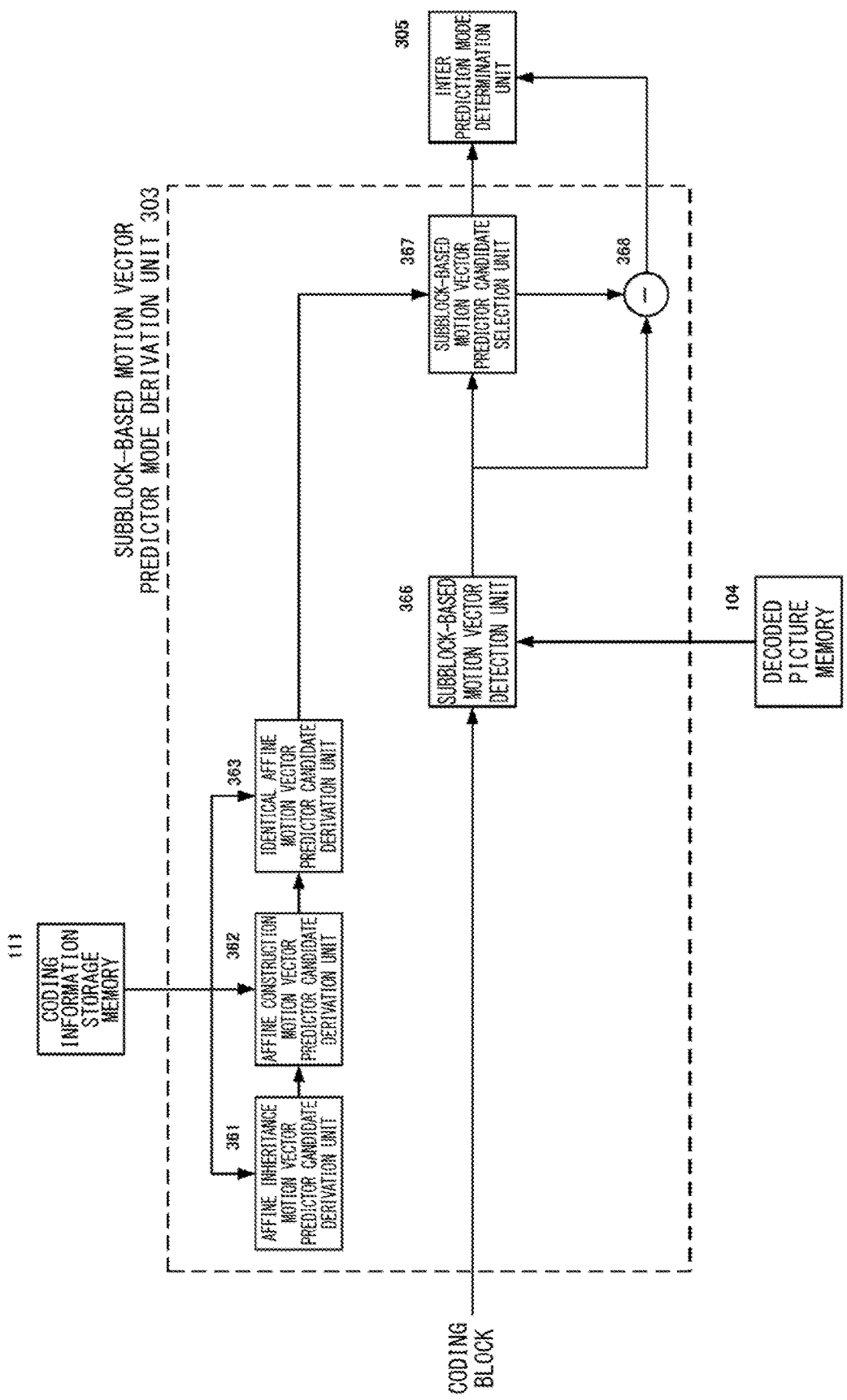
FIG. 38 is a block diagram of a subblock-based motion vector predictor mode derivation unit 303 in the coding device of the present application.

FIG. 38 is a block diagram of the subblock-based motion vector predictor mode derivation unit 303 in the coding device of the present application.

First, an affine inheritance motion vector predictor candidate derivation unit 361 derives an affine inheritance motion vector predictor candidate. Details of the affine inheritance motion vector predictor candidate derivation will be described below.

Subsequently, an affine construction motion vector predictor candidate derivation unit 362 derives an affine construction motion vector predictor candidate. Details of the affine construction motion vector predictor candidate derivation will be described below.

Subsequently, an identical affine motion vector predictor candidate derivation unit 363 derives an identical affine motion vector predictor candidate. Details of the identical affine motion vector predictor candidate derivation will be described below.

The subblock-based motion vector detection unit 366 detects a subblock-based motion vector suitable for the subblock-based motion vector predictor mode and supplies the detected vector to a subblock-based motion vector predictor candidate selection unit 367 and a difference calculation unit 368.

The subblock-based motion vector predictor candidate selection unit 367 selects a subblock-based motion vector predictor candidate from among subblock-based motion vector predictor candidates derived by the affine inheritance motion vector predictor candidate derivation unit 361, the affine construction motion vector predictor candidate derivation unit 362, and the identical affine motion vector predictor candidate derivation unit 363 on the basis of the motion vector supplied from the subblock-based motion vector detection unit 366 and supplies information about the selected subblock-based motion vector predictor candidate to the inter prediction mode determination unit 305 and the difference calculation unit 368.

The difference calculation unit 368 supplies a motion vector predictor difference obtained by subtracting the subblock-based motion vector predictor selected by the subblock-based motion vector predictor candidate selection unit 367 from the motion vector supplied from the subblock-based motion vector detection unit 366 to the inter prediction mode determination unit 305.

Figure 39:
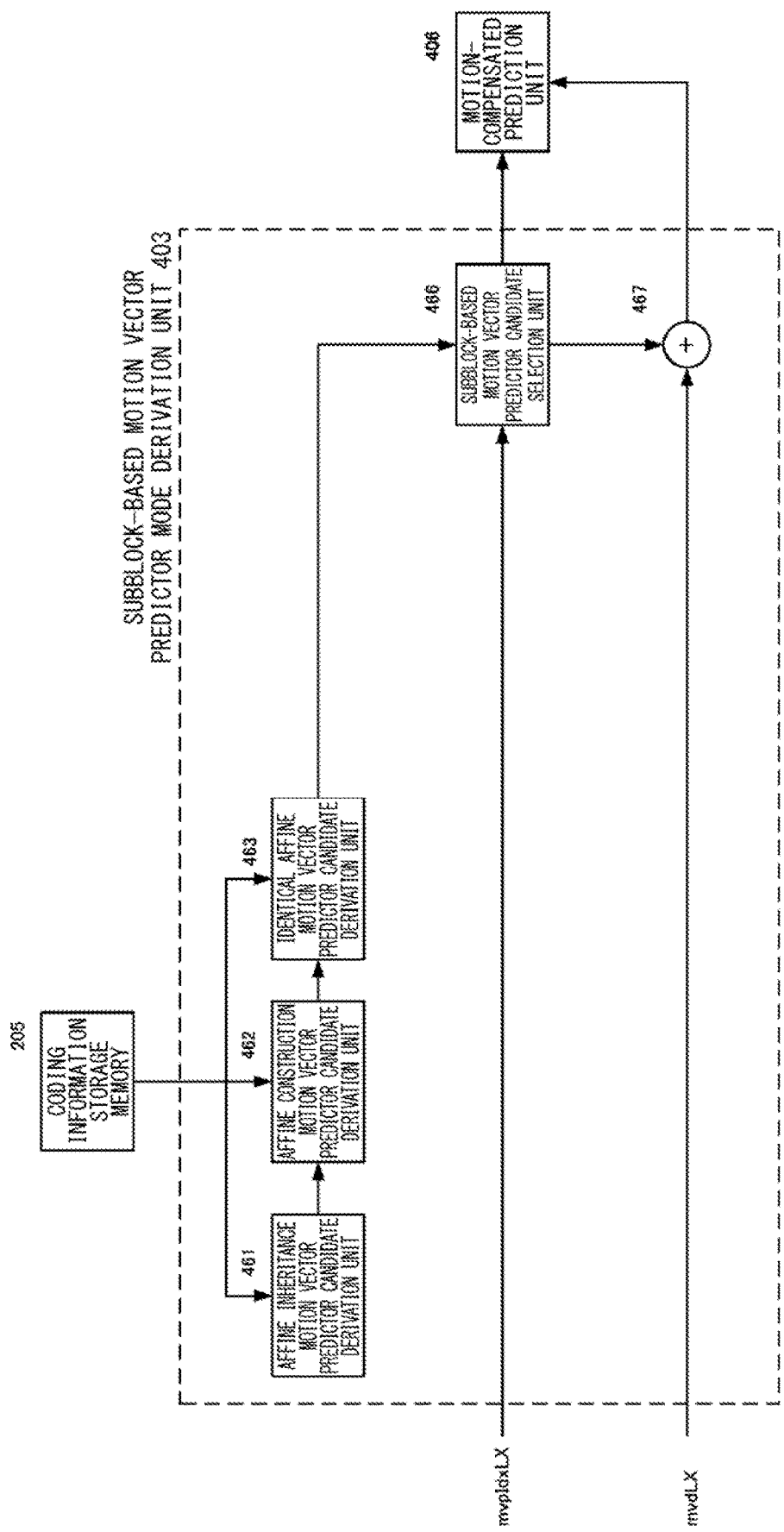
FIG. 39 is a block diagram of a subblock-based motion vector predictor mode derivation unit 403 in the decoding device of the present application.

FIG. 39 is a block diagram of the subblock-based motion vector predictor mode derivation unit 403 in the decoding device of the present application.

First, an affine inheritance motion vector predictor candidate derivation unit 461 derives an affine inheritance motion vector predictor candidate. A process of the affine inheritance motion vector predictor candidate derivation unit 461 is the same as the process of the affine inheritance motion vector predictor candidate derivation unit 361 in the coding device of the present application.

Subsequently, an affine construction motion vector predictor candidate derivation unit 462 derives an affine construction motion vector predictor candidate. A process of the affine construction motion vector predictor candidate derivation unit 462 is the same as the process of the affine construction motion vector predictor candidate derivation unit 362 in the coding device of the present application.

Subsequently, an identical affine motion vector predictor candidate derivation unit 463 derives an identical affine motion vector predictor candidate. A process of the identical affine motion vector predictor candidate derivation unit 463 is the same as the processing of the identical affine motion vector predictor candidate derivation unit 363 in the coding device of the present application.

A subblock-based motion vector predictor candidate selection unit 467 selects a subblock-based motion vector predictor candidate from among subblock-based motion vector predictor candidates derived by the affine inheritance motion vector predictor candidate derivation unit 461, the affine construction motion vector predictor candidate derivation unit 462, and the identical affine motion vector predictor candidate derivation unit 463 on the basis of the motion vector predictor index, which is transmitted from the coding device and is decoded, and supplies information about the selected subblock-based motion vector predictor candidate to the motion-compensated prediction unit 406 and an addition operation unit 467.

The addition operation unit 467 supplies a motion vector generated by adding the differential motion vector, which is transmitted from the coding device and is decoded, to the subblock-based motion vector predictor selected by the subblock-based motion vector predictor candidate selection unit 466 to the motion-compensated prediction unit 406.

<Affine Inheritance Motion Vector Predictor Candidate Derivation>

The affine inheritance motion vector predictor candidate derivation unit 361 will be described. The affine inheritance motion vector predictor candidate derivation unit 361 is similar to the affine inheritance motion vector predictor candidate derivation unit 461.

Figure 42:
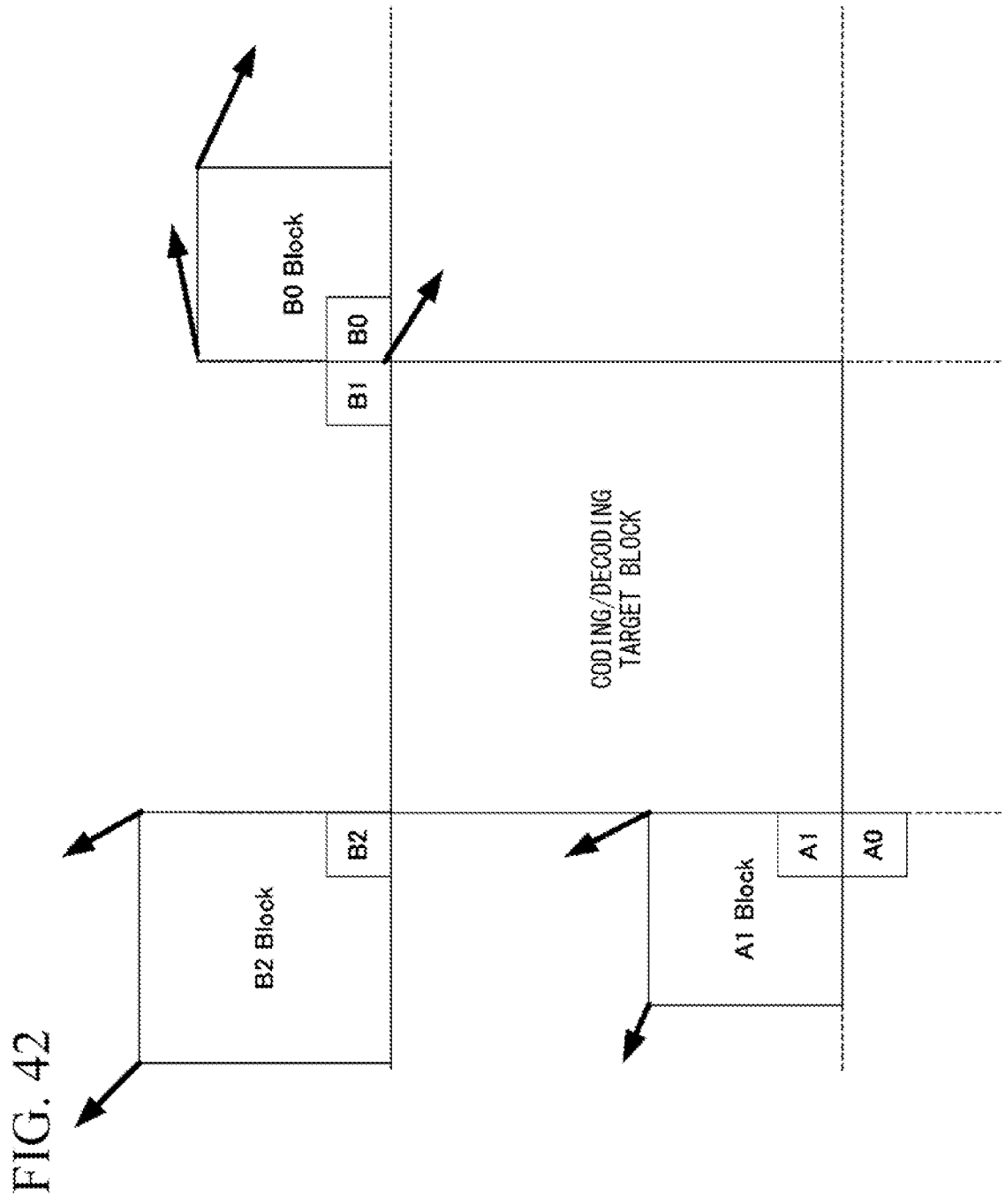
FIG. 42 is an explanatory diagram showing affine inheritance motion vector predictor candidate derivation.

An affine inheritance motion vector predictor candidate inherits motion vector information of an affine control point. FIG. 42 is an explanatory diagram showing affine inheritance motion vector predictor candidate derivation.

The affine inheritance motion vector predictor candidate can be obtained by searching for motion vectors of affine control points of neighboring coded/decoded blocks in a spatial domain.

Specifically, a search process is performed in a maximum of one affine mode from each of blocks (A0 and A1) adjacent to a left side of a coding/decoding target block and blocks (B0, B1, and B2) adjacent to an upper side of the coding/decoding target block and a search result is set as an affine inheritance motion vector predictor.

Figure 46:
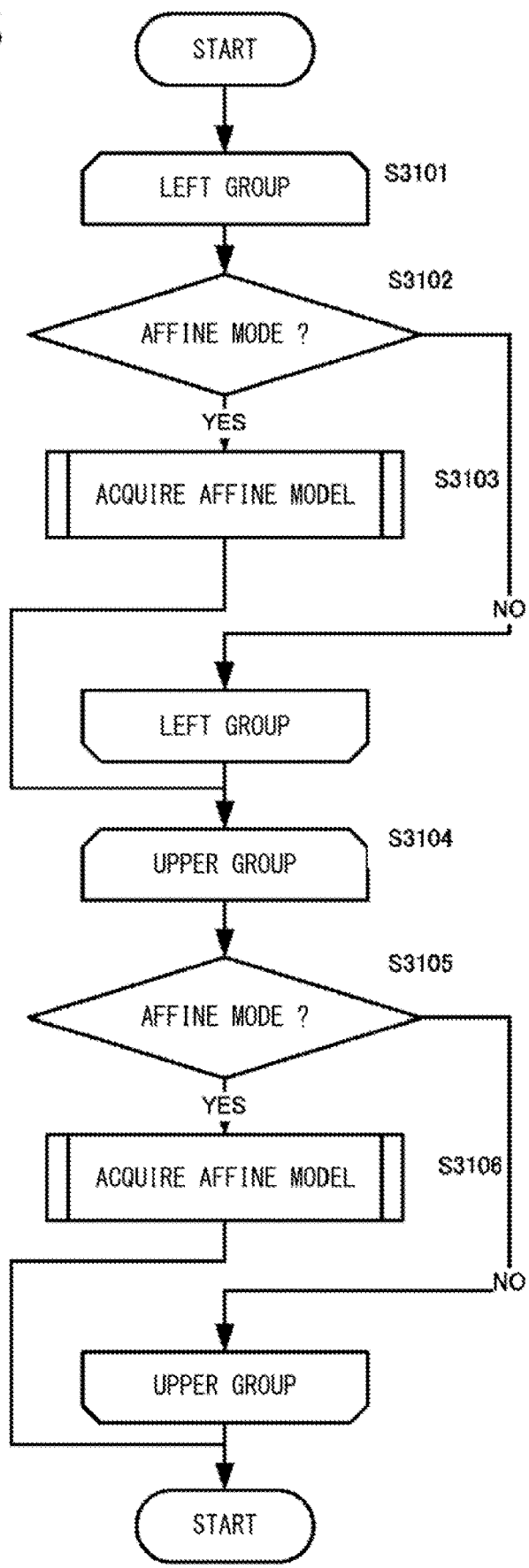
FIG. 46 is a flowchart for describing affine inheritance motion vector predictor candidate derivation.

FIG. 46 is a flowchart of affine inheritance motion vector predictor candidate derivation.

First, the blocks (A0 and A1) adjacent to the left side of the coding/decoding target block are set as a left group (S3101) and it is determined whether or not a block including A0 is a block using affine guarantee (in the affine mode) (S3102). When A0 is in the affine mode (S3102: YES), an affine model used by A0 is acquired (S3103) and the process moves to processing of blocks adjacent to the upper side of the coding/decoding target block. When A0 is not in the affine mode (S3102: NO), a target of the affine inheritance motion vector predictor candidate derivation is set to A0→A1 and the acquisition of the affine mode from a block including A1 is attempted.

Subsequently, the blocks (B0, B1, and B2) adjacent to the upper side of the coding/decoding target block are set as an upper group (S3104) and it is determined whether or not a block including B0 is in the affine mode (S3105). When B0 is in the affine mode (S3105: YES), an affine model used by B0 is acquired (S3106) and the process ends. When B0 is not in the affine mode (S3105: NO), a target of the affine inheritance motion vector predictor candidate derivation is set to B0→B1 and the acquisition of the affine mode from a block including B1 is attempted. Further, when B1 is not in the affine mode (S3105: NO), the target of the affine inheritance motion vector predictor candidate derivation is set to B1→B2 and the acquisition of the affine mode from a block including B2 is attempted.

In this manner, the groups are divided into the left block and the upper block, the affine model is searched for in the order of the lower left to upper left blocks with respect to the left block and the affine model is searched for in the order of the upper right to upper left blocks with respect to the left block, so that it is possible to acquire two affine models that are as different as possible and it is possible to derive an affine motion vector predictor candidate in which one of the affine motion vector predictors has a smaller difference motion vector, <Affine Construction Motion Vector Predictor Candidate Derivation>

The affine construction motion vector predictor candidate derivation unit 362 will be described. The affine construction motion vector predictor candidate derivation unit 362 is similar to the affine construction motion vector predictor candidate derivation unit 462.

The affine construction motion vector predictor candidate constructs the motion vector information of the affine control point from motion information of neighboring blocks in the spatial domain.

Figure 43:
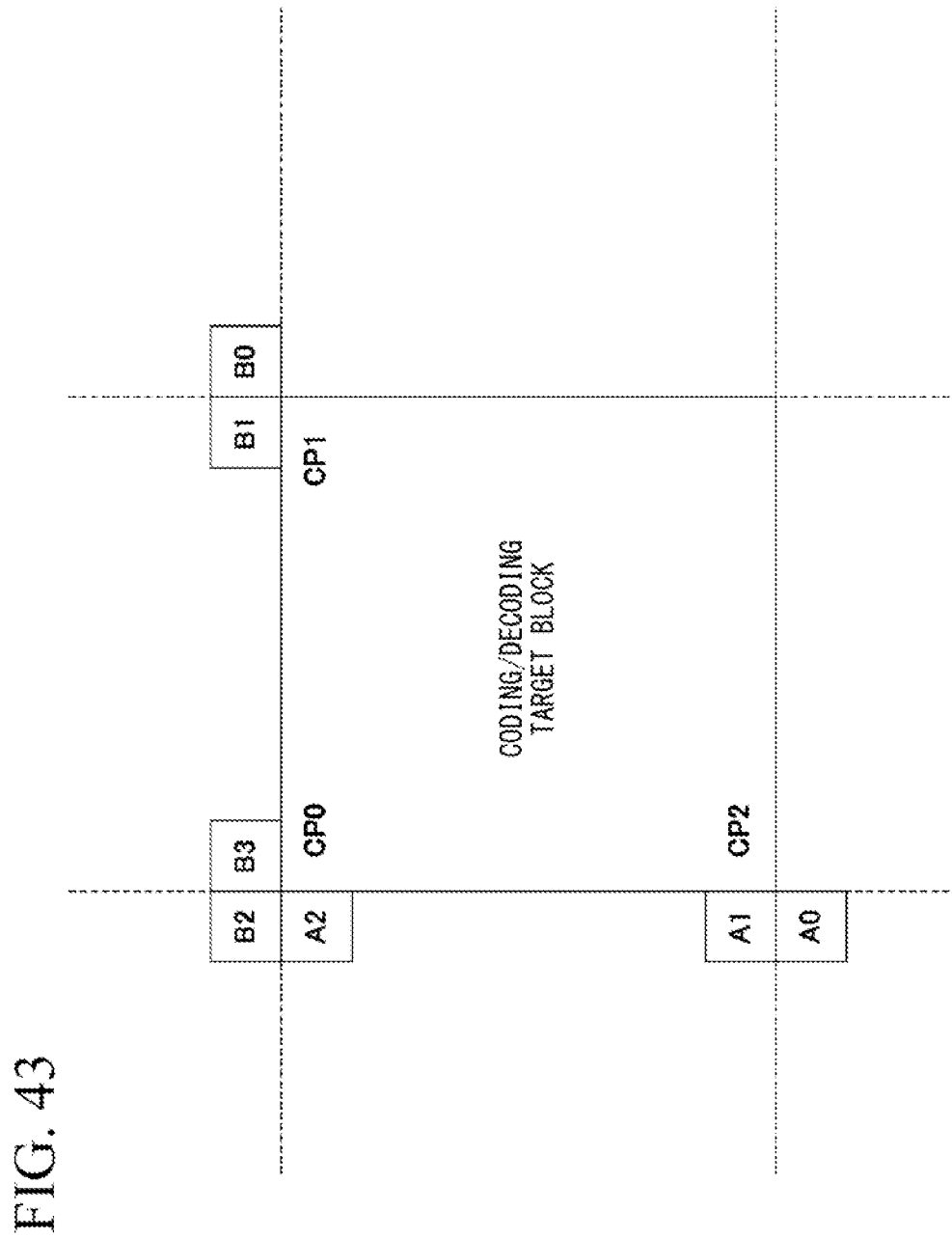
FIG. 43 is an explanatory diagram showing affine construction motion vector predictor candidate derivation.

FIG. 43 is an explanatory diagram showing affine construction motion vector predictor candidate derivation.

Affine construction motion vector predictor candidates can be obtained by constructing a new affine model by combining motion vectors of neighboring coded/decoded blocks in the spatial domain.

Specifically, a motion vector of an upper left affine control point CP0 is derived from the blocks (B2, B3, and A2) adjacent to an upper left side of the coding/decoding target block, a motion vector of an upper right affine control point CP1 is derived from the blocks (B1 and B0) adjacent to an upper right side of the coding/decoding target block, and a motion vector of a lower left affine control point CP2 is derived from the blocks (A1 and A0) adjacent to a lower left side of the coding/decoding target block.

Figure 47:
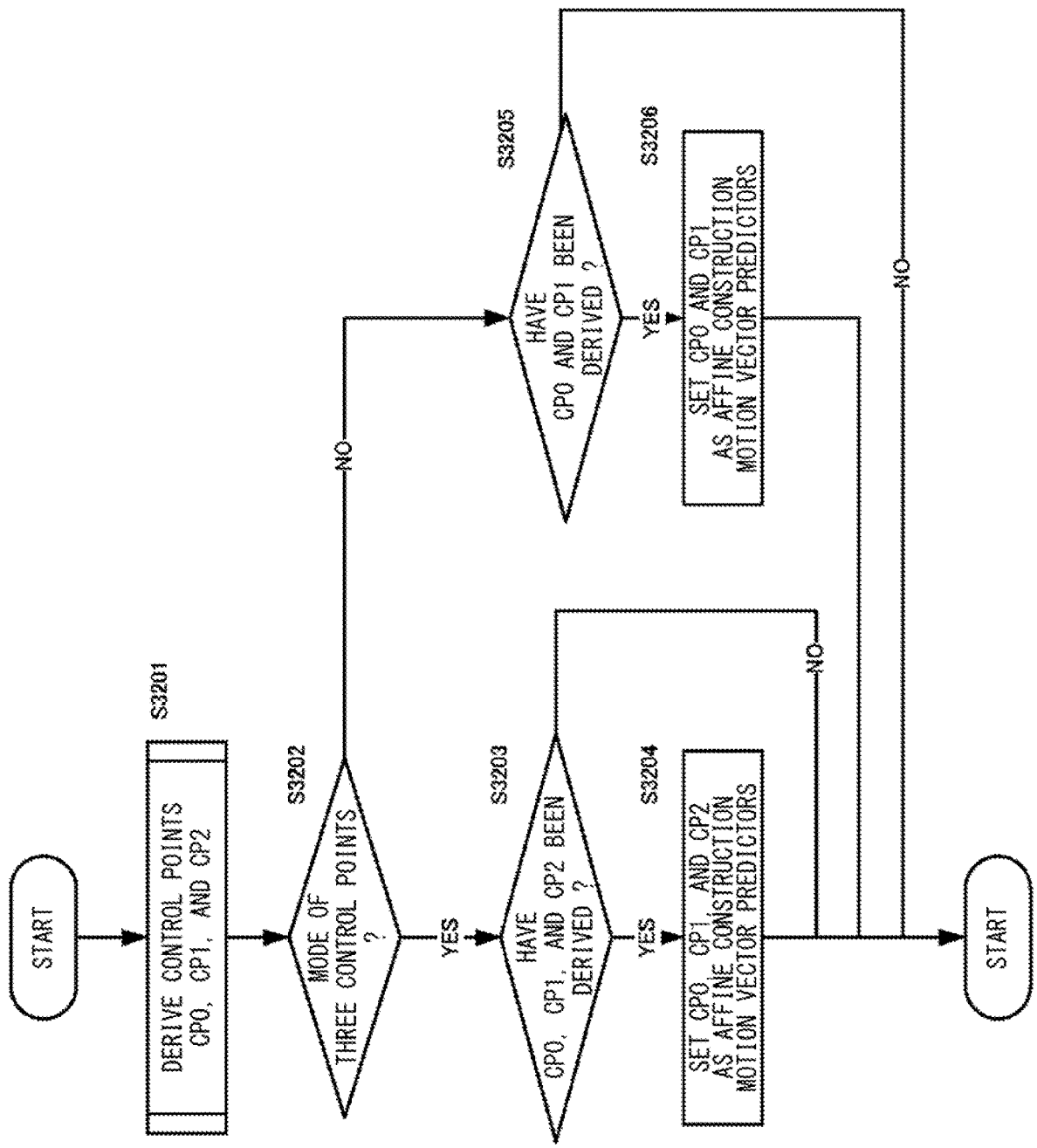
FIG. 47 is a flowchart for describing affine construction motion vector predictor candidate derivation.

FIG. 47 is a flowchart of affine construction motion vector predictor candidate derivation.

First, the upper left control point CP0, the upper right control point CP1, and the lower left affine control point CP2 are derived (S3201). The upper left affine control point CP0 is calculated by searching for a reference block having the same reference picture as the coding/decoding target block in the order of priority of B2, B3, and A2 reference blocks. The upper right affine control point CP1 is calculated by searching for a reference block having the same reference picture as the coding/decoding target block in the order of priority of B1 and B0 reference blocks. The lower left affine control point CP2 is calculated by searching for a reference block having the same reference picture as the coding/decoding target block in the order of priority of A1 and A0 reference blocks.

When a mode of three affine control points is selected as the affine construction motion vector predictor (S3202: YES), it is determined whether or not three affine control points (CP0, CP1, and CP2) have all been derived (S3203). When three affine control points (CP0, CP1, and CP2) have all been derived (S3203: YES), an affine model using the three affine control points (CP0, CP1, and CP2) is set as an affine construction motion vector predictor (S3204). When a mode of the two affine control points is selected without selecting the mode of the three affine control points (S3202: NO), it is determined whether or not the two affine control points (CP0 and CP1) have all been derived (S3205). When the two affine control points (CP0 and CP1) have all been derived (S3205: YES), an affine model using the two affine control points (CP0 and CP1) is set as an affine construction motion vector predictor (S3206).

<Identical Affine Motion Vector Predictor Candidate Derivation>

The identical affine motion vector predictor candidate derivation unit 363 will be described. The identical affine motion vector predictor candidate derivation unit 363 is similar to the identical affine motion vector predictor candidate derivation unit 463.

The identical affine motion vector predictor candidate can be obtained by deriving the same motion vector at the affine control points.

Specifically, the identical affine motion vector predictor candidate can be obtained by deriving affine control point information and setting all affine control points to be the same as any one of the affine control points CP0 to CP2 as in the affine construction motion vector predictor candidate derivation unit 362/462. Also, the identical affine motion vector predictor candidate can be obtained by setting a temporal motion vector derived as in the normal motion vector predictor mode at all affine control points.

<Subblock-Based Merge Mode Derivation>

Subblock-based merge mode derivation will be described.

Figure 40:
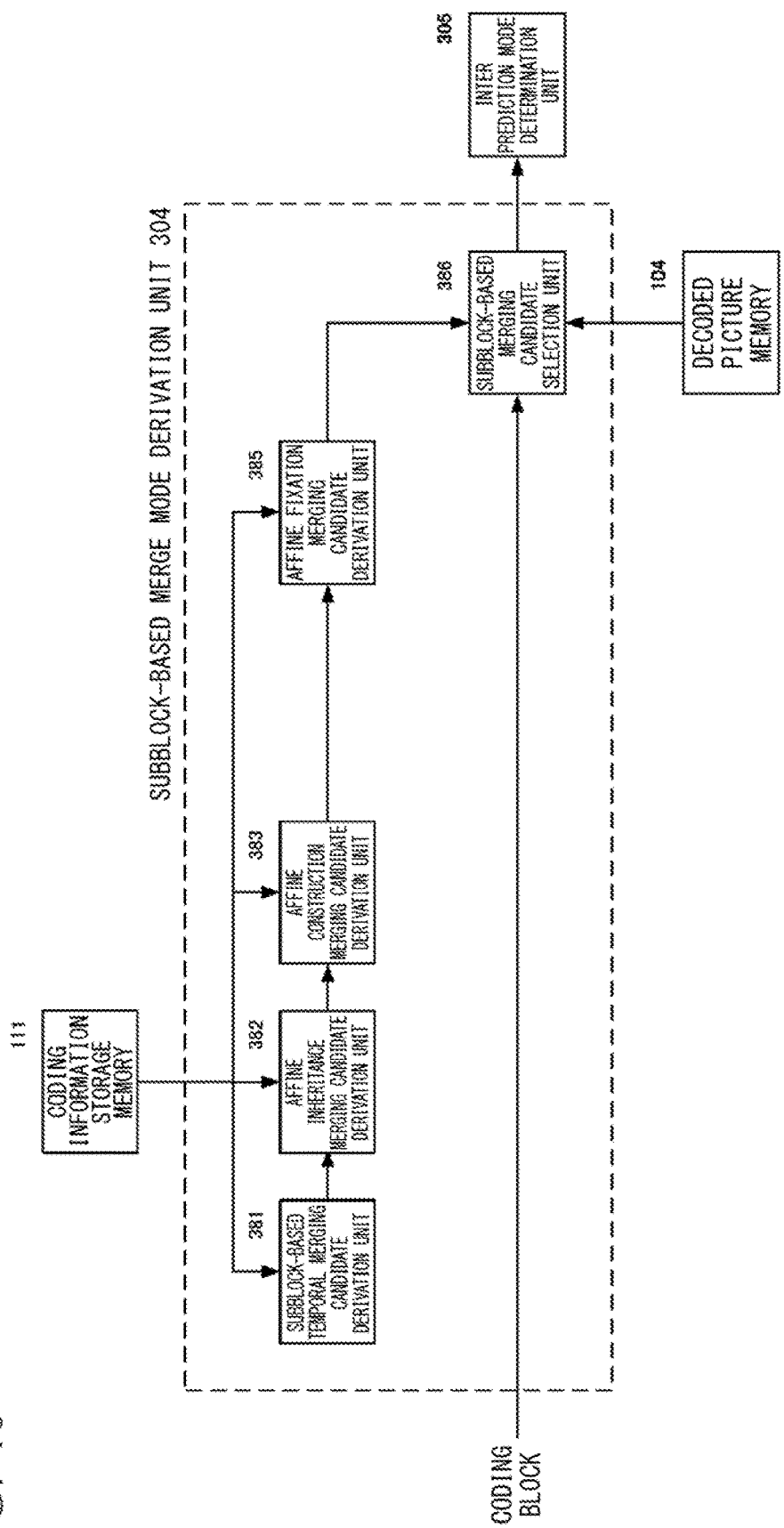
FIG. 40 is a block diagram of a subblock-based merge mode derivation unit 304 in the coding device of the present application.

FIG. 40 is a block diagram of the subblock-based merge mode derivation unit 304 in the coding device of the present application. The subblock-based merge mode derivation unit 304 includes a subblock-based merging candidate list subblockMergeCandList. The subblock-based merging candidate list subblockMergeCandList is similar to the merging candidate list mergeCandList in the normal merge mode derivation unit 302, except that candidate lists differ in units of subblocks.

First, a subblock-based temporal merging candidate derivation unit 381 derives a subblock-based temporal merging candidate. Details of the subblock-based temporal merging candidate derivation will be described below.

Subsequently, an affine inheritance merging candidate derivation unit 382 derives an affine inheritance merging candidate. Details of the affine inheritance merging candidate derivation will be described below.

Subsequently, an affine construction merging candidate derivation unit 383 derives an affine construction merging candidate. Details of the affine construction merging candidate derivation will be described below.

Subsequently, an affine fixation merging candidate derivation unit 385 derives an affine fixation merging candidate. Details of the affine fixation merging candidate derivation will be described below.

A subblock-based merging candidate selection unit 386 selects a subblock-based merging candidate from among subblock-based merging candidates derived by the subblock-based temporal merging candidate derivation unit 381, the affine inheritance merging candidate derivation unit 382, the affine construction merging candidate derivation unit 383, and the affine fixation merging candidate derivation unit 385 and supplies information about the selected subblock-based merging candidate to the inter prediction mode determination unit 305.

Figure 41:
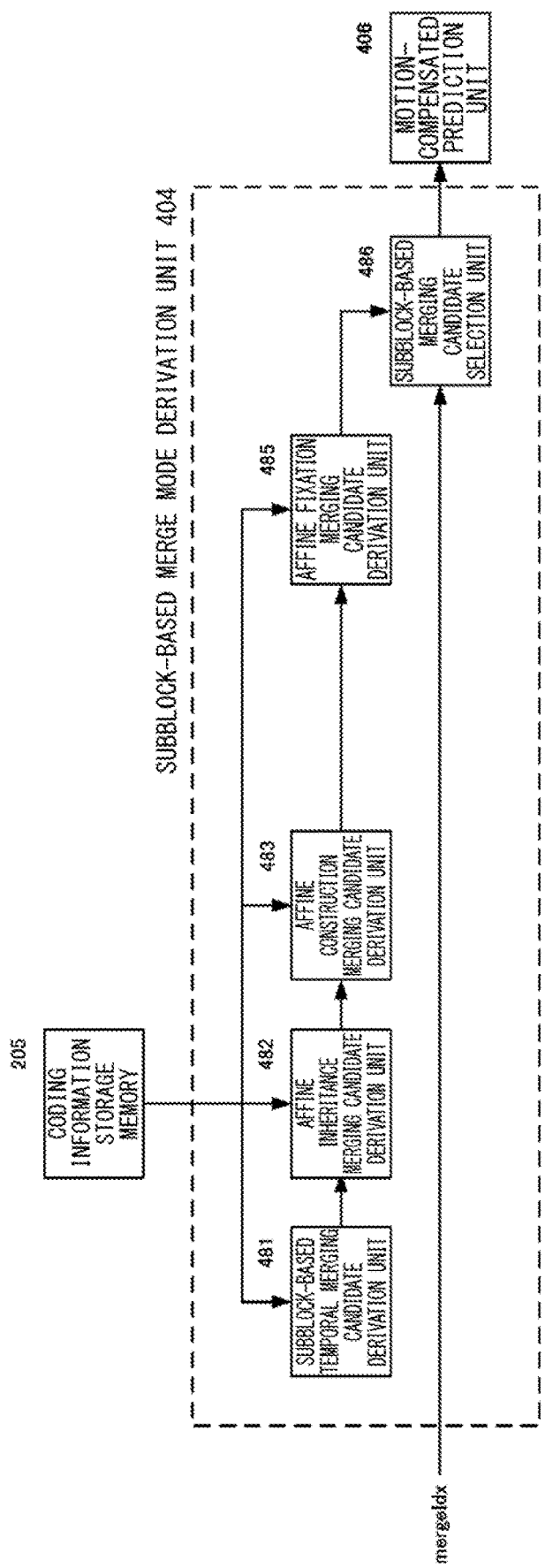
FIG. 41 is a block diagram of a subblock-based merge mode derivation unit 404 in the decoding device of the present application.

FIG. 41 is a block diagram of the subblock-based merge mode derivation unit 404 in the decoding device of the present application. The subblock-based merge mode derivation unit 404 includes a subblock-based merging candidate list subblockMergeCandList. This subblock-based merging candidate list subblockMergeCandList is the same as that of the subblock-based merge mode derivation unit 304.

First, a subblock-based temporal merging candidate derivation unit 481 derives a subblock-based temporal merging candidate. A process of the subblock-based temporal merging candidate derivation unit 481 is the same as the process of the subblock-based temporal merging candidate derivation unit 381.

Subsequently, an affine inheritance merging candidate derivation unit 482 derives an affine inheritance merging candidate. A process of the affine inheritance merging candidate derivation unit 482 is the same as the process of the affine inheritance merging candidate derivation unit 382.

Subsequently, an affine construction merging candidate derivation unit 483 derives an affine construction merging candidate. A process of the affine construction merging candidate derivation unit 483 is the same as the process of the affine construction merging candidate derivation unit 383.

Subsequently, an affine fixation merging candidate derivation unit 485 derives an affine fixation merging candidate. A process of the affine fixation merging candidate derivation unit 485 is the same as the process of the affine fixation merging candidate derivation unit 485.

A subblock-based merging candidate selection unit 486 selects a subblock-based merging candidate from among subblock-based merging candidates derived by the subblock-based temporal merging candidate derivation unit 481, the affine inheritance merging candidate derivation unit 482, the affine construction merging candidate derivation unit 483, and an affine fixation merging candidate derivation unit 485 on the basis of an index, which is transmitted from the coding device and is decoded, and supplies information about the selected subblock-based merging candidate to the motion-compensated prediction unit 406

<Subblock-Based Temporal Merging Candidate Derivation>

An operation of the subblock-based temporal merging candidate derivation unit 381 will be described below.

<Affine Inheritance Merging Candidate Derivation>

The affine inheritance merging candidate derivation unit 382 will be described. The affine inheritance merging candidate derivation unit 382 is similar to the affine inheritance merging candidate derivation unit 482.

The affine inheritance merging candidate inherits an affine model of affine control points from affine models of neighboring blocks in the spatial domain. The affine model is determined by sizes of neighboring blocks in the spatial domain and motion information of the affine control points.

Figure 44:
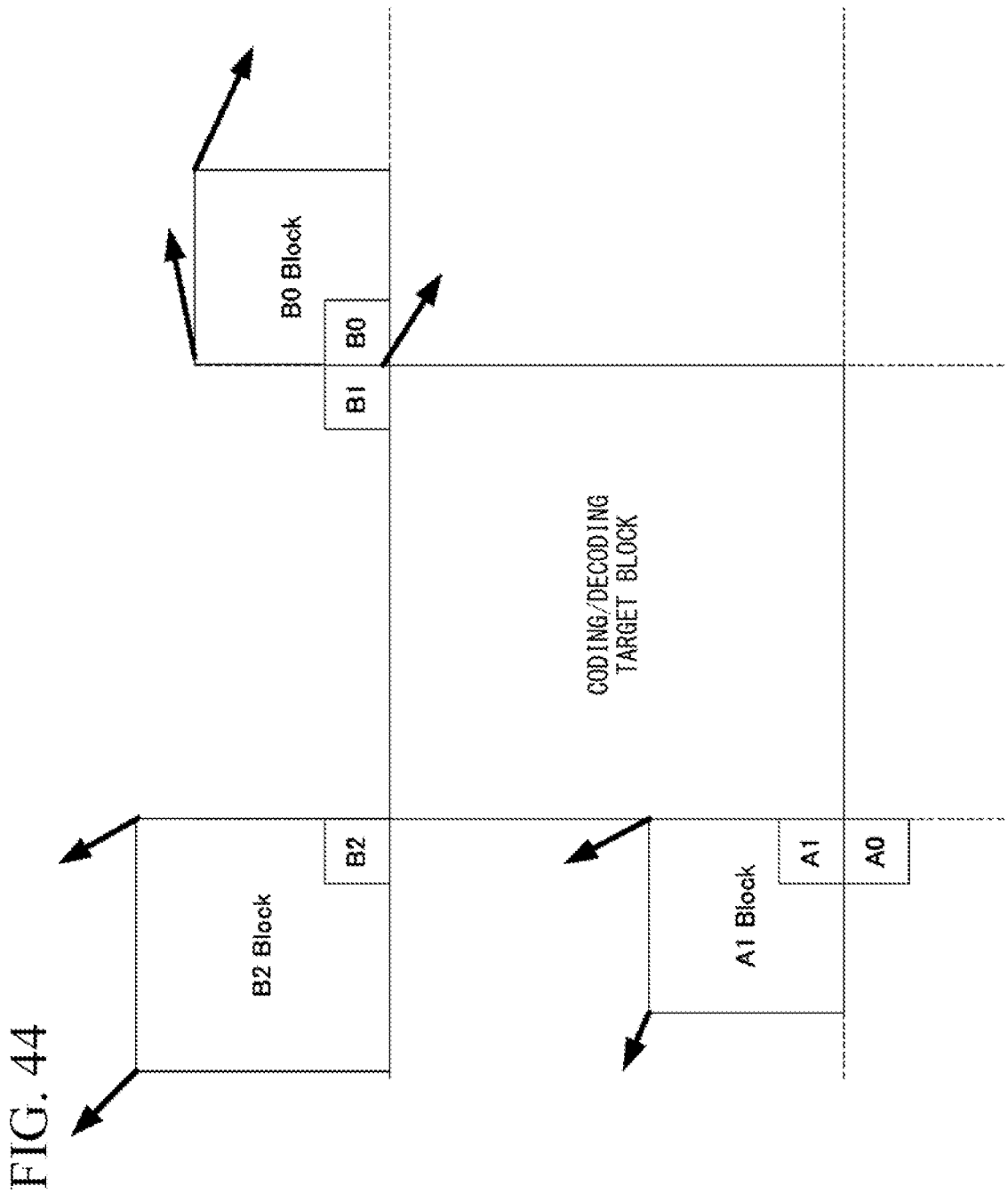
FIG. 44 is an explanatory diagram showing affine inheritance merging candidate derivation.

FIG. 44 is an explanatory diagram showing affine inheritance merging candidate derivation. An affine merge inheritance merge mode candidate can be derived by searching for motion vectors of affine control points of neighboring coded/decoded blocks in the spatial domain as in the affine inheritance motion vector predictor derivation.

Specifically, a maximum of one affine mode is searched for from each of blocks (A0 and A1) adjacent to a left side of a coding/decoding target block and blocks (B0, B1, and B2) adjacent to an upper side of the coding/decoding target block and is used for an affine merge mode.

Figure 48:
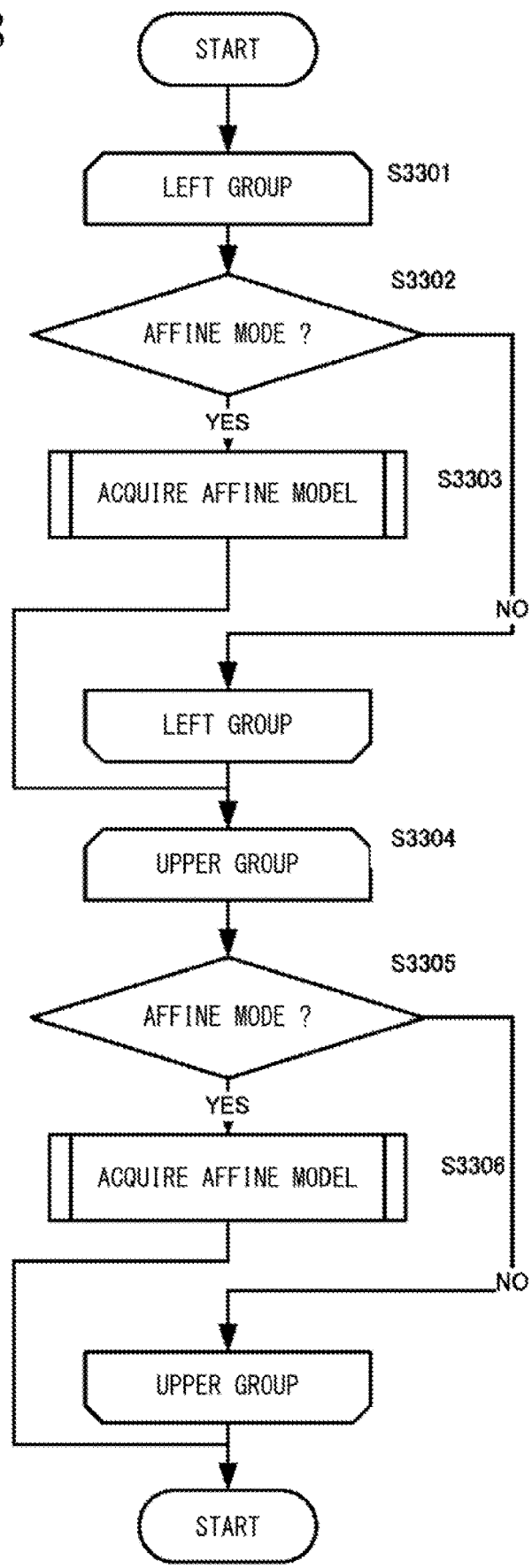
FIG. 48 is a flowchart for describing affine inheritance merging candidate derivation.

FIG. 48 is a flowchart of affine inheritance merging candidate derivation.

First, the blocks (A0 and A1) adjacent to the left side of the coding/decoding target block are set as a left group (S3301) and it is determined whether or not a block including A0 is in the affine mode (S3302). When A0 is in the affine mode (S3102: YES), the affine model used by A0 is acquired (S3303) and the process moves to processing of blocks adjacent to the upper side of the coding/decoding target block. When A0 is not in the affine mode (S3302: NO), a target of the affine inheritance merging candidate derivation is set to A0→A1 and the acquisition of the affine mode from a block including A1 is attempted.

Subsequently, the blocks (B0, B1, and B2) adjacent to the upper side of the coding/decoding target block are set as an upper group (S3304) and it is determined whether or not a block including B0 is in the affine mode (S3305). When B0 is in the affine mode (S3305: YES), the affine model used by B0 is acquired (S3306) and the process ends. When B0 is not in the affine mode (S3305: NO), a target of the affine inheritance merging candidate derivation is set to B0→B1 and the acquisition of the affine mode from a block including B1 is attempted. Further, when B1 is not in the affine mode (S3305: NO), the target of the affine inheritance merging candidate derivation is set to B1→B2 and the acquisition of the affine mode from a block including B2 is attempted.

<Affine Construction Merging Candidate Derivation>

The affine construction merging candidate derivation unit 383 will be described. The affine construction merging candidate derivation unit 383 is similar to the affine construction merging candidate derivation unit 483.

Figure 45:
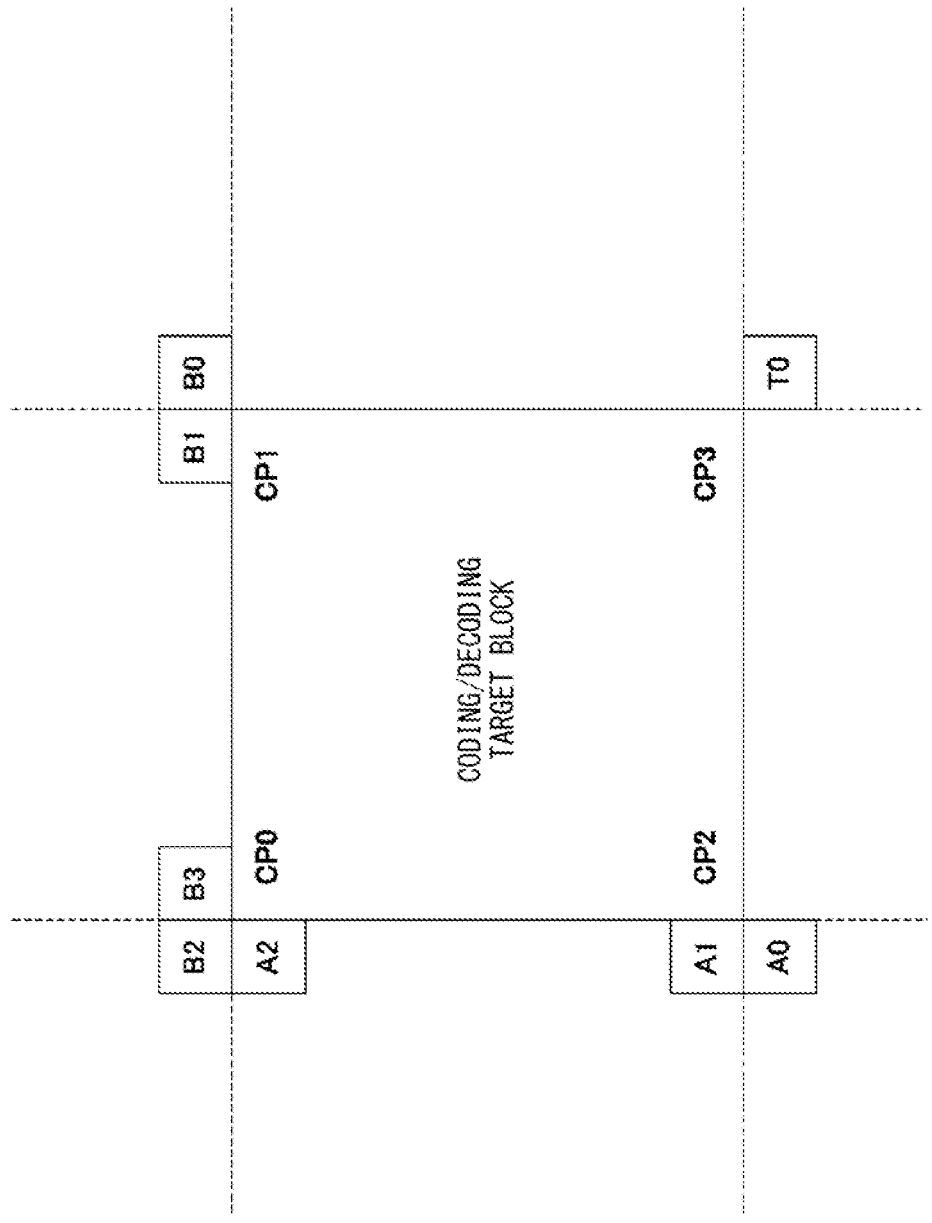
FIG. 45 is a diagram showing affine construction merging candidate derivation.

FIG. 45 is an explanatory diagram showing affine construction merging candidate derivation. An affine construction merging candidate constructs an affine model of affine control points from motion information of neighboring blocks in the spatial domain and a temporal coding block.

Specifically, a motion vector of an upper left affine control point CP0 is derived from the blocks (B2, B3, and A2) adjacent to an upper left side of the coding/decoding target block, a motion vector of an upper right affine control point CP1 is derived from the blocks (B1 and B0) adjacent to an upper right side of the coding/decoding target block, a motion vector of a lower left affine control point CP2 is derived from the blocks (A1 and A0) adjacent to a lower left side of the coding/decoding target block, and a motion vector of a lower right affine control point CP3 is derived from the temporal coding block (T0) adjacent to a lower right side of the coding/deciding target block.

FIG. 49 is a flowchart of affine construction merging candidate derivation.

First, the upper left affine control point CP0, the upper right affine control point CP1, the lower left affine control point CP2, and the lower right affine control point CP3 are derived (S3401). The upper left affine control point CP0 is calculated by searching for blocks having motion information in the order of priority of B2, B3, and A2 blocks. The upper right affine control point CP1 is calculated by searching for blocks having motion information in the order of priority of B1 and B0 blocks. The lower left affine control point CP2 is calculated by searching for blocks having motion information in the order of priority of A1 and A0 blocks. The lower right affine control point CP3 is calculated by searching for motion information of time blocks.

Subsequently, it is determined whether or not an affine model of three affine control points can be constructed by the derived upper left affine control point CP0, the derived upper right affine control point CP1, and the derived lower left affine control point CP2 (S3402). When the affine model can be constructed (S3402: YES), the affine model of the three affine control points based on the upper left affine control point CP0, the upper right affine control point CP1, and the lower left affine control point CP2 is set as an affine merge candidate (S3403).

Subsequently, it is determined whether or not an affine model of three affine control points can be constructed by the derived upper left affine control point CP0, the derived upper right affine control point CP1, and the derived lower right affine control point CP3 (S3404). When the affine mode can be constructed (S3404: YES), the affine model of the three affine control points based on the upper left affine control point CP0, the upper right affine control point CP1, and the lower right affine control point CP3 is set as an affine merge candidate (S3405).

Subsequently, it is determined whether or not an affine model of three affine control points can be constructed by the derived upper left affine control point CP0, the derived lower left affine control point CP2, and the derived lower right affine control point CP3 (S3406). When the affine model can be constructed (S3406: YES), the affine model of the three affine control points based on the upper left affine control point CP0, the lower left affine control point CP2, and the lower right affine control point CP3 is set as an affine merge candidate (S3407).

Subsequently, it is determined whether or not an affine model of two affine control points can be constructed by the derived upper left affine control point CP0 and the derived upper right affine control point CP1 (S3408). When the affine model can be constructed (S3408: YES), the affine model of the two affine control points based on the upper left affine control point CP0 and the upper right affine control point CP1 is set as an affine merge candidate (S3409).

Subsequently, it is determined whether or not an affine model of two affine control points can be constructed by the derived upper left affine control point CP0 and the derived lower left affine control point CP2 (S3410). When the affine model can be constructed (S3410: YES), the affine model of the two affine control points based on the upper left affine control point CP0 and the lower left affine control point CP2 is set as an affine merge candidate (S3411).

Here, it is determined whether or not an affine model is to be constructed under the following conditions.

1. The reference pictures of all affine control points are the same. (An affine transform is possible)
2. A different motion vector is provided at at least one affine control point. (Expression by a parallel shift is difficult)

As described above, in the first embodiment, the upper left affine control point CP0 is included with respect to all the affine construction merging candidates. At the upper left affine control point CP0, a possibility that there is a coded/decoded block is highest, i.e., a possibility that there is motion information is highest, when a picture is processed in raster scan order from left to right and from top to bottom.

By deriving the affine construction merging candidate using the upper left affine control point CP0, an amount of processing for determining whether or not reference pictures are the same when the affine control points are combined is reduced. Also, in the derivation of the affine control points of the upper right affine control point CP1, the lower left affine control point CP2, and the lower right affine control point CP3 (S3401), it is possible to preferentially search for a reference picture which is the same as that of the upper left affine control point CP0. In this case, affine construction merging candidates having the same reference picture can be derived, valid affine construction merging candidates with the same reference picture can be derived, and affine merge candidates with high coding efficiency can be derived.

Here, the determination of the reference picture based on the upper left affine control point CP0 will be described in more detail.

Figure 62:
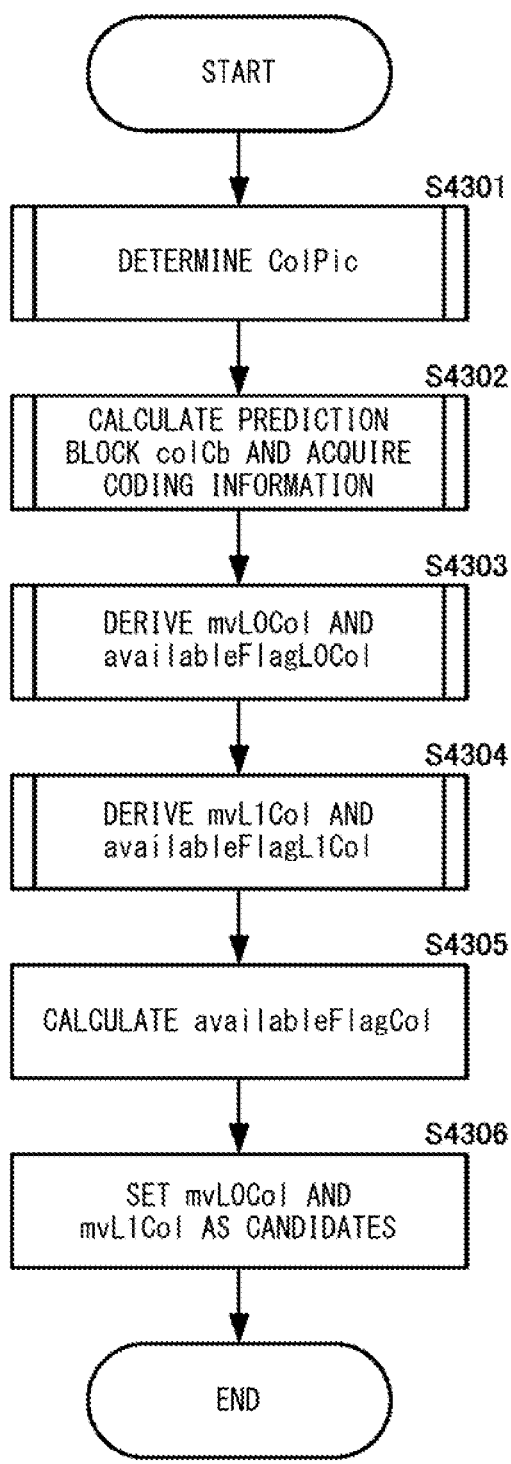
FIG. 62 is a flowchart for describing a temporal merging candidate derivation process.
Figure 63:
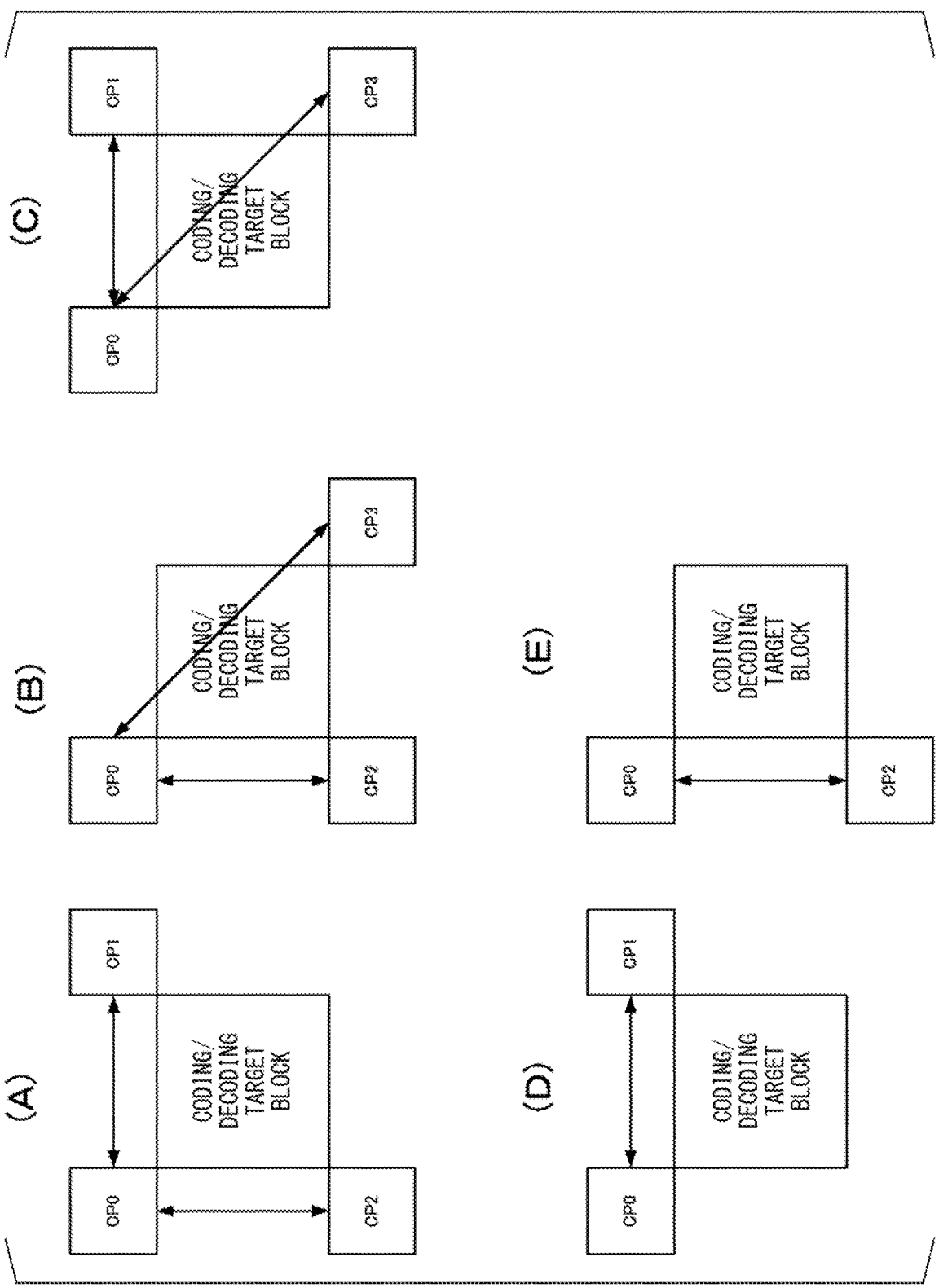
FIG. 63 is a diagram showing comparative targets of motion information in affine construction merging candidate derivation.

FIG. 62 is a diagram showing comparative targets of motion information when an affine construction merging candidate is derived by combining the derived affine control points in the affine construction merging candidate derivation.

FIG. 62(A) is a diagram of a case in which an affine model of three affine control points is constructed by the upper left affine control point CP0, the upper right affine control point CP1, and the lower left affine control point CP2. In this case, the motion information of the upper left affine control point CP0 and the upper right affine control point CP1 is compared and a comparison is made regarding whether the reference pictures of the upper left affine control point CP0 and the upper right affine control point CP1 are the same and whether the motion vectors of the upper left affine control point CP0 and the upper right affine control point CP1 are different. Likewise, the motion information of the upper left affine control point CP0 and the lower left affine control point CP2 is compared.

FIG. 62(B) is a diagram of a case in which an affine model of three affine control points is constructed by the upper left affine control point CP0, the lower left affine control point CP2, and the lower right affine control point CP3. In this case, the motion information of the upper left affine control point CP0 and the lower left affine control point CP2 is compared and the motion information of the upper left affine control point CP0 and the lower right affine control point CP3 is compared.

FIG. 62(C) is a diagram of a case in which an affine model of three affine control points is constructed by the upper left affine control point CP0, the upper right affine control point CP1, and the lower right affine control point CP3. In this case, the motion information of the upper left affine control point CP0 and the upper right affine control point CP1 is compared and the motion information of the upper left affine control point CP0 and the lower right affine control point CP3 is compared.

FIG. 62(D) is a diagram of a case in which an affine model of two affine control points is constructed by the upper left affine control point CP0 and the upper right affine control point CP1. In this case, the motion information of the upper left affine control point CP0 and the upper right affine control point CP1 is compared.

FIG. 62(E) is a diagram of a case in which an affine model of two affine control points is constructed by the upper left affine control point CP0 and the lower left affine control point CP2. In this case, the motion information of the upper left affine control point CP0 and the lower left affine control point CP2 is compared.

In this manner, in all combinations of affine construction merging candidate derivation, the motion information of the upper left affine control point CP0 and each affine control point CPx (x=1, 2, 3) is compared and it is determined whether or not the reference pictures are the same and the affine transform is possible.

<Affine Fixation Merging Candidate Derivation>

The affine fixation merging candidate derivation unit 385 will be described. The affine fixation merging candidate derivation unit 385 is similar to the affine fixation merging candidate derivation unit 485. In the affine fixation merging candidate, the motion information of the affine control point is fixed with fixed motion information. Specifically, the motion vector of each affine control point is fixed at (0, 0).

<Temporal Motion Vector Predictor>

Figure 55:
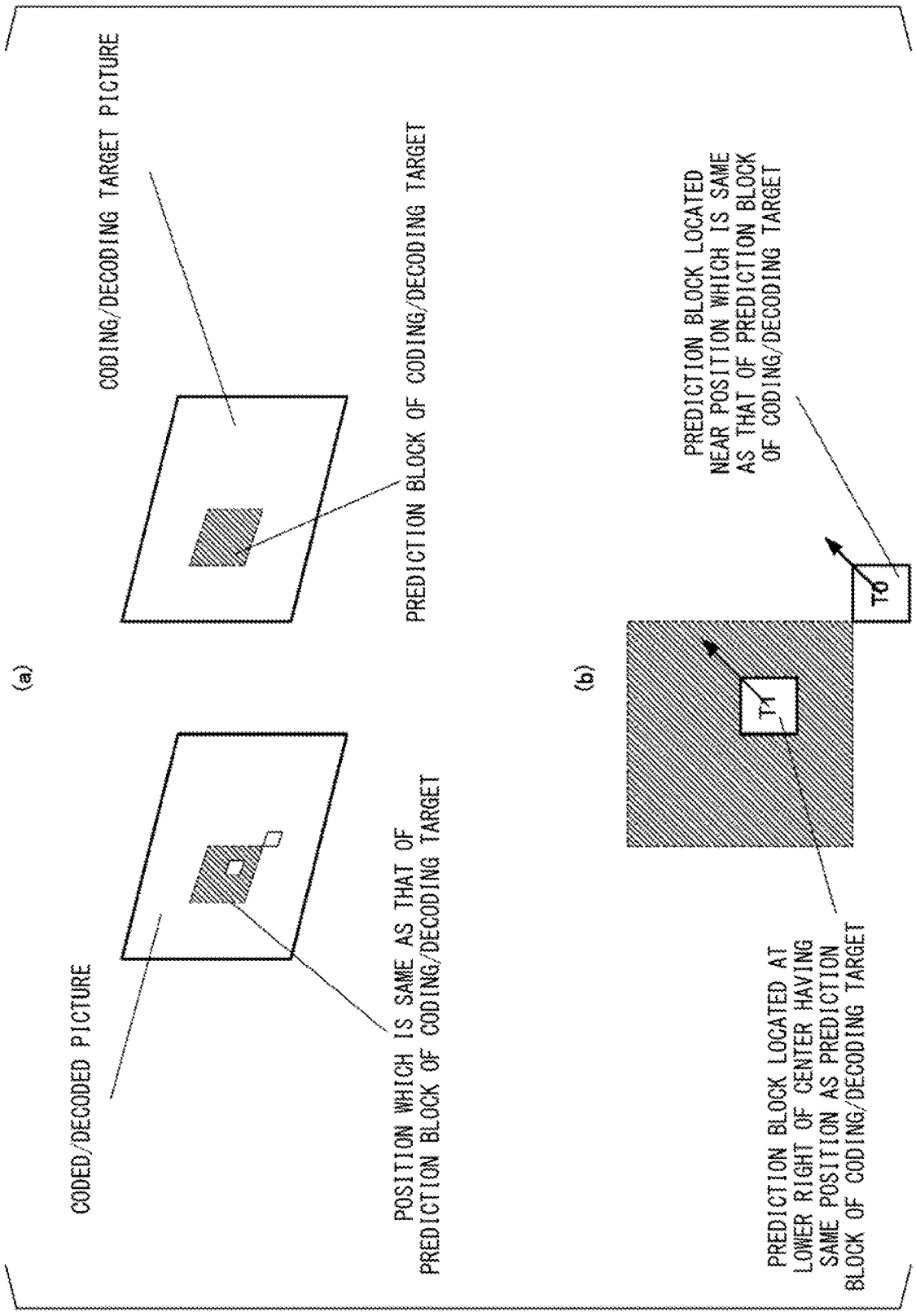
FIG. 55 is an explanatory diagram showing a temporal context relationship between pictures.

Prior to the description of the temporal motion vector predictor, a temporal context relationship between pictures will be described. FIG. 55(*a*) shows a relationship in which a coding block of a coding target and a coding target picture are coded pictures different in a time domain. In a coding target picture, a specific coded picture referred to for coding is defined as ColPic. ColPic is identified by syntax.

Also, FIG. 55(*b*) shows a coded coding block located at the same position as the coding target coding block and in the vicinity thereof in ColPic. Coding blocks T0 and T1 are coding blocks at substantially the same position in a picture different from the coding target picture in the time domain.

Although the description of the temporal context of the picture described above is for coding, the same is true for decoding. That is, at the time of decoding, the coding in the above description is replaced with decoding and similar description is given.

Figure 56:
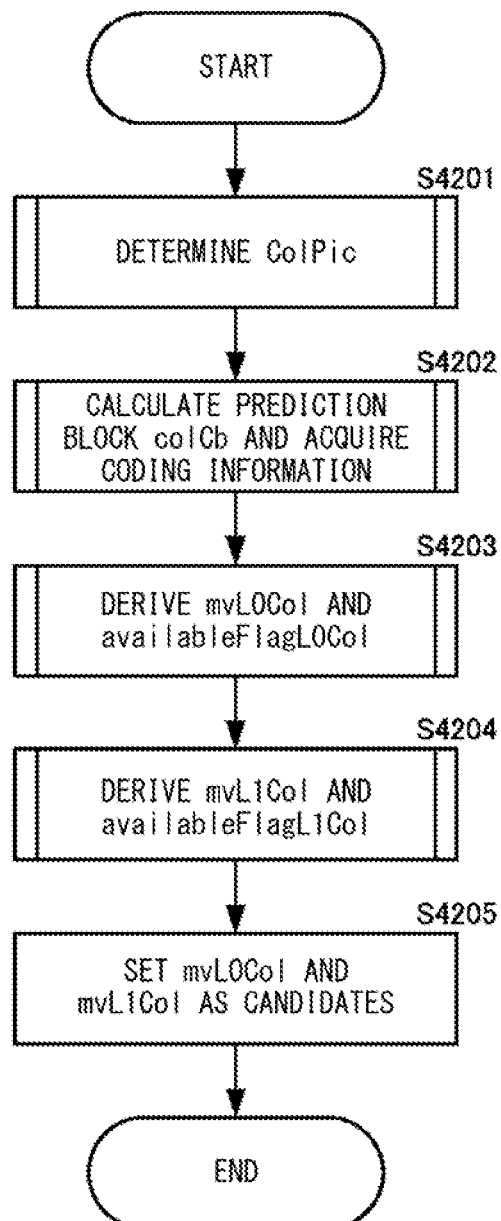
FIG. 56 is a flowchart for describing a temporal motion vector predictor candidate derivation process of a normal motion vector predictor mode derivation unit 301.

The operation of the temporal motion vector predictor candidate derivation unit 322 in the normal motion vector predictor mode derivation unit 301 of FIG. 17 will be described with reference to FIG. 56.

Figure 57:
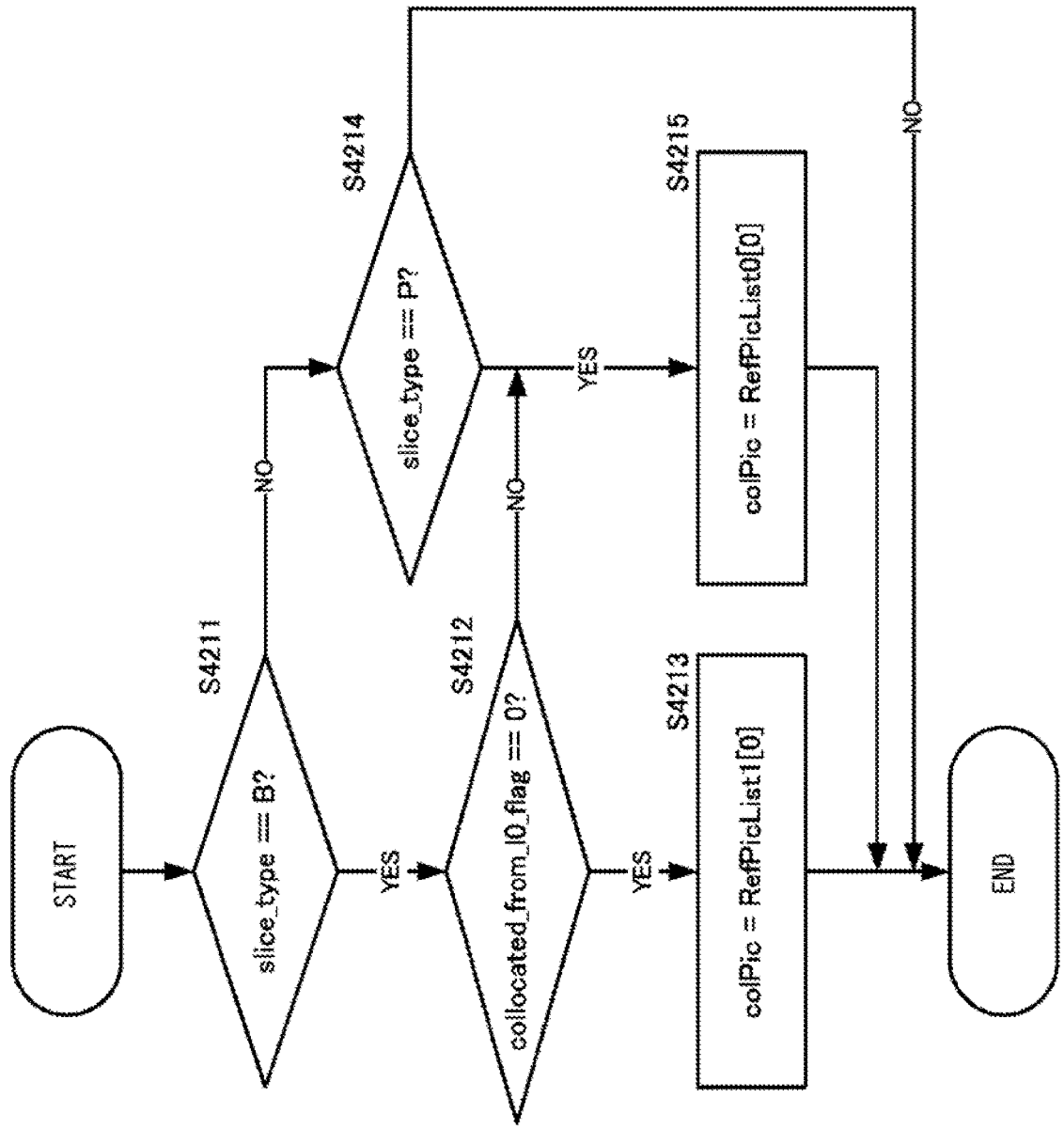
FIG. 57 is a flowchart for describing a ColPic derivation process in the temporal motion vector predictor candidate derivation process of the normal motion vector predictor mode derivation unit 301.

First, ColPic is derived (step S4201). The derivation of ColPic will be described with reference to FIG. 57.

When a slice type slice_type is a B slice and a flag collocated_from_l0_flag is 0 (step S4211: YES and step S4212: YES), a picture whose reference index is 0 in RefPicList1[0], i.e., the reference list L1, becomes a picture colPic at a different time (step S4213). Otherwise, i.e., when the slice type slice_type is a B slice and the above-described flag collocated_from_l0_flag is 1 (step S4211: YES and step S4212: NO), or when the slice type slice_type is a P slice (step S4211: NO and step S4214: YES), a picture whose reference index is 0 in RefPicList0[0], i.e., the reference list L0, becomes the picture colPic at the different time (step S4215). When slice_type is not a P slice (step S4214: NO), the process ends.

Figure 58:
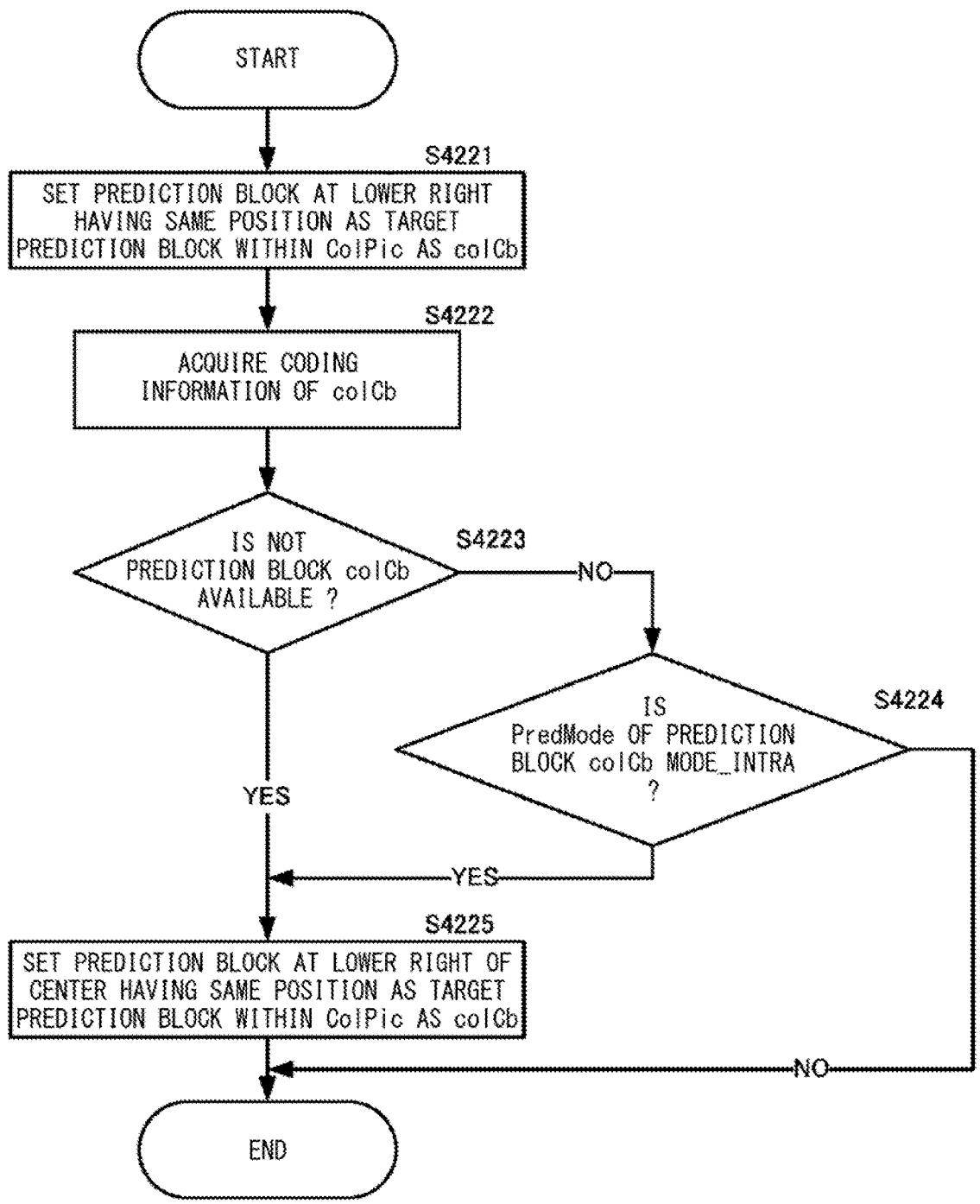
FIG. 58 is a flowchart for describing a ColPic coding information derivation process in the temporal motion vector predictor candidate derivation process of the normal motion vector predictor mode derivation unit 301.

FIG. 56 is referred to again. After ColPic is derived, a coding block colCb is derived and coding information thereof is acquired (step S4202). This process will be described with reference to FIG. 58.

First, a coding block located at the lower right (outside) having the same position as a target coding block within the picture colPic at the different time is set as the coding block colCb at the different time (step S4221). This coding block corresponds to the coding block T0 of FIG. 49.

Next, coding information of the coding block colCb at the different time is acquired (step S4222). When a prediction mode PredMode of the coding block colCb at the different time is not available or the prediction mode PredMode of the coding block colCb at the different time is intra prediction (MODE_INTRA) (step S4223: NO and step S4224: YES), a coding block located at the lower right of the center having the same position as the target coding block within the picture colPic at the different time is set as the coding block colCb at the different time (step S4225). This coding block corresponds to the coding block T1 of FIG. 55.

Figure 59:
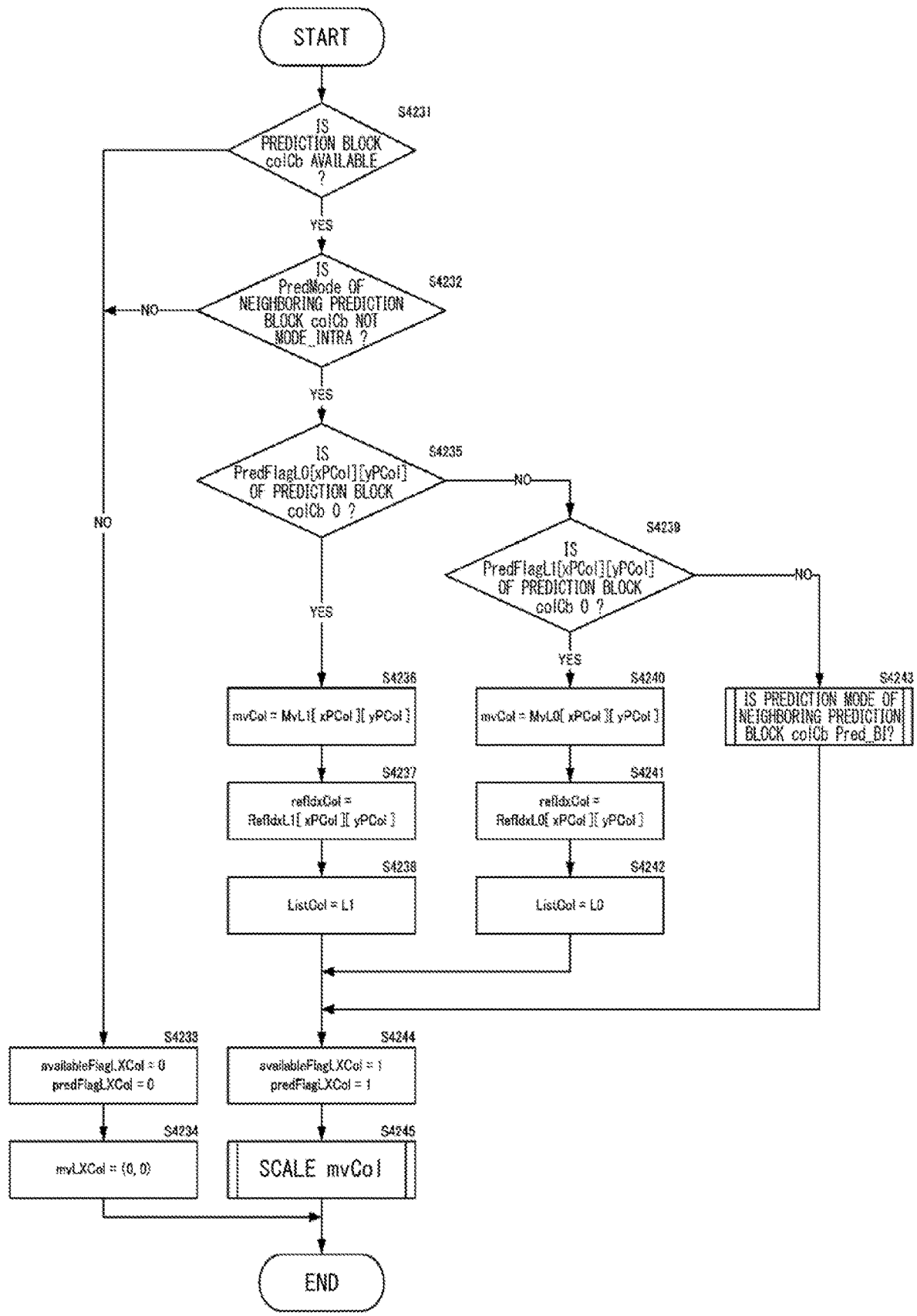
FIG. 59 is a flowchart for describing an inter prediction information derivation process.

FIG. 56 is referred to again. Next, inter prediction information is derived for each reference list (S4203 and S4204). Here, the motion vector mvLXCol for each reference list and the flag availableFlagLXCol indicating whether or not the coding information is valid are derived with respect to the coding block colCb. LX indicates a reference list, LX becomes L0 in the derivation of reference list 0, and LX becomes L1 in the derivation of reference list 1. Derivation of the inter prediction information will be described with reference to FIG. 59.

When the coding block colCb at the different time is not available (S4231S4231: NO) or when the prediction mode PredMode is intra prediction (MODE_INTRA) (S4232: NO), both the flag availableFlagLXCol and a flag predFlagLXCol are set to 0 (step S4233). The motion vector mvLXCol is set to (0, 0) (S4234) and the process ends.

When the coding block colCb is available (S4231: YES) and the prediction mode PredMode is not intra prediction (MODE_INTRA) (S4232: YES), mvCol, refIdxCol, and availableFlagCol are calculated in the following procedure.

When a flag PredflagL0[xPCol][yPCol] indicating whether or not the L0-prediction of the coding block colCb is used is 0 (S4235: YES), the prediction mode of the coding block colCb is Pred_L1, so the motion vector mvCol is set to have the same value as MvL1[xPCol][yPCol] which is the motion vector of L1 of the coding block colCb (S4236), the reference index refIdxCol is set to have the same value as the reference index RefIdxL1[xPCol][yPCol] of L1 (S4237), and the list ListCol is set to L1 (S4238). Here, xPCol and yPCol are indices indicating a position of the upper left sample of the coding block colCb in the picture colPic at the different time.

On the other hand, when the L0-prediction flag PredFlagL0[xPCol][yPCol] of the coding block colCb is not 0 (S4235: NO), it is determined whether or not the L1-prediction flag PredFlagL1[xPCol][yPCol] of the coding block colCb is 0. When the L1-prediction flag PredFlagL1[xPCol][yPCol] of the coding block colCb is 0 (S4239: YES), the motion vector mvCol is set to have the same value as MvL0[xPCol][yPCol] which is the motion vector of L0 of the coding block colCb (S4240), the reference index refIdxCol is set to have the same value as the reference index RefIdxL0[xPCol][yPCol] of L0 (S4241), and the list ListCol is set to L0 (S4242).

Figure 60:
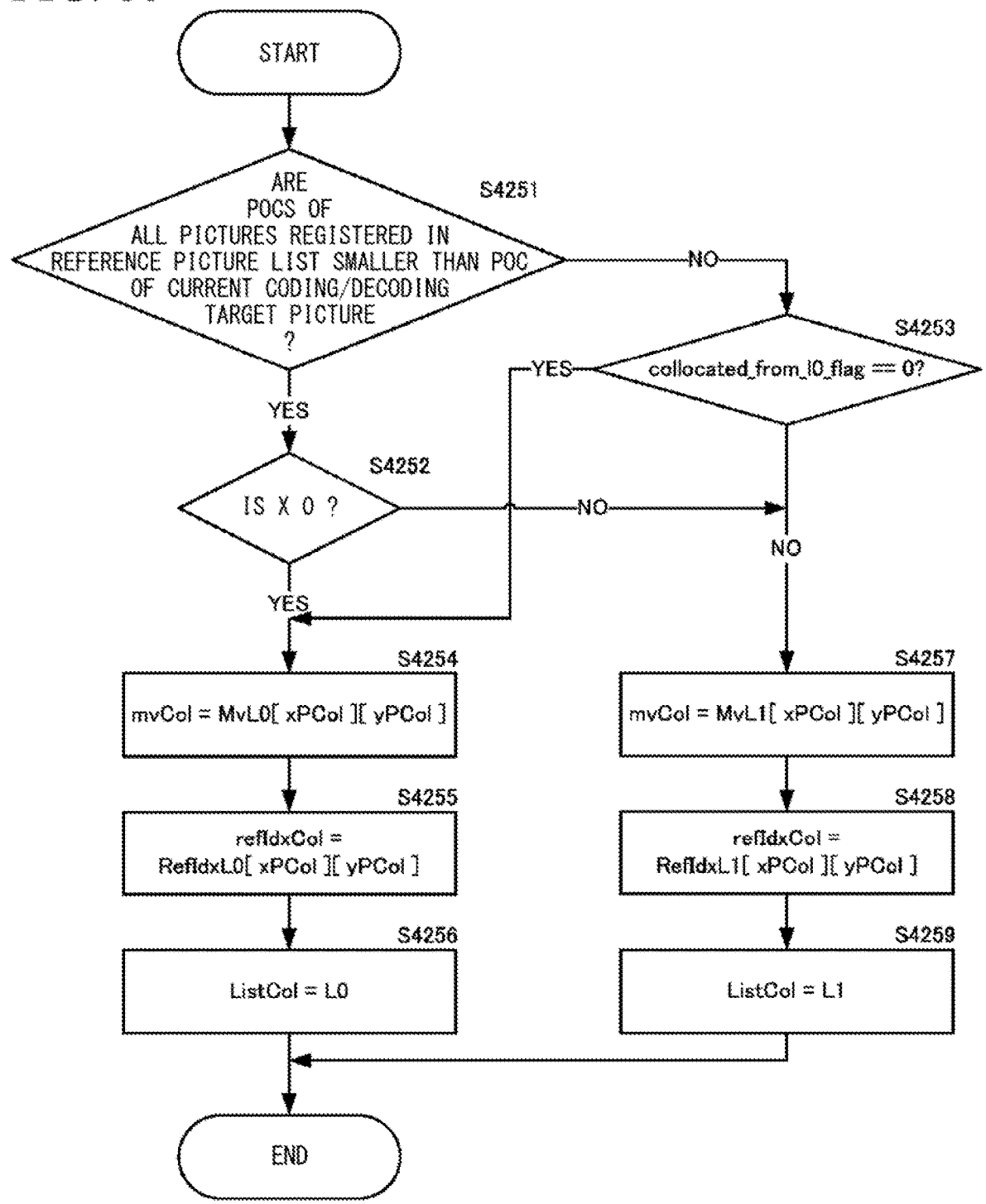
FIG. 60 is a flowchart showing a processing procedure for deriving inter prediction information of a coded block when the inter prediction mode of a coding block colCb is bi-prediction (Pred_BI).

When the L0-prediction flag PredFlagL0[xPCol][yPCol] of the coding block colCb and the L1-prediction flag PredFlagL1[xPCol][yPCol] of the coding block colCb are both non-zero (S4235: NO and S4239: NO), one of two motion vectors of L0 and L1 is selected because the inter prediction mode of the coding block colCb is bi-prediction (Pred_BI) (S4243). FIG. 60 is a flowchart showing a processing procedure for deriving the inter prediction information of the coding block when the inter prediction mode of the coding block colCb is bi-prediction (Pred_BI).

First, it is determined whether or not POCs of all pictures registered in all reference lists are smaller than a POC of a current coding target picture (S4251). When the POCs of all the pictures registered in L0 and L1, which are all the reference lists of the coding block colCb, are smaller than the POC of the current coding target picture (S4251: YES), the inter prediction information of L0 of the coding block colCb is selected if LX is L0, i.e., a vector predictor candidate of the motion vector of L0 of the coding block of the coding target is derived (S4252: YES) and the inter prediction information of L1 of the coding block colCb is selected if LX is L1, i.e., the vector predictor candidate of the motion vector of L1 of the coding block of the coding target is derived (S4252: NO). On the other hand, when at least one of the POCs of the pictures registered in all the reference lists L0 and L1 of the coding block colCb is larger than the POC of the current coding target picture (S4251: NO), the inter prediction information of L0 of the coding block colCb is selected if the flag collocated_from_l0_flag is 0 (S4253: YES) and the inter prediction information of L1 of the coding block colCb is selected if the flag collocated_from_l0_flag is 1 (S4253: NO).

When the inter prediction information of L0 of the coding block colCb is selected (S4252: YES and S4253: YES), the motion vector mvCol is set to have the same value as MvL0[xPCol][yPCol] (4254), the reference index refIdxCol is set to have the same value as RefIdxL0[xPCol][yPCol] (S4255), and the list ListCol is set to L0 (S4256).

When the inter prediction information of L1 of the coding block colCb is selected (S4252: NO and S4253: NO), the motion vector mvCol is set to have the same value as MvL1[xPCol][yPCol] (S4257), the reference index refIdxCol is set to have the same value as RefIdxL1[xPCol][yPCol] (S4258) and the list ListCol is set to L1 (S4259).

Returning to FIG. 59, when the inter prediction information can be acquired from the coding block colCb, both the flag availableFlagLXCol and the flag predFlagLXCol are set to 1 (S4244).

Figure 61:
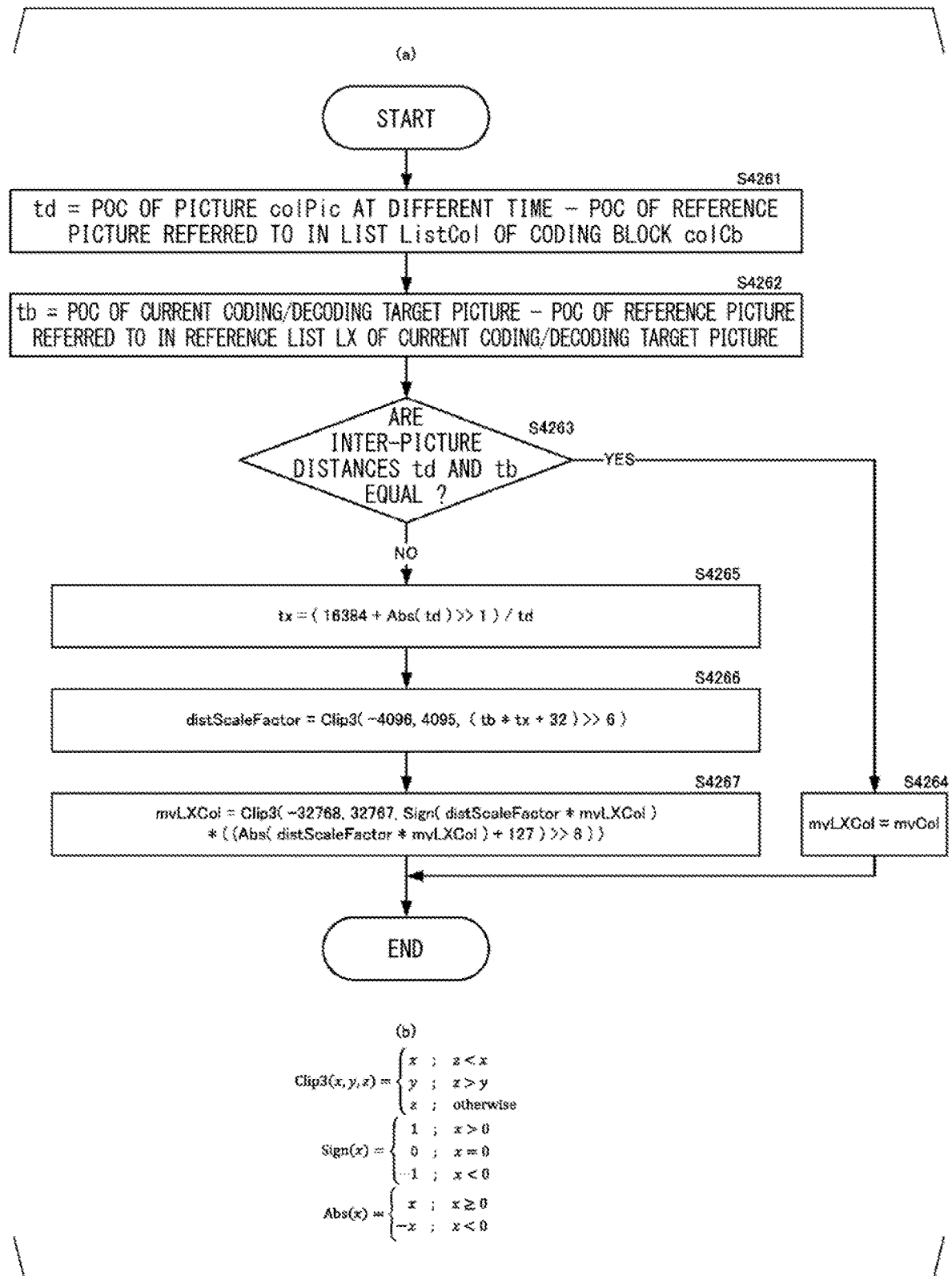
FIG. 61 is a flowchart for describing a motion vector scaling operation processing procedure.

Subsequently, the motion vector mvCol is scaled and is set to the motion vector mvLXCol (S4245S4245). A scaling operation processing procedure of this motion vector mvLXCol will be described with reference to FIG. 61.

An inter-picture distance td is calculated by subtracting the POC of the reference picture corresponding to the reference index refIdxCol referred to in the list ListCol of the coding block colCb from the POC of the picture colPic at the different time (S4261). Also, the inter-picture distance td becomes a positive value when the POC of the reference picture referred to in the list ListCol of the coding block colCb is earlier than that of the picture colPic at the different time in the display order and the inter-picture distance td is a negative value when the POC of the reference picture referred to in the list ListCol of the coding block colCb is later than that of the picture colPic at the different time in the display order.

$$td = \text{POC of picture colPic at different time} - \text{POC of reference picture referred to in list ListCol of coding block colCb}$$

An inter-picture distance tb is calculated by subtracting a POC of a reference picture, which is referred to in the list LX of the current coding target picture, from the POC of the current coding target picture (S4262). Also, the inter-picture distance tb becomes a positive value when the reference picture, which is referred to in the list LX of the current coding target picture, is earlier than the current coding target picture in the display order and the inter-picture distance tb becomes a negative value when the reference picture, which is referred to in the list LX of the current coding target picture, is later than the current coding target picture in the display order.

$$tb = \text{POC of current coding/decoding target picture} - \text{POC of reference picture corresponding to reference index of } LX \text{ of temporal merging candidates}$$

Subsequently, when the inter-picture distances td and tb are compared (S4263). When the inter-picture distances td and tb are equal (S4263: YES), the motion vector mvLXCol is calculated by the following equation (S4264). The present scaling operation process ends.

$$mvLXCol = mvCol$$

On the other hand, when the inter-picture distances td and tb between pictures are not equal (S4263: NO), a variable x is calculated according to the following equation (S4265).

$$tx = (16384 + \text{Abs}(td) >> 1)/td$$

Subsequently, a scaling coefficient distScaleFactor is calculated according to the following equation (S4266).

$$\text{distScaleFactor} = \text{Clip3}(-4096, 4095, (tb * tx + 32) >> 6)$$

Here, Clip3(x, y, z) is a function that limits a minimum value to x and limits a maximum value to y with respect to a value z. Subsequently, the motion vector mvLXCol is calculated according to the following equation (S4267). The present scaling operation process ends.

$$mvLXCol = \text{Clip3}(-32768, 32767, \text{Sign}(\text{distScaleFactor} * mvLXCol) * ((\text{Abs}(\text{distScaleFactor} * mvLXCol) + 127) >> 8))$$

Here, Sign(x) is a function that returns a sign of the value x and Abs(x) is a function that returns an absolute value of the value x.

FIG. 56 is referred to again. The motion vector mvL0Col of L0 is added as a candidate to a motion vector predictor candidate list mvpListLXN in the above-described normal motion vector predictor mode derivation unit 301 (S4205). However, this addition is made only when the flag indicating whether or not the coding block colCb of reference list 0 is valid is availableFlagL0Col=1. Also, the motion vector mvL1Col of L1 is added as a candidate to the motion vector predictor candidate list mvpListLXN in the above-described normal motion vector predictor mode derivation unit 301 (S4205). However, this addition is made only when the flag indicating whether or not the coding block colCb in reference list 1 is valid is availableFlagL1Col=1. Accordingly, the process of the temporal motion vector predictor candidate derivation unit 322 ends.

Although the above description of the normal motion vector predictor mode derivation unit 301 is for coding, the same is true for decoding. That is, the operation of the temporal motion vector predictor candidate derivation unit 422 in the normal motion vector predictor mode derivation unit 401 of FIG. 23 can be similarly described by replacing the coding in the above description with decoding.

<Temporal Merging>

The operation of the temporal merging candidate derivation unit 342 in the normal merge mode derivation unit 302 of FIG. 18 will be described with reference to FIG. 62.

First, ColPic is derived (step S4301). Next, a coding block colCb is derived and coding information thereof is acquired (step S4302). Further, inter prediction information is derived for each reference list (S4303 and S4304). Because the above processing is the same as that of S4201 to S4204 in the temporal motion vector predictor candidate derivation unit 322, the description thereof will be omitted.

Next, the flag availableFlagCol indicating whether or not the coding block colCb is valid is calculated (S4305). When the flag availableFlagL0Col or the flag availableFlagL1Col is 1, availableFlagCol becomes 1. Otherwise, availableFlagCol becomes 0.

The motion vector mvL0Col of L0 and the motion vector mvL1Col of L1 are added as candidates to the merging candidate list mergeCandList in the above-described normal merge mode derivation unit 302 (S4306). However, this addition is made only when the flag indicating whether or not the coding block colCb is valid is availableFlagCol=1. Accordingly, the process of the temporal merging candidate derivation unit 342 ends.

Although the above description of the temporal merging candidate derivation unit 342 is for coding, the same is true for decoding. That is, the operation of the temporal merging candidate derivation unit 442 in the normal merge mode derivation unit 402 of FIG. 24 can be similarly described by replacing the coding in the above description with decoding.

<Update of History-Based Motion Vector Predictor Candidate List>

Figure 26:
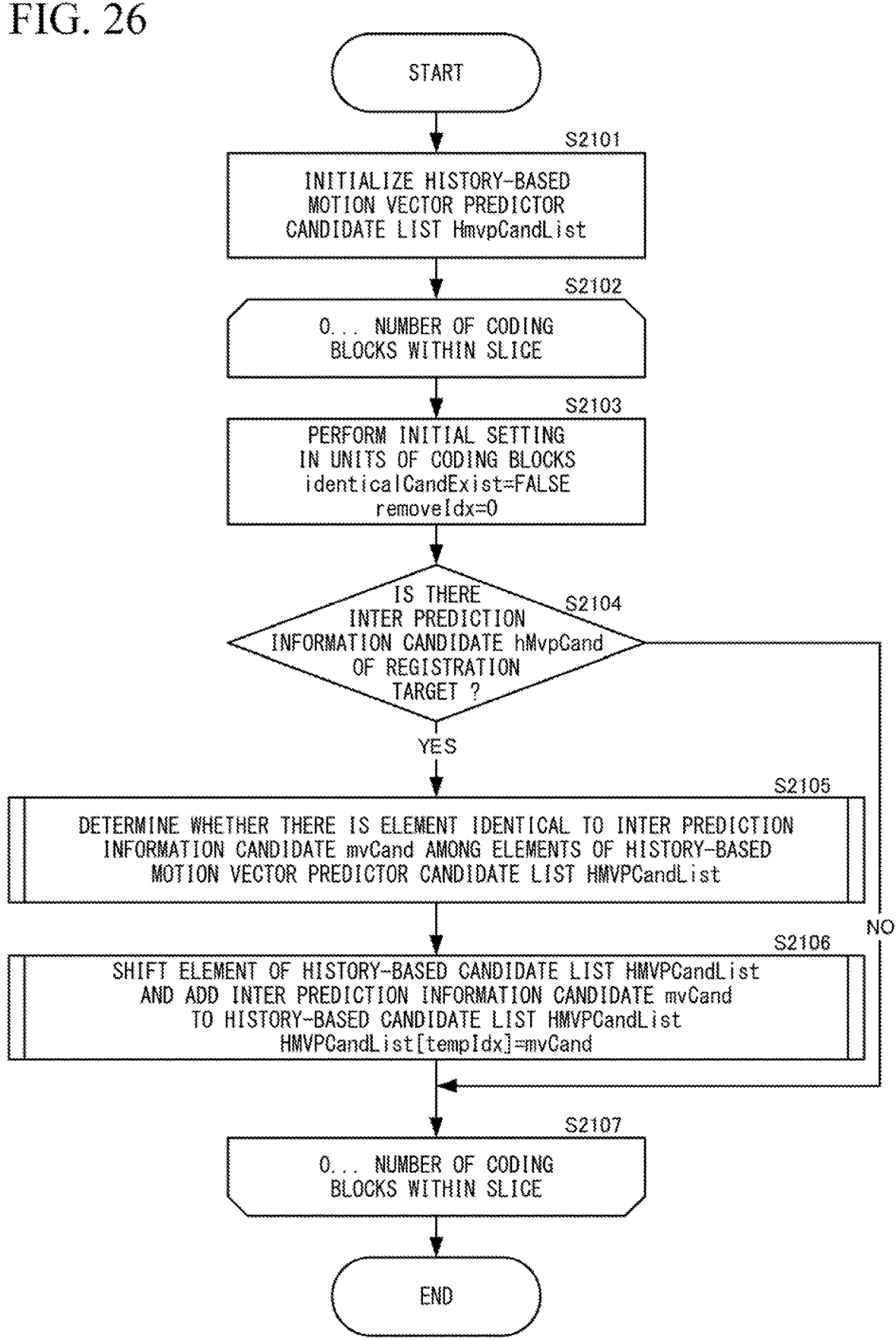
FIG. 26 is an explanatory diagram showing a processing procedure of initializing/updating a history-based motion vector predictor candidate list.

Next, an initialization method and an update method of the history-based motion vector predictor candidate list HmvpCandList provided in the coding information storage memory 111 of the coding side and the coding information storage memory 205 of the decoding side will be described in detail. FIG. 26 is an explanatory flowchart showing a processing procedure of initializing/updating a history-based motion vector predictor candidate list.

In the present embodiment, it is assumed that the history-based motion vector predictor candidate list HmvpCandList is updated in the coding information storage memory 111 and the coding information storage memory 205. A history-based motion vector predictor candidate list update unit may be installed in the inter prediction unit 102 and the inter prediction unit 203 to update the history-based motion vector predictor candidate list HmvpCandList.

The history-based motion vector predictor candidate list HmvpCandList is initially set at the beginning of the slice, the history-based motion vector predictor candidate list HmvpCandList is updated when the normal motion vector predictor mode or the normal merge mode has been selected by the prediction method determination unit 105 on the coding side, and the history-based motion vector predictor candidate list HmvpCandList is updated when the prediction information decoded by the bit strings decoding unit 201 is about the normal motion vector predictor mode or the normal merge mode on the decoding side.

The inter prediction information used when inter prediction is performed in the normal motion vector predictor mode or the normal merge mode is registered as an inter prediction information candidate hMvpCand in the history-based motion vector predictor candidate list HmvpCandList. The inter prediction information candidate hMvpCand includes a reference index refIdxL0 of L0, a reference index refIdxL1 of L1, an L0-prediction flag predFlagL0 indicating whether or not L0-prediction is performed, an L1-prediction flag predFlagL1 indicating whether or not L1-prediction is performed, a motion vector mvL0 of L0, and a motion vector mvL1 of L1.

When there is inter prediction information having the same value as an inter prediction information candidate hMvpCand among elements (i.e., inter prediction information) registered in the history-based motion vector predictor candidate list HmvpCandList provided in the coding information storage memory 111 of the coding side and the coding information storage memory 205 of the decoding side, the element is removed from the history-based motion vector predictor candidate list HmvpCandList. On the other hand, when there is no inter prediction information having the same value as an inter prediction information candidate hMvpCand, the element at the beginning of the history-based motion vector predictor candidate list HmvpCandList is removed and the inter prediction information candidate hMvpCand is added to the end of the history-based motion vector predictor candidate list HmvpCandList.

The number of elements of the history-based motion vector predictor candidate list HmvpCandList provided in the coding information storage memory 111 of the coding side and the coding information storage memory 205 of the decoding side according to the present invention is assumed to be six.

First, the history-based motion vector predictor candidate list HmvpCandList is initialized in units of slices (step S2101 of FIG. 26). All the elements of the history-based motion vector predictor candidate list HmvpCandList are empty at the beginning of the slice and a value of the number of history-based motion vector predictor candidates (the current number of candidates) NumHmvpCand registered in the history-based motion vector predictor candidate list HmvpCandList is set to 0.

Also, the initialization of the history-based motion vector predictor candidate list HmvpCandList is performed in units of slices (a first coding block of a slice), but may be performed in units of pictures, tiles, or tree block rows.

Subsequently, the following process of updating the history-based motion vector predictor candidate list HmvpCandList is iteratively performed for each coding block within the slice (steps S2102 to S2107 of FIG. 26).

First, initial setting is performed for each coding block. A flag identicalCandExist indicating whether or not there is an identical candidate is set to a value of FALSE and a removal target index removeIdx indicating a removal target candidate is set to 0 (step S2103 of FIG. 26).

It is determined whether or not there is an inter prediction information candidate hMvpCand of the registration target (step S2104 of FIG. 26). When the prediction method determination unit 105 of the coding side determines that the mode is the normal motion vector predictor mode or the normal merge mode or when the bit strings decoding unit 201 of the decoding side decodes the mode as the normal motion vector predictor mode or the normal merge mode, its inter prediction information is set as an inter prediction information candidate hMvpCand of the registration target. When the prediction method determination unit 105 of the coding side determines that the mode is the intra-prediction mode, the subblock-based motion vector predictor mode, or the subblock-based merge mode or when the bit strings decoding unit 201 of the decoding side decodes the mode as the intra-prediction mode, the subblock-based motion vector predictor mode, or the subblock-based merge mode, a process of updating the history-based motion vector predictor candidate list HmvpCandList is not performed and the inter prediction information candidate hMvpCand of the registration target does not exist. When there is no inter prediction information candidate hMvpCand of the registration target, steps S2105 to S2106 are skipped (step S2104 of FIG. 26: NO). When there is an inter prediction information candidate hMvpCand of the registration target, the processing from step S2105 is performed (step S2104 of FIG. 26: YES).

Figure 27:
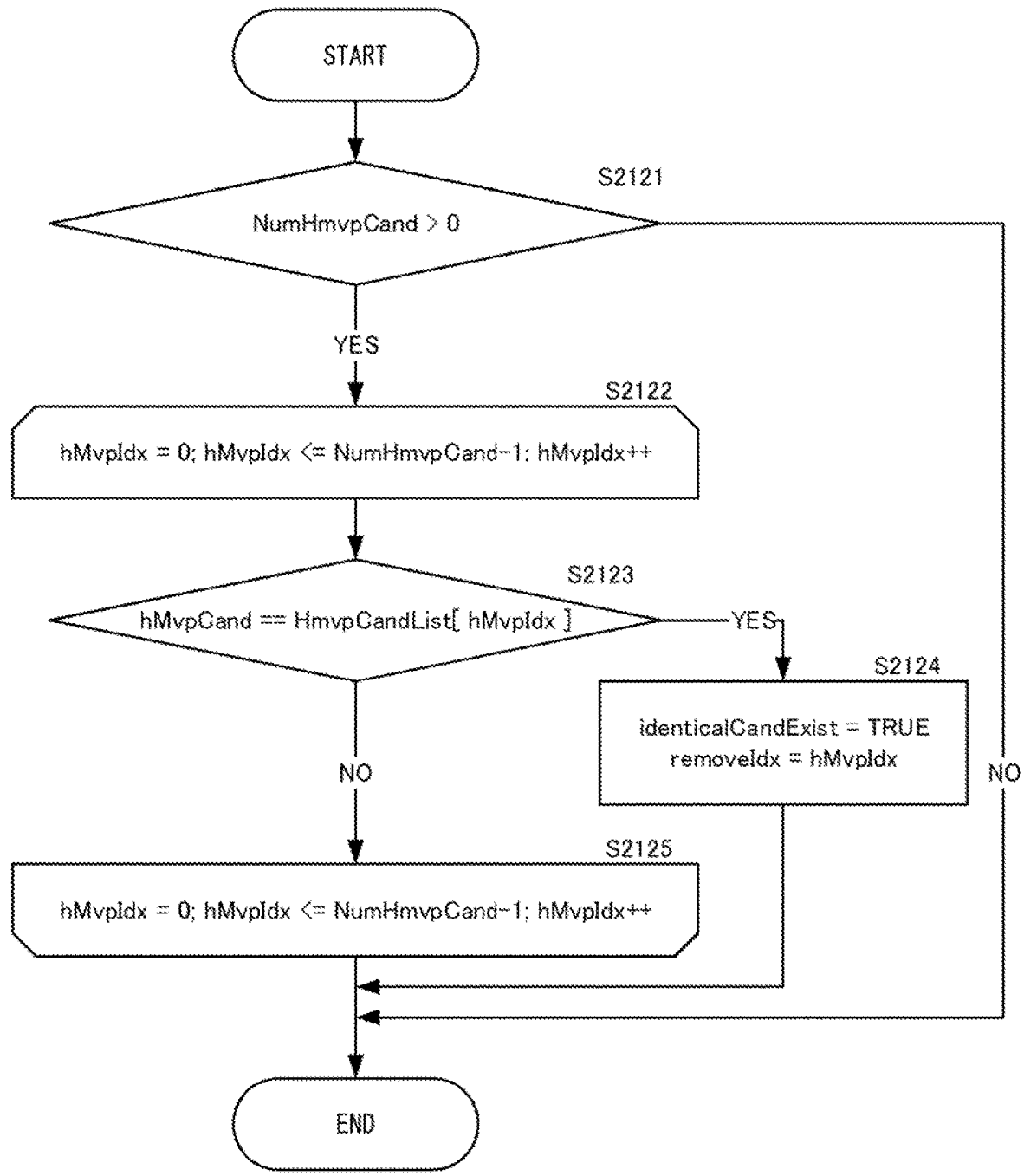
FIG. 27 is a flowchart of an identical element checking processing procedure in the processing procedure of initializing/updating a history-based motion vector predictor candidate list.

Subsequently, it is determined whether or not there is an element (inter prediction information) having the same value as the inter prediction information candidate hMvpCand of the registration target, i.e., an identical element, among elements of the history-based motion vector predictor candidate list HmvpCandList (step S2105 of FIG. 26). FIG. 27 is a flowchart of an identical element checking processing procedure. When a value of the number of history-based motion vector predictor candidates NumHmvpCand is 0 (step S2121 of FIG. 27: NO), the history-based motion vector predictor candidate list HmvpCandList is empty and there is no identical candidate, so that steps S2122 to S2125 of FIG. 27 are skipped and the present identical element checking processing procedure is completed. When the value of the number of history-based motion vector predictor candidates NumHmvpCand is greater than 0 (YES in step S2121 of FIG. 27), the processing of step S2123 is iterated until the history-based motion vector predictor index hMvpIdx changes from 0 to NumHmvpCand−1 (steps S2122 to S2125 of FIG. 27). First, a comparison is made regarding whether or not an hMvpIdx$^{th}$ element HmvpCandList[hMvpIdx] when counted from a 0$^{th}$ element of the history-based motion vector predictor candidate list is identical to the inter prediction information candidate hMvpCand (step S2123 of FIG. 27). When they are the same (step S2123 of FIG. 27: YES), a flag identicalCandExist indicating whether or not there is an identical candidate is set to a value of TRUE and a removal target index removeIdx indicating a position of an element of a removal target is set to a current value of the history-based motion vector predictor index hMvpIdx, and the present identical element checking process ends. When they are not the same (step S2123 of FIG. 27: NO), hMvpIdx is incremented by 1. If the history-based motion vector predictor index hMvpIdx is less than or equal to NumHmvpCand−1, the processing from step S2123 is performed.

Figure 28:
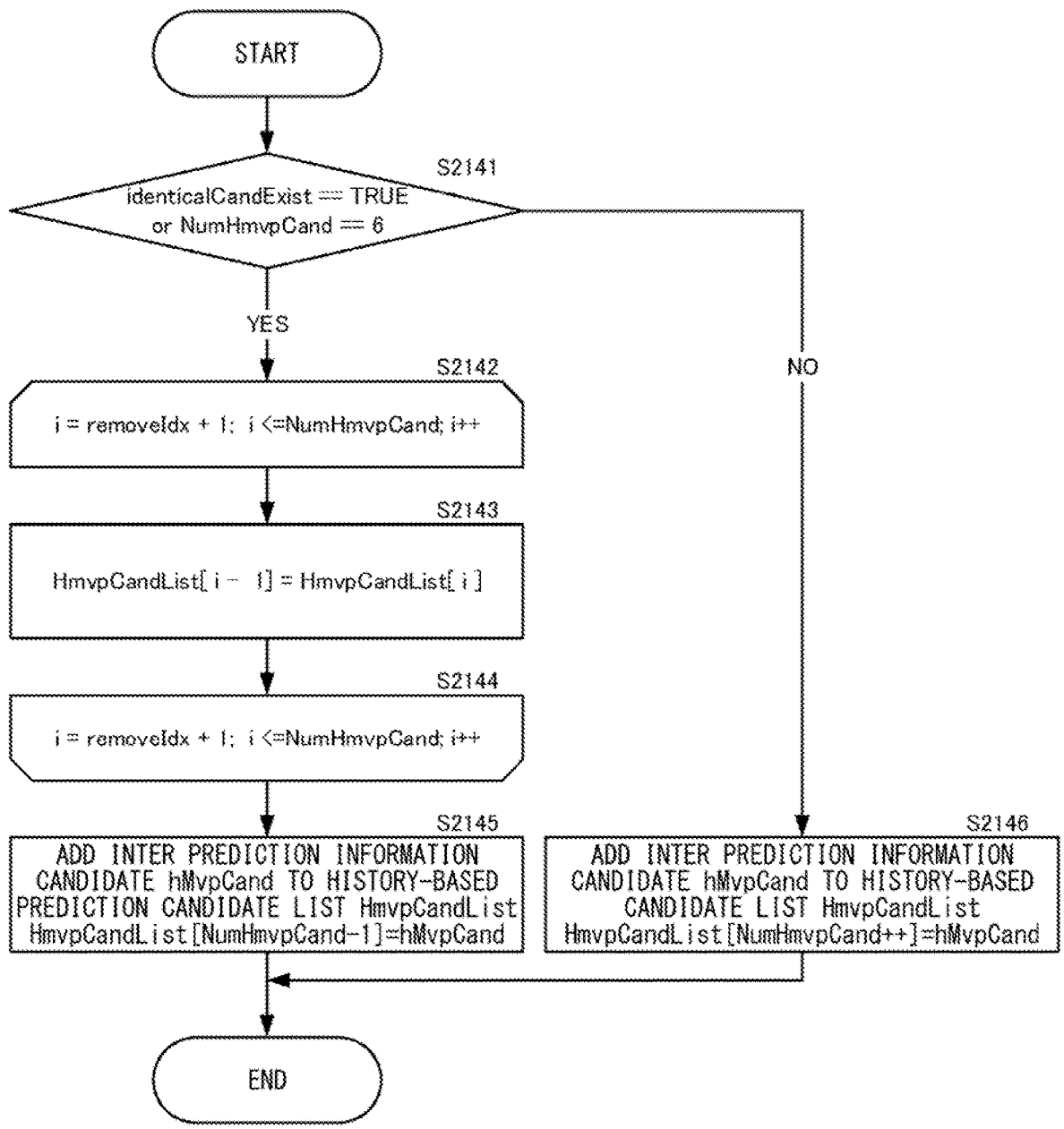
FIG. 28 is a flowchart of an element shift processing procedure in the processing procedure of initializing/updating a history-based motion vector predictor candidate list.

Referring to the flowchart of FIG. 26 again, a process of shifting and adding an element of the history-based motion vector predictor candidate list HmvpCandList is performed (step S2106 of FIG. 26). FIG. 28 is a flowchart of a processing procedure of shifting/adding an element of the history-based motion vector predictor candidate list HmvpCandList of step S2106 of FIG. 26. First, it is determined whether or not to add a new element after removing an element stored in the history-based motion vector predictor candidate list HmvpCandList or to add a new element without removing the element. Specifically, a comparison is made regarding whether or not the flag identicalCandExist indicating whether or not an identical candidate exists is TRUE or NumHmvpCand is six (step S2141 of FIG. 28). When either the condition that the flag identicalCandExist indicating whether or not an identical candidate exists is TRUE or the condition that the current number of candidates NumHmvpCand is six is satisfied (step S2141 of FIG. 28: YES), a new element is added after removing the element stored in the history-based motion vector predictor candidate list HmvpCandList. The initial value of index i is set to a value of removeIdx+1. The element shift process of step S2143 is iterated from this initial value to NumHmvpCand (steps S2142 to S2144 of FIG. 28). By copying the element of HmvpCandList[i] to HmvpCandList[i−1], the element is shifted forward (step S2143 of FIG. 28) and i is incremented by 1 (steps S2142 to S2144 of FIG. 28). Subsequently, the inter prediction information candidate hMvpCand is added to a (NumHmvpCand−1)$^{th}$ element HmvpCandList [NumHmvpCand−1] when counted from a 0$^{th}$ element that corresponds to the end of the history-based motion vector predictor candidate list (step S2145 of FIG. 28) and the present process of shifting/adding an element of the history-based motion vector predictor candidate list HmvpCandList ends. On the other hand, when neither the condition that the flag identicalCandExist indicating whether or not an identical candidate exists is TRUE nor the condition that the current number of candidates NumHmvpCand is six is satisfied (step S2141 of FIG. 28: NO), the inter prediction information candidate hMvpCand is added to the end of the history-based motion vector predictor candidate list without removing an element stored in the history-based motion vector predictor candidate list HmvpCandList (step S2146 of FIG. 28). Here, the end of the history-based motion vector predictor candidate list is a NumHmvpCand$^{th}$ element HmvpCandList[NumHmvpCand] when counted from a 0$^{th}$ element. Also, NumHmvpCand is incremented by 1 and the present process of shifting/adding an element of the history-based motion vector predictor candidate list HmvpCandList ends.

FIG. 31 is an explanatory diagram showing an example of a process of updating the history-based motion vector predictor candidate list. When a new element is added to the history-based motion vector predictor candidate list HmvpCandList in which six elements (inter prediction information) have been registered, the elements are compared with the new inter prediction information in order from a front element of the history-based motion vector predictor candidate list HmvpCandList (FIG. 31A). If the new element has the same value as a third element HMVP2 from the beginning of the history-based motion vector predictor candidate list HmvpCandList, the element HMVP2 is removed from the history-based motion vector predictor candidate list HmvpCandList and subsequent elements HMVP3 to HMVP5 are shifted forward (copied) one by one, and the new element is added to the end of the history-based motion vector predictor candidate list HmvpCandList (FIG. 31B) to complete the update of the history-based motion vector predictor candidate list HmvpCandList (FIG. 31C).

<History-Based Motion Vector Predictor Candidate Derivation Process>

Figure 29:
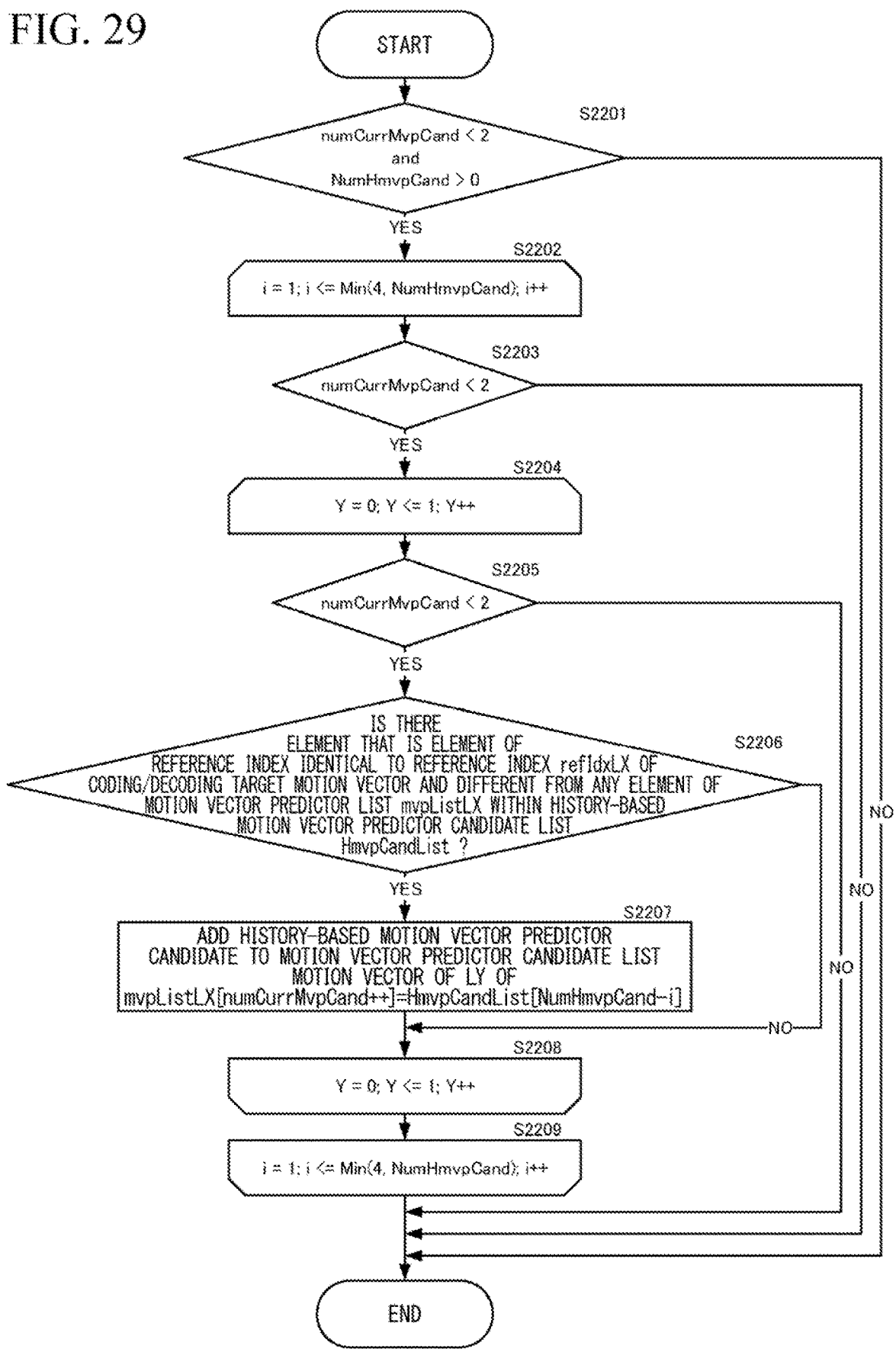
FIG. 29 is an explanatory flowchart showing a history-based motion vector predictor candidate derivation processing procedure.

Next, a method of deriving a history-based motion vector predictor candidate from the history-based motion vector predictor candidate list HmvpCandList which is a processing procedure of step S304 of FIG. 20 that is a process common to the history-based motion vector predictor candidate derivation unit 323 of the normal motion vector predictor mode derivation unit 301 of the coding side and the history-based motion vector predictor candidate derivation unit 423 of the normal motion vector predictor mode derivation unit 401 of the decoding side will be described in detail. FIG. 29 is an explanatory flowchart showing a history-based motion vector predictor candidate derivation processing procedure.

When the current number of motion vector predictor candidates numCurrMvpCand is greater than or equal to the maximum number of elements in the motion vector predictor candidate list mvpListLX (here, 2) or a value of the number of history-based motion vector predictor candidates NumHmvpCand is 0 (NO in step S2201 of FIG. 29), the processing of steps S2202 to S2209 of FIG. 29 is omitted, and the history-based motion vector predictor candidate derivation processing procedure ends. When the current number of motion vector predictor candidates numCurrMvpCand is smaller than 2 which is the maximum number of elements of the motion vector predictor candidate list mvpListLX and the value of the number of history-based motion vector predictor candidates NumHmvpCand is greater than 0 (YES in step S2201 of FIG. 29), the processing of steps S2202 to S2209 of FIG. 29 is performed.

Subsequently, the processing of steps S2203 to S2208 of FIG. 29 is iterated until the index i changes from 1 to a smaller value of 4 and the number of history-based motion vector predictor candidates numCheckedHMVPCand (steps S2202 to S2209 of FIG. 29). When the current number of motion vector predictor candidates numCurrMvpCand is greater than or equal to 2 which is the maximum number of elements of the motion vector predictor candidate list mvpListLX (step S2203 of FIG. 29: NO), the processing of steps S2204 to S2209 in FIG. 29 is omitted and the present history-based motion vector predictor candidate derivation processing procedure ends. When the current number of motion vector predictor candidates numCurrMvpCand is smaller than 2 which is the maximum number of elements of the motion vector predictor candidate list mvpListLX (step S2203 of FIG. 29: YES), the processing from step S2204 of FIG. 29 is performed.

Subsequently, the processing of step S2205 to S2207 is performed for Y=0 and 1 (L0 and L1) (steps S2204 to S2208 of FIG. 29). When the current number of motion vector predictor candidates numCurrMvpCand is greater than or equal to 2 which is the maximum number of elements of the motion vector predictor candidate list mvpListLX (step S2205 of FIG. 29: NO), the processing of step S2206 to S2209 of FIG. 29 is omitted and the present history-based motion vector predictor candidate derivation processing procedure ends. When the current number of motion vector predictor candidates numCurrMvpCand is smaller than 2 which is the maximum number of elements of the motion vector predictor candidate list mvpListLX (step S2205 of FIG. 29: YES), the processing from step S2206 of FIG. 29 is performed.

Subsequently, in the case of an element that has a reference index identical to the reference index refIdxLX of a coding/decoding target motion vector and that is different from any element of the motion vector predictor list mvpListLX within the history-based motion vector predictor candidate list HmvpCandList (YES in step S2206 of 29), the motion vector of LY of the history-based motion vector predictor candidate HmvpCandList[NumHmvpCand-i] is added to a numCurrMvpCand$^{th}$ element mvpListLX[numCurrMvpCand] when counted from a $0^{th}$ element of the motion vector predictor candidate list (step S2207 of FIG. 29) and the current number of motion vector predictor candidates numCurrMvpCand is incremented by one. When there is no element that has a reference index identical to the reference index refIdxLX of a coding/decoding target motion vector and that is different from any element of the motion vector predictor list mvpListLX within the history-based motion vector predictor candidate list HmvpCandList (NO in step S2207 of FIG. 29), the addition process of step S2207 is skipped.

The above processing of steps S2205 to S2207 of FIG. 29 is performed for both L0 and L1 (steps S2204 to S2208 of FIG. 29). When the index i is incremented by 1 and the index i is less than or equal to a smaller value of 4 and the number of history-based motion vector predictor candidates NumHmvpCand, the processing from step S2203 is performed again (steps S2202 to S2209 of FIG. 29).

<History-Based Merging Candidate Derivation Process>

Figure 30:
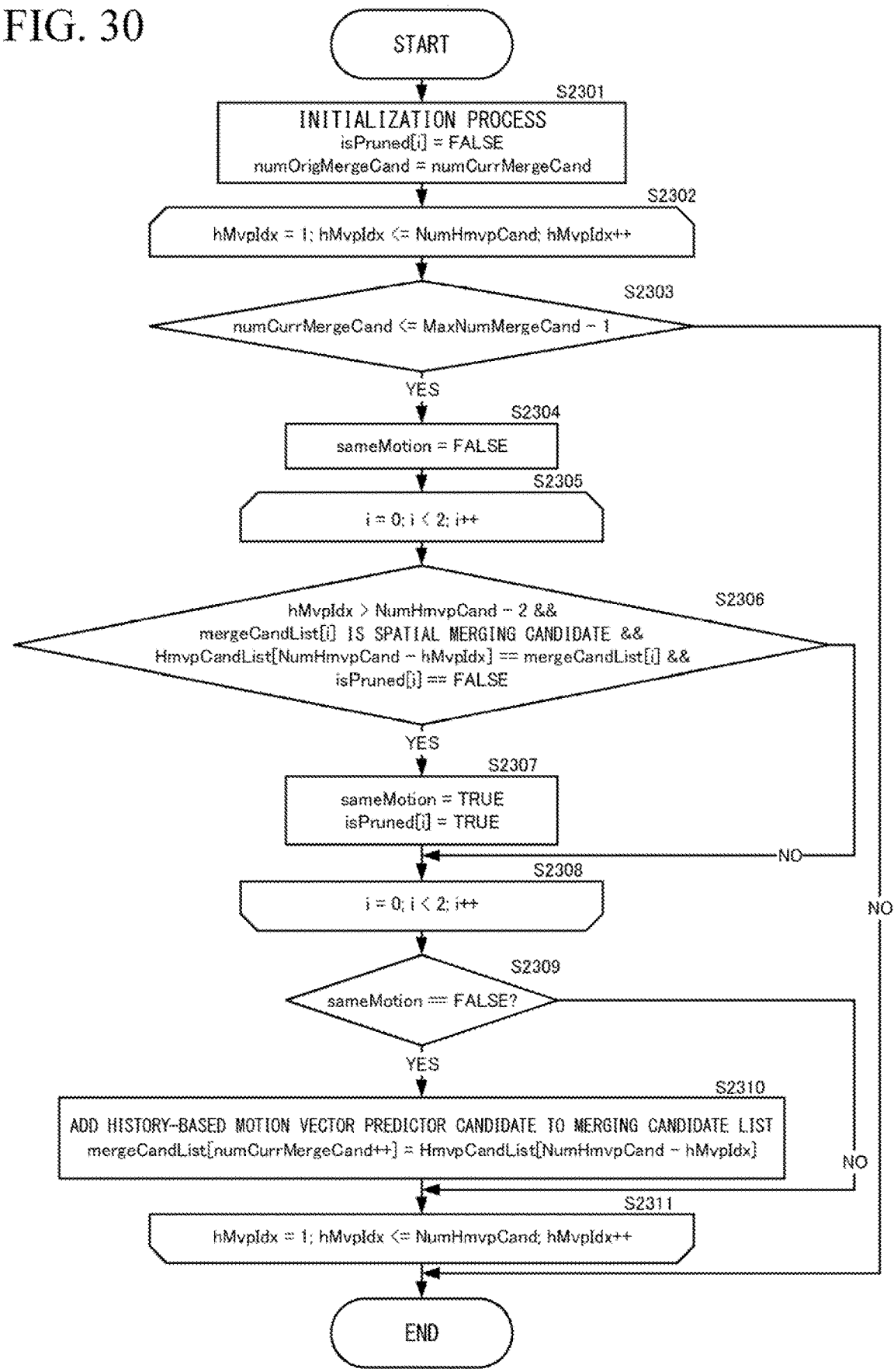
FIG. 30 is an explanatory flowchart showing a history-based merging candidate derivation processing procedure.

Next, a method of deriving history-based merging candidates from the history-based merging candidate list Hmvp-CandList which is the processing procedure of step S404 of FIG. 21 which is a process common to the history-based merging candidate derivation unit 345 of the normal merge mode derivation unit 302 of the coding side and the history-based merging candidate derivation unit 445 of the normal merge mode derivation unit 402 of the decoding side will be described in detail. FIG. 30 is an explanatory flowchart showing the history-based merging candidate derivation processing procedure.

First, an initialization process is performed (step S2301 of FIG. 30). Each (numCurrMergeCand−1)$^{th}$ element from 0 of isPruned[i] is set to a value of FALSE and a variable numOrigMergeCand is set to the number of elements num-CurrMergeCand registered in the current merging candidate list.

Subsequently, the initial value of the index hMvpIdx is set to 1 and the addition process of steps S2303 to S2310 of FIG. 30 is iterated until the index hMvpIdx changes from the initial value to NumHmvpCand (steps S2302 to S2311 of FIG. 30). If the number of elements registered in the current merging candidate list numCurrMergeCand is not less than or equal to (the maximum number of merging candidates MaxNumMergeCand−1), merging candidates are added to all elements of the merging candidate list, so that the present history-based merging candidate derivation process ends (NO in step S2303 of FIG. 30). When the number of the elements numCurrMergeCand registered in the current merging candidate list is less than or equal to (the maximum number of merging candidates MaxNumMergeCand−1), the processing from step S2304 is performed. sameMotion is set to a value of FALSE (step S2304 of FIG. 30). Subsequently, the initial value of the index i is set to 0 and the processing of steps S2306 and S2307 of FIG. 30 is performed until the index changes from the initial value to numOrigMerge-Cand−1 (S2305 to S2308 in FIG. 30). A comparison is made regarding whether or not a (NumHmvpCand-hMvpdx)$^{th}$ element HmvpCandList[NumHmvpCand-hMvpIdx] when counted from a $0^{th}$ element of the history-based motion vector prediction candidate list has the same value as an i$^{th}$ element mergeCandList[i] when counted from a $0^{th}$ element of a merging candidate list (step S2306 of FIG. 30).

The merging candidates have the same value when values of all components (an inter prediction mode, a reference index, and a motion vector) of the merging candidates are identical. When the merging candidates have the same value and isPruned[i] is FALSE (YES in step S2306 of FIG. 30), both sameMotion and isPruned[i] are set to TRUE (step S2307 of FIG. 30). When the merging candidates do not have the same value (NO in step S2306 of FIG. 30), the processing of step S2307 is skipped. When the iterative processing of steps S2305 to S2308 of FIG. 30 has been completed, a comparison is made regarding whether or not sameMotion is FALSE (step S2309 of FIG. 30). If sameMotion is FALSE (YES in step S2309 of FIG. 30), i.e., because a (NumHmvpCand-hMvpIdx)$^{th}$ element HmvpCandList[NumHmvpCand-hMvpIdx] when counted from a $0^{th}$ element of the history-based motion vector predictor candidate list does not exist in mergeCandList, a (NumHmvpCand-hMvpIdx)$^{th}$ element HmvpCandList[NumHmvpCand-hMvpIdx] when counted from a $0^{th}$ element of the history-based motion vector predictor candidate list is added to a numCurrMergeCand$^{th}$ element mergeCandList[numCur-MergeCand] of the merging candidate list and num-CurrMergeCand is incremented by 1 (step S2310 of FIG. 30). The index hMvpIdx is incremented by 1 (step S2302 of FIG. 30) and a process of iterating steps S2302 to S2311 of FIG. 30 is performed.

When the checking of all elements of the history-based motion vector predictor candidate list is completed or when merging candidates are added to all elements of the merging candidate list, the present history-based merging candidate derivation process is completed.

<Subblock-Based Temporal Merging Candidate Derivation>

Figure 50:
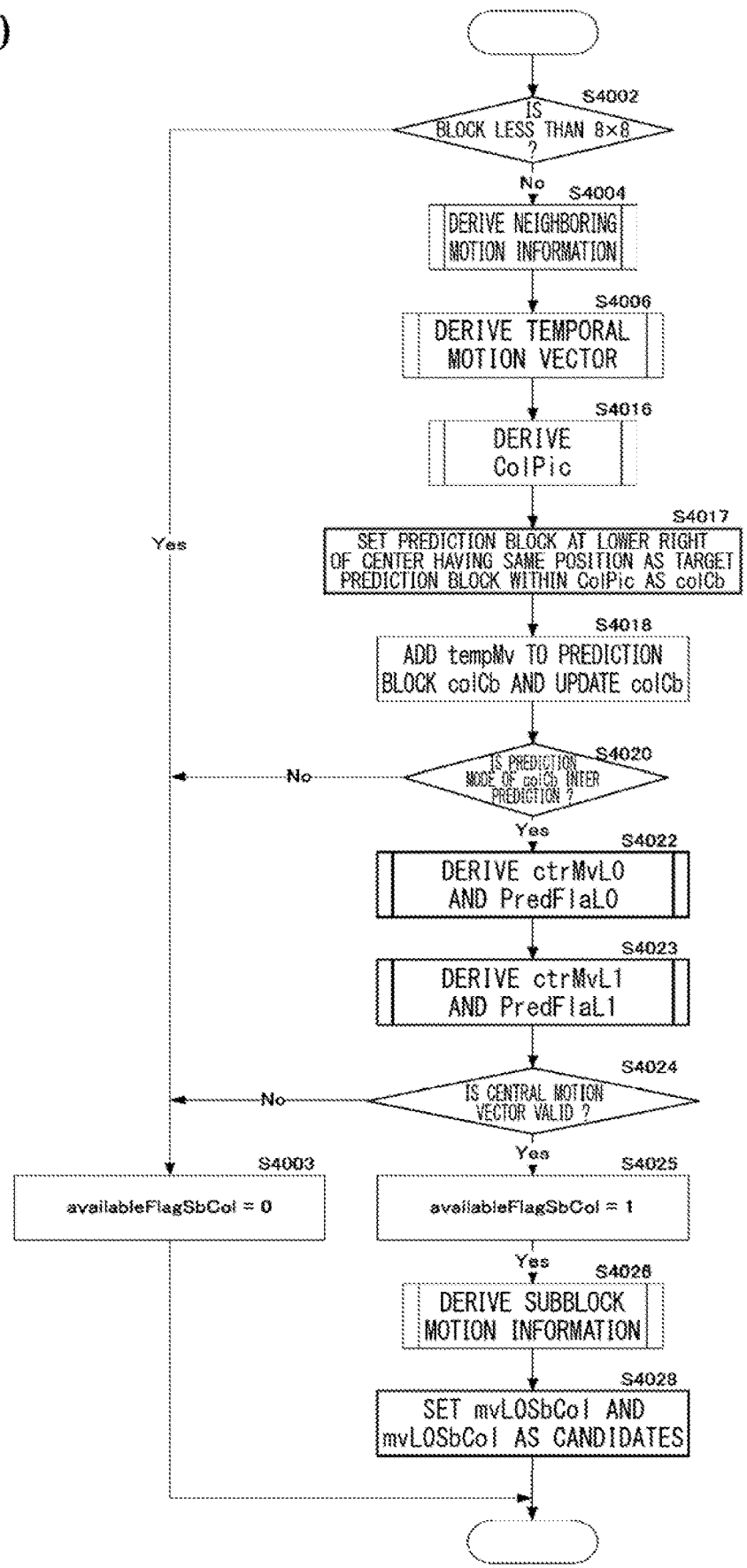
FIG. 50 is a flowchart for describing an operation of a subblock-based temporal merging candidate derivation unit 381.

An operation of the subblock-based temporal merging candidate derivation unit 381 in the subblock-based merge mode derivation unit 304 of FIG. 16 will be described with reference to FIG. 50.

First, it is determined whether or not a coding block is less than 8×8 samples (S4002).

When the coding block is less than 8×8 samples (S4002: YES), a flag indicating the presence of the subblock-based temporal merging candidate is set to availableFlagSbCol=0 (S4003). The process of the subblock-based temporal merging candidate derivation unit ends. Here, when the temporal motion vector prediction is prohibited by the syntax or when the subblock-based temporal merging is prohibited, the processing which is the same as that when the coding block is less than 8×8 samples (S4002: YES) is performed.

On the other hand, when the coding block has 8×8 samples or more (S4002: NO), neighboring motion information of the coding block in the coding picture is derived (S4004).

Figure 51:
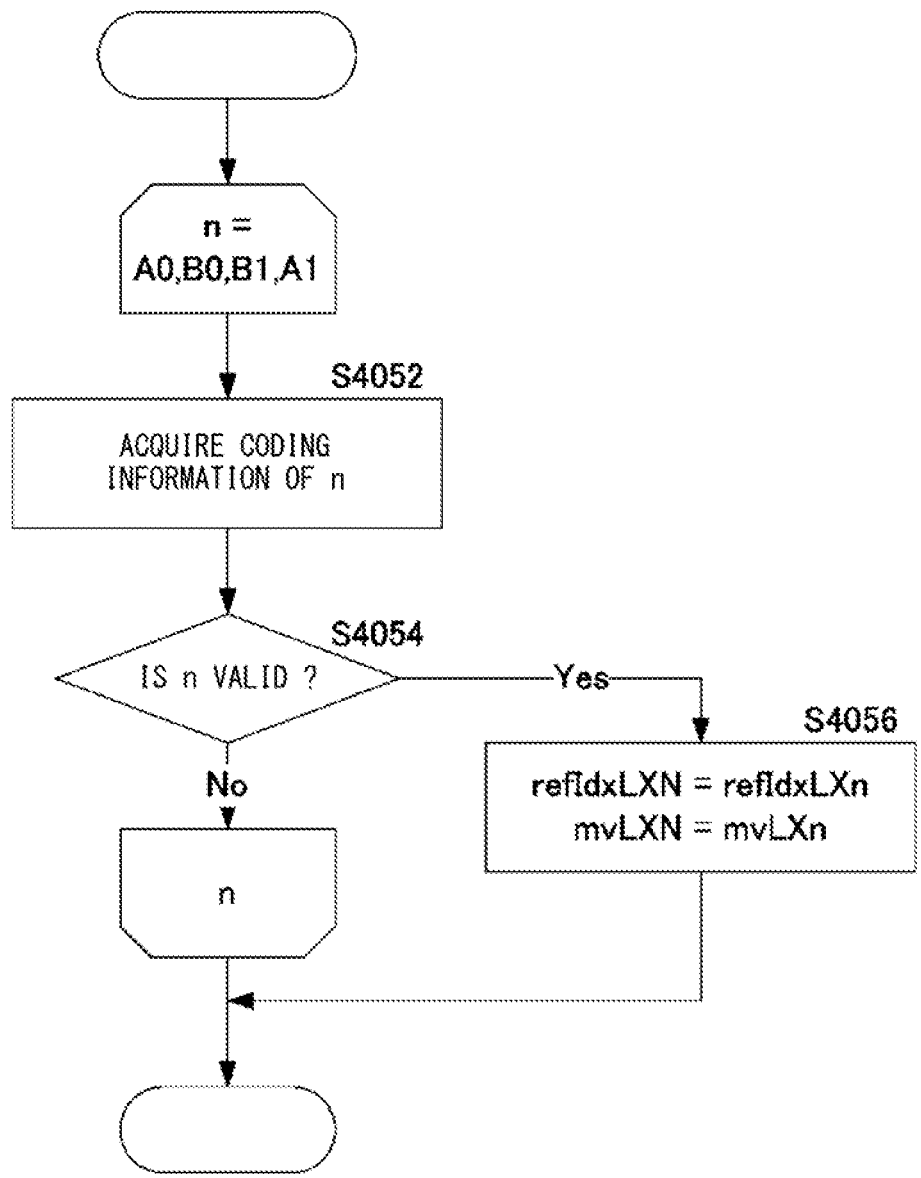
FIG. 51 is a flowchart for describing a process of deriving neighboring motion information of blocks.

A process of deriving the neighboring motion information of the coding block will be described with reference to FIG. 51. The process of deriving the neighboring motion information is similar to the above-described process of the spatial motion vector predictor candidate derivation unit 321. Here, the order in which neighboring blocks are searched for is A0, B0, B1, and A1 and B2 is not searched for. First, the coding information is acquired with the neighboring block n=A0 (S4052). The coding information indicates the flag availableFlagN indicating whether or not a neighboring block is available, a reference index refIdxLXN for each reference list, and a motion vector mvLXN.

Next, it is determined whether the neighboring block n is valid or invalid (S4054). If the flag indicating whether or not the neighboring block is available is availabieFlagN=1, the neighboring block n is valid. Otherwise, the neighboring block n is invalid.

If the neighboring block n is valid (S4054: YES), the reference index refIdxLXN is set to a reference index refIdxLXn of the neighboring block n (S4056). Also, the motion vector mvLXN is set as the motion vector mvLXn of the neighboring block n (S4056). The process of deriving the neighboring motion information of the blocks ends.

On the other hand, if the neighboring block n is invalid (S4106: NO), the coding information is acquired with the neighboring block n=B0 (S4104). Hereinafter, a similar process is performed as a loop process in the order of B1 and A1. The process of deriving the neighboring motion information is performed as a loop process until the neighboring block becomes valid and the process of deriving the neighboring motion information of a block ends if all the neighboring blocks A0, B1, B1, and A1 are invalid.

FIG. 50 is referred to again. After the neighboring motion information is derived (S4004), a temporal motion vector is derived (S4006).

Figure 52:
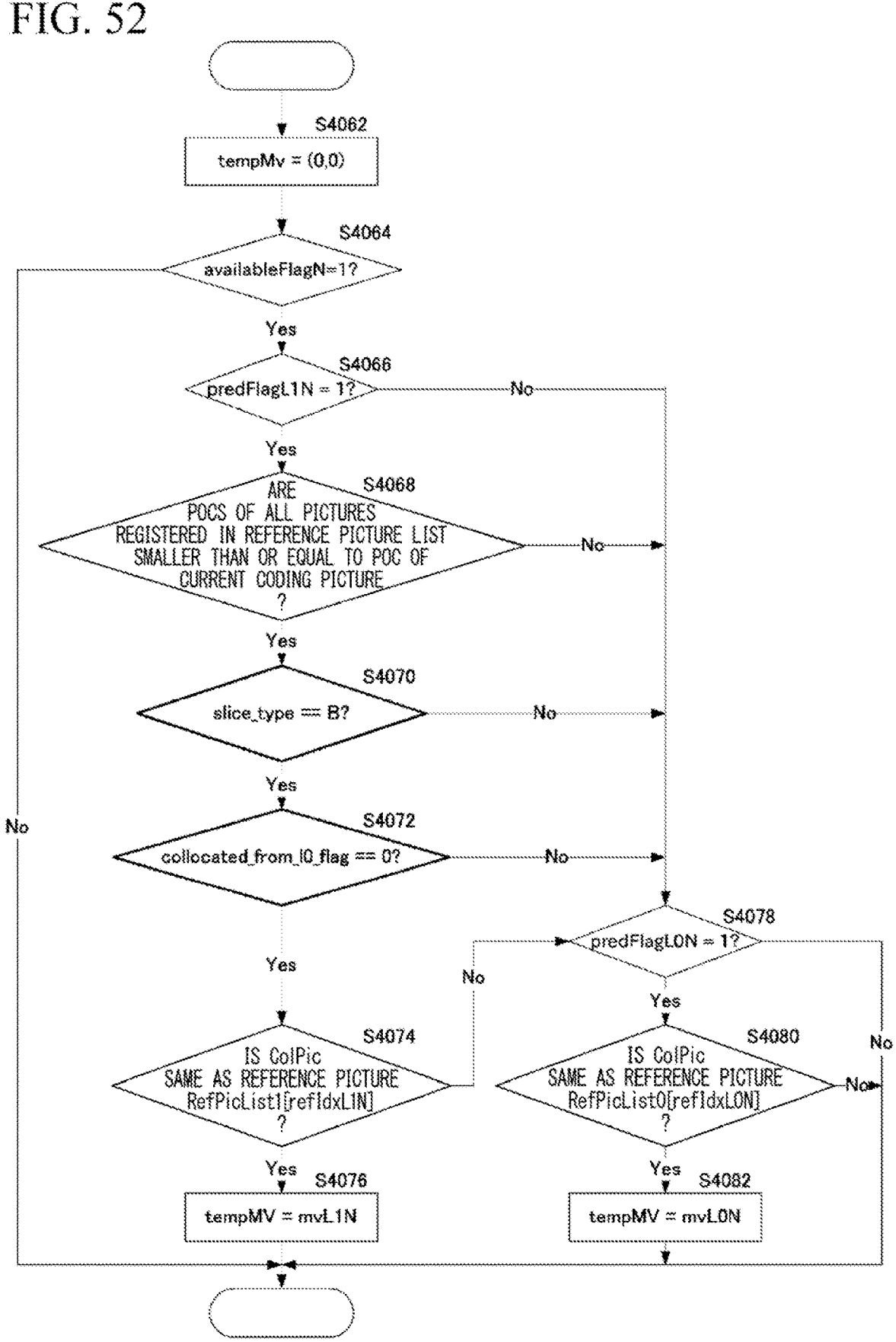
FIG. 52 is a flowchart for describing a temporal motion vector derivation process.

The process of deriving the temporal motion vector will be described with reference to FIG. 52. First, a temporal motion vector is initialized as tempMv=(0, 0) (S4062).

Next, it is determined whether the neighboring motion information is valid or invalid (S4064). If the flag indicating whether the neighboring block is available is availableFlagN=1, the neighboring motion information is valid. Otherwise, the neighboring motion information is invalid. When the neighboring motion information is invalid (S4064: NO), the process of deriving the temporal motion vector ends.

On the other hand, when the neighboring motion information is valid (S4064: YES), it is determined whether or not the flag predFlagL1N indicating whether or not the L1-prediction has been used in the neighboring block N is 1 (S4066). When predFlagL1N=0 (S4066: NO), the process proceeds to the next process (S4078). When predFlagL1N=1 (S4066: YES), it is determined whether or not the POCs of all the pictures registered in all the reference lists is smaller than or equal to the POC of the current coding target picture (S4068). When this determination is true (S4068: YES), the process proceeds to the next processing (S4070).

When the slice type slice_type is a B slice and the flag collocated_from_l0_flag is 0 (S4070: YES and S4072: YES), it is determined whether or not ColPic is the same as the reference picture RefPicList1[refIdxL1N] (a picture of the reference index refIdxL1N of the reference list L1) (S4074). When this determination is true (S4074: YES), the temporal motion vector tempMv=mvL1N is set (S4076). When this determination is false (S4074: NO), the process proceeds to the next processing (S4078). When the slice type slice_type is not a B slice and the flag collocated_from_l0_flag is not 0 (S4070: NO or S4072: NO), the process proceeds to the next processing (S4078).

Then, it is determined whether or not the flag predFlagL0N indicating whether or not the L0-prediction has been used in the neighboring block N is 1 (S4078). When predFlagL0N=1 (S4078: YES), it is determined whether or not ColPic is the same as the reference picture RefPicList0[refIdxL0N] (a picture of the reference index refIdxL0N of the reference list L0) (S4080). When this determination is true (S4080: YES), the temporal motion vector tempMv=mvL0N is set (S4082). When this determination is false (S4080: NO), the process of deriving the temporal motion vector ends.

FIG. 50 is referred to again. Next, ColPic is derived (S4016). Because this processing is the same as that of S4201 in the temporal motion vector predictor candidate derivation unit 322, the description thereof will be omitted.

The coding block colCb at the different time is set (S4017). Here, a coding block located at the lower right of the center having the same position as a target coding block within the picture ColPic at a different time is set as colCb. This coding block corresponds to the coding block T1 of FIG. 55.

Next, a position where the temporal motion vector tempMv is added to the coding block colCb becomes anew coding block colCb (S4018). Assuming that the upper left position of the coding block colCh is (xColCb, yColCb) and the temporal motion vector tempMv is (tempMv[0], tempMv[1]) at 1/16 sample precision, the upper left position of the new coding block colCb is as follows.

$$xColCb = Clip3(xCtb, xCtb + CtbSizeY + 3, xcolCb + (tempMv[0] >> 4))$$

$$yColCb = Clip3(yCtb, yCtb + CtbSizeY - 1, ycolCb + (tempMv[1] >> 4))$$

Here, an upper left position of a tree block is (xCtb, yCtb) and a size of the tree block is CtbSizeY. As shown in the above equations, a position after the addition of tempMv is corrected in a range of about the size of the tree block so that the position after the addition of tempMv does not significantly deviate from a position before the addition of tempMv. When this position is outside the picture, the position is corrected inside the picture.

It is determined whether or not the prediction mode PredMode of the coding block colCb is inter prediction (MODE_INTER) (S4020). When the prediction mode of colCb is not inter prediction (S4020: NO), the flag indicating the presence of the subblock-based temporal merging candidate is set to availableFlagSbCol=0 (S4003). The process of the subblock-based temporal merging candidate derivation unit ends.

Figure 53:
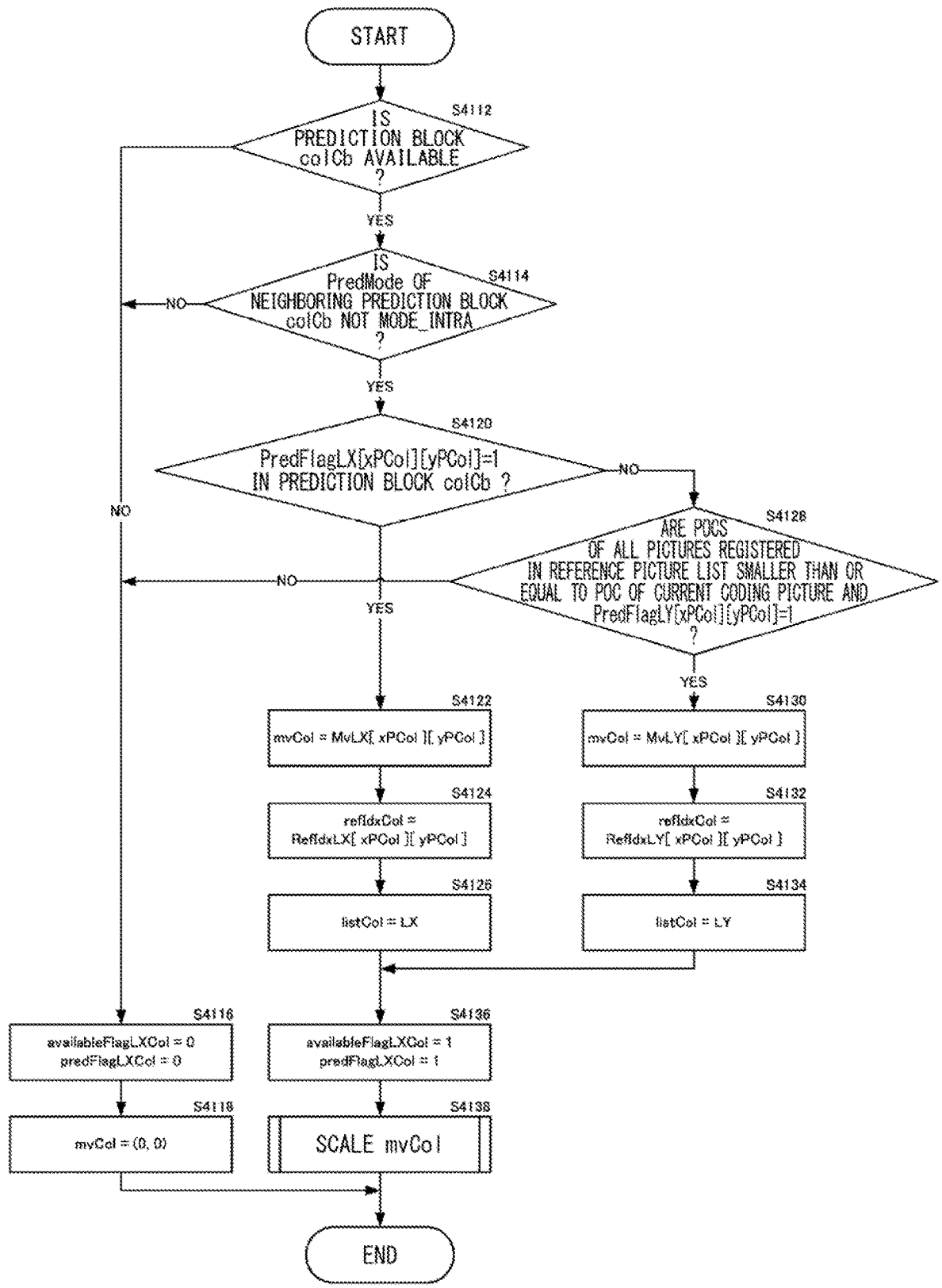
FIG. 53 is a flowchart for describing inter prediction information derivation.

On the other hand, when the prediction mode of colCb is inter prediction (S4020: YES), inter prediction information is derived for each reference list (S4022 and S4023). Here, a central motion vector ctrMvLX for each reference list and a flag ctrPredFlagLX indicating whether or not LX-prediction has been used are derived with respect to colCb. LX indicates a reference list, LX becomes L0 in the derivation of reference list 0, and LX becomes L1 in the derivation of reference list 1. Derivation of inter prediction information will be described with reference to FIG. 53.

When the coding block colCb at the different time is not available (S4112: NO) or when the prediction mode PredMode is intra prediction (MODE_INTRA) (S4114: NO), both the flag availableFlagLXCol and the flag predFlagLXCol are set to 0 (step S4116) and the vector mvCol is set as (0, 0) (S4118). The inter prediction information derivation process ends.

When the coding block colCb is available (S4112: YES) and the prediction mode PredMode is not intra prediction (MODE_INTRA) (S4114: YES), mvCol, refIdxCol and availableFlagCol are calculated in the following procedure.

When a flag PredFagLX[xPCol][yPCol] indicating whether the LX-prediction of the coding block colCb has been used is 1 (S4120: YES), the motion vector mvCol is set to have the same value as MvLX[xPCol][yPCol] that is the motion vector of LX of the coding block colCb (S4122), the reference index refIdxCol is set to have the same value as a reference index RefIdxLX[xPCol][yPCol] of LX (S4124), and a list listCol is set to LX (S4126). Here, xPCol and yPCol are indices indicating a position of an upper left sample of the coding block colCb within the picture colPic at the different time.

On the other hand, when the flag PredFlagLX[xPCol][yPCol] indicating whether the LX-prediction of the coding block colCb has been used is 0 (S4120: NO), the following process is performed. First, it is determined whether or not the POCs of all the pictures registered in all the reference lists are smaller than or equal to the POC of the current coding target picture (S4128). In addition, it is determined whether or not a flags PredFlagLY[xPCol][yPCol] indicating whether or not the LY-prediction of colCb has been used is 1 (S4128). Here, a reference list of the LY-prediction is defined to be different from that of the LX-prediction. That is, LY=L1 at LX=L0 and LY=L0 at LX=L1.

When this determination is true (S4128: YES), the motion vector mvCol is set to have the same value as MvLY[xPCol][yPCol] which is the motion vector of LY of the coding block colCb (S4130), the reference index refIdxCol is set to have the same value as a reference index RefIdxLY[xPCol][yPCol] of LY (S4132), and the list listCol is set to LX (S4134).

On the other hand, when this determination is false (S4128: NO), both the flag availableFlagLXCol and the flag predFlagLXCol are set to 0 (step S4116) and the motion vector mvCol is set as (0, 0) (S4118). The inter prediction information derivation process ends.

When the inter prediction information can be acquired from the coding block colCb, both the flag availableFlagLXCol and the flag predFlagLXCol are set to 1 (S4136).

Subsequently, the motion vector mvCol is scaled and is set to the motion vector mvLXCol (S4138). Because this processing is the same as that of S4245 in the temporal motion vector predictor candidate derivation unit 322, the description thereof will be omitted.

FIG. 50 is referred to again. After the inter prediction information is derived for each reference list, the calculated motion vector mvLXCol is set as the central motion vector ctrMvLX and the calculated flag predFlagLXCol is set as the flag ctrPredFlagLX (S4022 and S4023).

Then, it is determined whether the central motion vector is valid or invalid (S4024). If ctrPredFlagL0=0 and ctrPredFlagL1=0, it is determined that the central motion vector is invalid. Otherwise, it is determined that the central motion vector is invalid. When the center motion vector is invalid (S4024: NO), the flag indicating the existence of the subblock-based temporal merging candidate is set to availableFlagSbCol=0 (S4003). The process of the subblock-based temporal merging candidate derivation unit ends.

Figure 54:
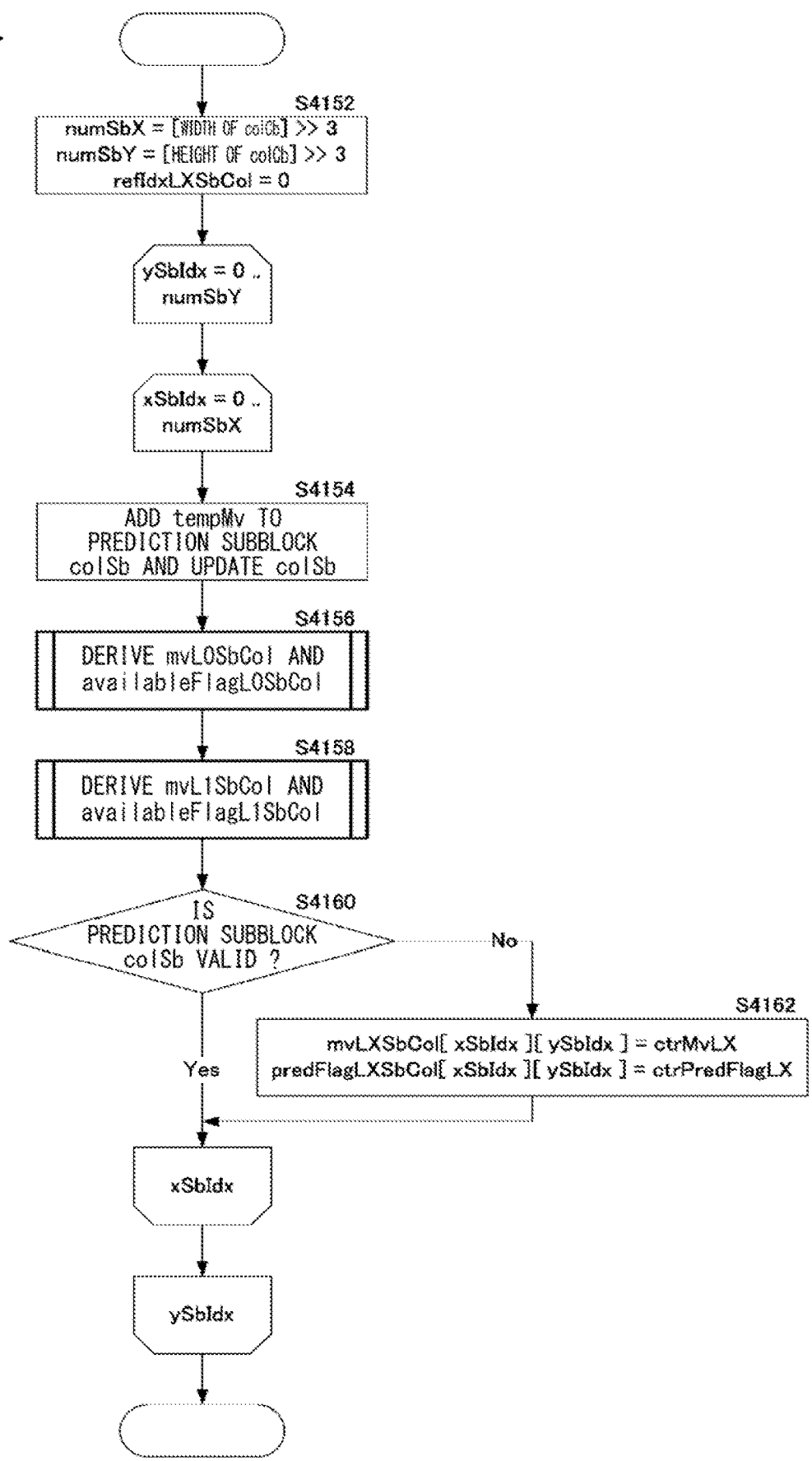
FIG. 54 is a flowchart for describing a subblock motion information derivation process.

On the other hand, when the center motion vector is valid (S4024: YES), the flag indicating the presence of the subblock-based temporal merging candidate is set to availableFlagSbCol=1 (S4025) and the subblock motion information is derived (S4026). This processing will be described with reference to FIG. 54.

First, the number of subblocks numSbX in a width direction and the number of subblocks numSbY in a height direction are calculated from a width cbWidth and a height cBheight of the coding block colCb (S4152). Also, refIdxLXSbCol=0 is set (S4152). After this processing, an iterative process is performed in units of prediction subblocks colSb. This iterative process is performed while an index ySbIdx in the height direction changes from 0 to numSbY and an index xSbIdx in the width direction changes from 0 to numSbX.

Assuming that the upper left position of the coding block colCb is (xCb, yCb), the upper left position (xSb, ySb) of the prediction subblock colSb is calculated as follows.

$xSb=xCb+xSbIdx*sbWidth$ $ySb=yCb+ySbIdx*sbHeight$

Next, a position where the temporal motion vector tempMv is added to the prediction subblock colSb becomes a new prediction subblock colSb (S4154). Assuming that the upper left position of the prediction subblock colSb is (xColSb, yColSb) and the temporal motion vector tempMv is (tempMv[0], tempMv[1]) at 1/16 sample precision, the upper left position of the new prediction subblock colSb is as follows.

$xColSb=Clip3(xCtb,xCtb+CtbSizeY+3,xSb+(tempMv[0]>>4))$ $yColSb=Clip3(yCtb,yCtb+CtbSizeY-1,ySb+(tempMv[1]>>4))$ Here, an upper left position of a tree block is (xCtb, yCtb) and a size of the tree block is CtbSizeY. As shown in the above equations, a position after the addition of tempMv is corrected in a range of about the size of the tree block so that the position after the addition of tempMv does not significantly deviate from a position before the addition of tempMv. When this position is outside the picture, the position is corrected inside the picture.

The inter prediction information is derived for each reference list (S4156 and S4158). Here, a motion vector mvLXSbCol for each reference list and a flag availableFlagLXSbCol indicating whether or not a prediction subblock is valid are derived in units of subblocks with respect to the prediction subblock colSb. LX indicates a reference list, LX becomes L0 in the derivation of reference list 0, and LX becomes L1 in the derivation of reference list 1. Because the derivation of the inter prediction information is the same as the processing of S4022 and S4023 in FIG. 50, the description thereof will be omitted.

After the inter prediction information is derived (S4156 and S4158), it is determined whether or not the prediction subblock colSb is valid (S4160). When availableFlagL0SbCol=0 and availableFlagL1SbCol=0, it is determined that colSb is invalid. Otherwise, it is determined that colSb is valid. When colSb is invalid (S4160: NO), the motion vector mvLXSbCol is set to the center motion vector ctrMvLX (S4162). Further, a flag predFlagLXSbCol indicating whether or not the LX-prediction has been used is set to the flag ctrPredFlagLX in the central motion vector (S4162). Accordingly, the derivation of the subblock motion information ends.

FIG. 50 is referred to again. The motion vector mvL0SbCol of L0 and the motion vector mvL1SbCol of L1 are added as candidates to the subblock-based merging candidate list subblockMergeCandList in the above-described subblock-based merge mode derivation unit 304 (S4028). However, this addition is made only when a flag indicating the presence of the subblock-based temporal merging candidate is availableSbCol=1. Accordingly, the process of the temporal merging candidate derivation unit 342 ends.

Although the above description of the subblock-based temporal merging candidate derivation unit 381 is for coding, the same is true for decoding. That is, the operation of the subblock-based temporal merging candidate derivation unit 481 in the subblock-based merge mode derivation unit 404 of FIG. 22 can be similarly described by replacing the coding in the above description with decoding.

<Motion-Compensated Prediction Process>

The motion-compensated prediction unit 306 acquires a position and a size of a block that is a current target of a prediction process in coding. Also, the motion-compensated prediction unit 306 acquires inter prediction information from the inter prediction mode determination unit 305. A reference index and a motion vector are derived from the acquired inter prediction information and a prediction signal is generated after a picture signal of a position to which a reference picture identified by the reference index within the decoded picture memory 104 is moved from a position identical to that of a picture signal of a prediction block by an amount of motion vector is acquired.

A motion-compensated prediction signal is supplied to a prediction method determination unit 105 using a prediction signal acquired from one reference picture as a motion-compensated prediction signal when the inter prediction mode in the inter prediction is prediction from a single reference picture such as L0-prediction or L1-prediction and using a prediction signal obtained by weighted-averaging prediction signals acquired from two reference pictures as a motion-compensated prediction signal when the prediction mode is prediction from two reference pictures such as an inter prediction mode of Bi-prediction. Although a weighted average ratio of bi-prediction is 1:1 here, a weighted average may be performed using another ratio. For example, a weighting ratio may increase as the picture interval between a picture, which is a prediction target, and a reference picture decreases. Also, the weighting ratio may be calculated using a corresponding table between combinations of picture intervals and weighting ratios.

The motion-compensated prediction nit 406 has a function similar to that of the motion-compensated prediction unit 306 of the coding side. The motion-compensated prediction unit 406 acquires inter prediction information from the normal motion vector predictor mode derivation unit 401, the normal merge mode derivation unit 402, the sub-block-based motion vector predictor mode derivation unit 403, and the subblock-based merge mode derivation unit 404 via the switch 408. The motion-compensated prediction unit 406 supplies an obtained motion-compensated prediction signal to the decoding picture signal superimposition unit 207.

<About Inter Prediction Mode>

A process of performing prediction from a single reference picture is defined as uni-prediction. In the case of uni-prediction, prediction using either one of two reference pictures registered in reference lists L0 and L1 such as L0-prediction or L1-prediction is performed.

Figure 32:
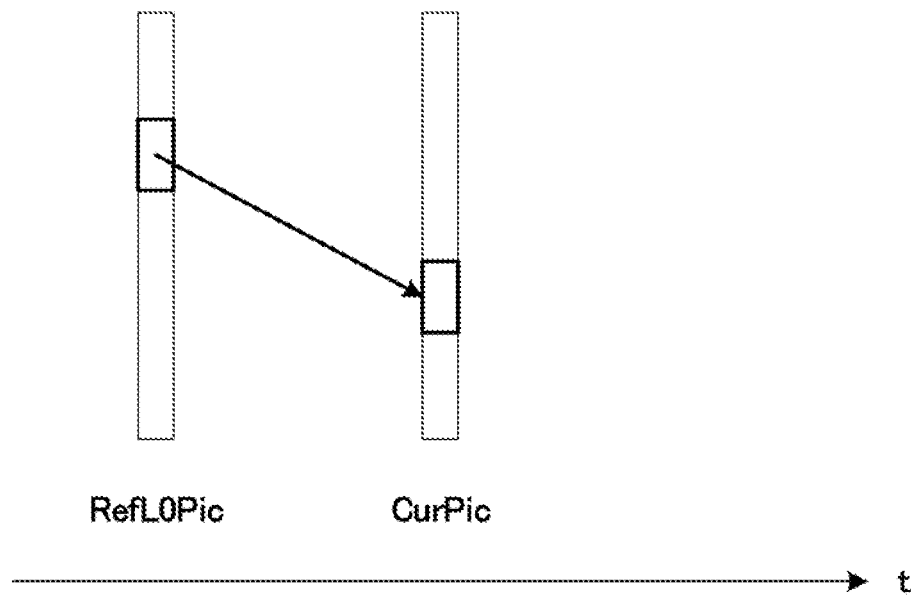
FIG. 32 is an explanatory diagram showing motion-compensated prediction when a clock time of a reference picture (RefL0Pic) of L0 is earlier than that of a target picture (CurPic) as L0-prediction.
Figure 33:
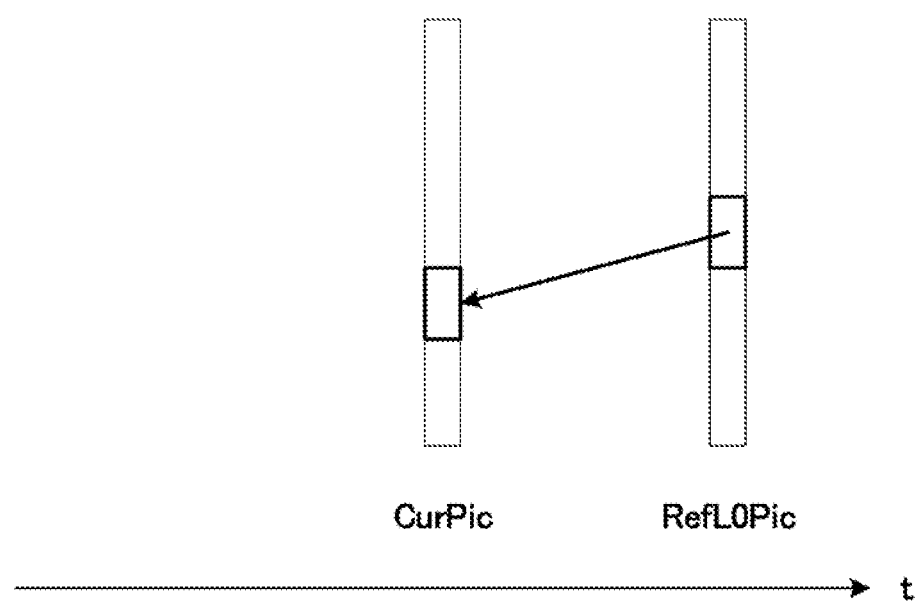
FIG. 33 is an explanatory diagram showing motion-compensated prediction when a clock time of a reference picture of L0-prediction is later than that of a target picture as L0-prediction.

FIG. 32 shows the case of uni-prediction in which a clock time of a reference picture (RefL0Pic) of L0 is earlier than that of a target picture (CurPic). FIG. 33 shows the case of uni-prediction in which a clock time of a reference picture of the L0-prediction is later than that of a target picture. Likewise, the reference picture of L0-prediction of FIGS. 32 and 33 can be replaced with a reference picture (RefL1Pic) of L1-prediction to perform uni-prediction.

Figure 34:
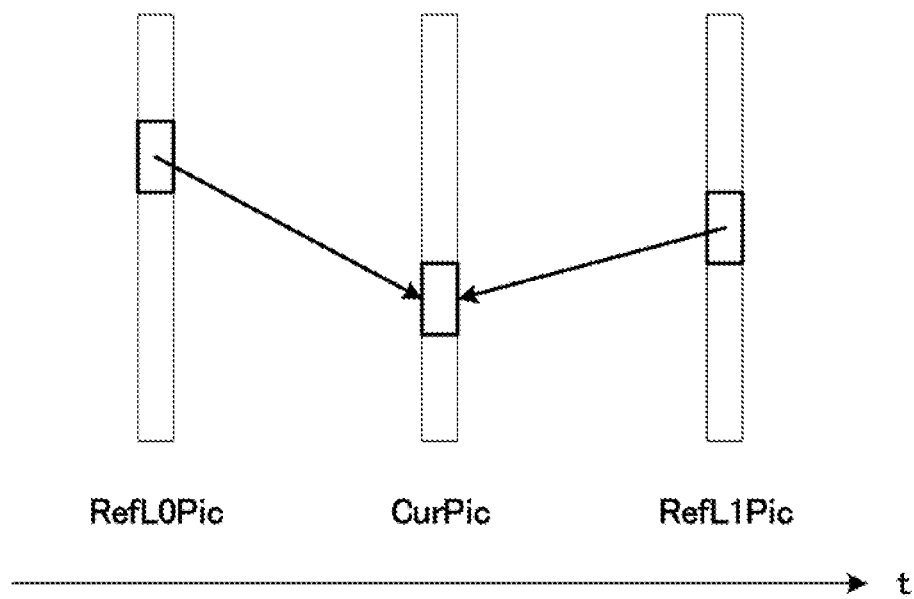
FIG. 34 is an explanatory diagram showing a prediction direction of notion-compensated prediction when a clock time of a reference picture of L0-prediction is earlier than that of a target picture and a clock time of a reference picture of L1-prediction is later than that of a target picture as bi-prediction.
Figure 35:
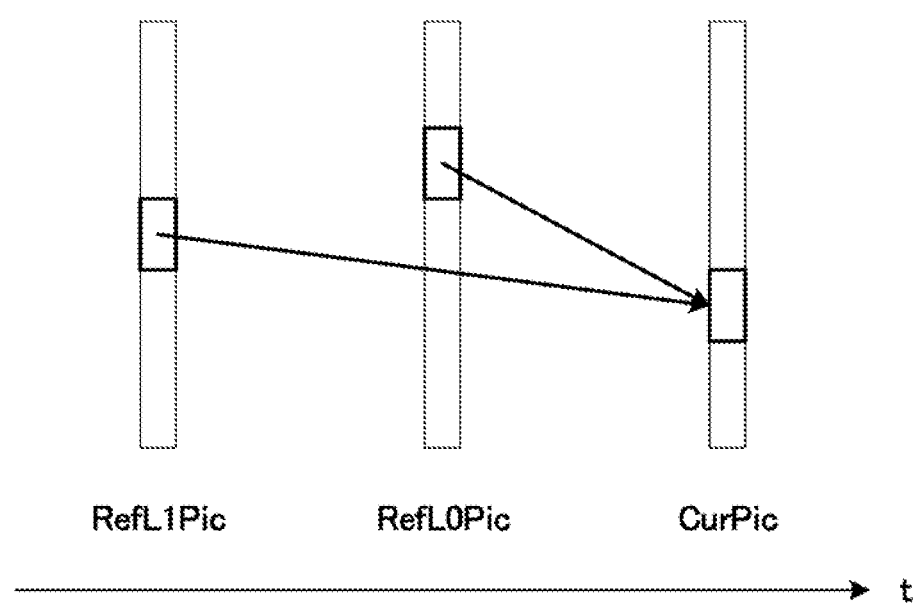
FIG. 35 is an explanatory diagram showing a prediction direction of motion-compensated prediction when a clock time of a reference picture of L0-prediction and a clock time of a reference picture of L1-prediction are earlier than that of a target picture as bi-prediction.
Figure 36:
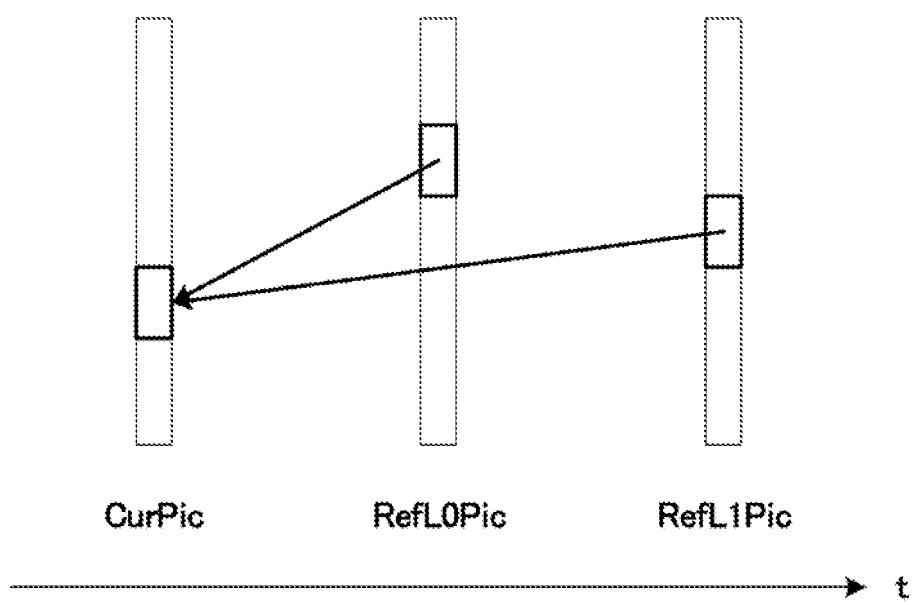
FIG. 36 is an explanatory diagram showing a prediction direction of motion-compensated prediction when a clock time of a reference picture of L0-prediction and a clock time of a reference picture of L1-prediction are later than that of a target picture as bi-prediction.

The process of performing prediction from two reference pictures is defined as bi-prediction and the bi-prediction is represented as Bi-prediction using both L0-prediction and L1-prediction. FIG. 34 shows the case of the bi-prediction in which a clock time of a reference picture of L0-prediction is earlier than that of a target picture and a clock time of a reference picture of L1-prediction is later than that of the target picture. FIG. 35 shows the case of bi-prediction in which clock times of the reference picture of L0-prediction and the reference picture of L1-prediction are earlier than that of a target picture. FIG. 36 shows the case of bi-prediction in which a clock time of a reference picture of L0-prediction and a clock time of a reference picture of L1-prediction are later than that of a target picture.

As described above, a relationship between a type of prediction of L0/L1 and time can be used without being limited to L0 which is in the past direction and L1 which is in the future direction. In the case of bi-prediction, each of L0-prediction and L1-prediction may be performed using the same reference picture. Also, it is determined whether to perform motion-compensated prediction according to uni-prediction or bi-prediction on the basis of, for example, information (for example, a flag) indicating whether to use L0-prediction and whether to use L1-prediction.

<About Reference Index>

In the embodiment of the present invention, it is possible to select an optimum reference picture from a plurality of reference pictures in motion-compensated prediction to improve the accuracy of motion-compensated prediction. Thus, the reference picture used in the motion-compensated prediction is used as a reference index and the reference index is coded in the bitstream together with the motion vector difference.

<Motion Compensation Process Based on Normal Motion Vector Predictor Mode>

As shown in the inter prediction unit 102 of the coding side of FIG. 16, when inter prediction information from the normal motion vector predictor mode derivation unit 301 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 of the decoding side of FIG. 22, when the switch 408 has been connected to the normal motion vector predictor mode derivation unit 401 in the decoding process, the motion-compensated prediction unit 406 acquires inter prediction information from the normal motion vector predictor mode derivation unit 401, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Normal Merge Mode>

Also, as shown in the inter prediction unit 102 in the coding side of FIG. 16, when inter prediction information has been selected from the normal merge mode derivation unit 302 in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the normal merge mode derivation unit 402 in the decoding process, the motion-compensated prediction unit 406 acquires inter prediction information from the normal merge mode derivation unit 402, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Subblock-Based Motion Vector Predictor Mode>

Also, as shown in the inter prediction unit 102 on the coding side of FIG. 16, when inter prediction information from the subblock-based motion vector predictor mode derivation unit 303 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the subblock-based motion vector predictor mode derivation unit 403 in the decoding process, the motion-compensated prediction unit 406 acquires inter prediction information from the subblock-based motion vector predictor mode derivation unit 403, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Subblock-Based Merge Mode>

Also, as shown in the inter prediction unit 102 on the coding side of FIG. 16, when inter prediction information from the subblock-based merge mode derivation unit 304 has been selected in the inter prediction mode determination unit 305, the motion-compensated prediction unit 306 acquires the inter prediction information from the inter prediction mode determination unit 305, derives an inter-prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the subblock-based merge mode derivation unit 404 in the decoding process, the motion-compensated prediction unit 406 acquires inter prediction information from the subblock-based merge mode derivation unit 404, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Affine Transform Prediction>

In the normal motion vector predictor mode and the normal merge mode, motion compensation of an affine model can be used on the basis of the following flags. The following flags are reflected in the following flags on the basis of inter prediction conditions determined by the inter prediction mode determination unit 305 in the coding process and are coded in a bitstream. In the decoding process, it is identified whether to perform the motion compensation of the affine model on the basis of the following flags in the bitstream.

sps_affine_enabled_flag represents whether or not motion compensation of the affine model can be used in inter prediction. If sps_affine_enabled_flag is 0, suppression is performed so that it is not motion compensation of an affine model in units of sequences. Also, inter_affine_flag and cu_affine_type_flag are not transmitted in CU (coding block) syntax of a coding video sequence. If sps_affine_enabled_flag is 1, motion compensation of an affine model can be used in a coding video sequence.

sps_affine_type_flag represents whether or not motion compensation of a six-parameter affine model can be used in inter prediction. If sps_affine_type_flag is 0, suppression is performed so that it is not motion compensation of the six-parameter affine model. Also, cu_affine_type_flag is not transmitted in CU syntax of a coding video sequence. If sps_affine_type_flag is 1, motion compensation of the six-parameter affine model can be used in the coding video sequence. When sps_affine_type_flag does not exist, it is assumed to be 0.

When a P or B slice is decoded, if inter_affine_flag is 1 in the current target CU, motion compensation of the affine model is used to generate a motion-compensated prediction signal of the current target CU. If inter_affine_flag is 0, the affine model is not used in the current target CU. When inter_affine_flag does not exist, it is assumed to be 0.

When a P or B slice is decoded, if cu_affine_type_flag is 1 in the current target CU, motion compensation of a six-parameter affine model is used to generate a motion-compensated prediction signal of the current target CU. If cu_affine_type_flag is 0, motion compensation of a four-parameter affine model is used to generate a motion-compensated prediction signal of the current target CU.

In motion compensation of an affine model, because a reference index and a motion vector are derived in units of subblocks, a motion-compensated prediction signal is generated using a reference index or a motion vector which is a target in units of subblocks.

A four-parameter affine model is a mode in which the motion vector of the subblock is derived from four parameters of horizontal components and vertical components of motion vectors of the two control points and motion compensation is performed in units of subblocks.

Second Embodiment

In a second embodiment, at the time of derivation of affine construction merge candidates in subblock-based merge mode derivation units 304 and 404, a target reference picture to be compared with reference pictures of affine control points (CP0, CP1, CP2, and CP3) is fixed and it is determined whether or not an affine transform is possible. For example, the target reference picture is fixed to a reference picture having reference picture index 0 and it is determined whether or not an affine transform is possible according to each combination of affine control points (CP0, CP1, CP2, and CP3).

By comparing the reference picture of each affine control point with the fixed reference picture, it is possible to construct an affine model of three affine control points based on an upper right affine control point CP1, a lower left affine control point CP2, and a lower right affine control point CP3 without using an upper left affine control point CP0. Thereby, it is possible to improve a possibility that the affine construction merging candidate can be derived, the prediction accuracy of the affine merge mode is improved, and the coding efficiency is improved.

Two or more of all the embodiments described above may be combined.

In all the embodiments described above, a bitstream output by the picture coding device has a specific data format so that the bitstream can be decoded in accordance with the coding method used in the embodiment. Also, a picture decoding device corresponding to the picture coding device can decode the bitstream of the specific data format.

When a wired or wireless network is used to exchange a bitstream between the picture coding device and the picture decoding device, the bitstream may be converted into a data format suitable for a transmission form of a communication path and transmitted. In this case, a transmission device for converting the bitstream output from the picture coding device into coded data of a data format suitable for the transmission form of the communication path and transmitting the coded data to the network and a reception device for receiving the coded data from the network, restoring the coded data to the bitstream, and supplying the bitstream to the picture decoding device are provided. The transmission device includes a memory that buffers the bitstream output by the picture coding device, a packet processing unit that packetizes the bitstream, and a transmission unit that transmits packetized coded data via the network. The reception device includes a reception unit that receives the packetized coded data via the network, a memory that buffers the received coded data, and a packet processing unit that generates a bitstream by performing packet processing on the coded data and supplies the bitstream to the picture decoding device.

Also, a display device may be provided by adding a display unit that displays a picture decoded by the picture decoding device to the configuration. In this case, the display unit reads a decoded picture signal generated by the decoding picture signal superimposition unit 207 and stored in the decoded picture memory 208 and displays the decoded picture signal on a screen.

Also, an imaging device may be provided by adding an imaging unit that inputs a captured picture to the picture coding device to the configuration. In this case, the imaging unit inputs a captured picture signal to the block split unit 101.

Figure 37:
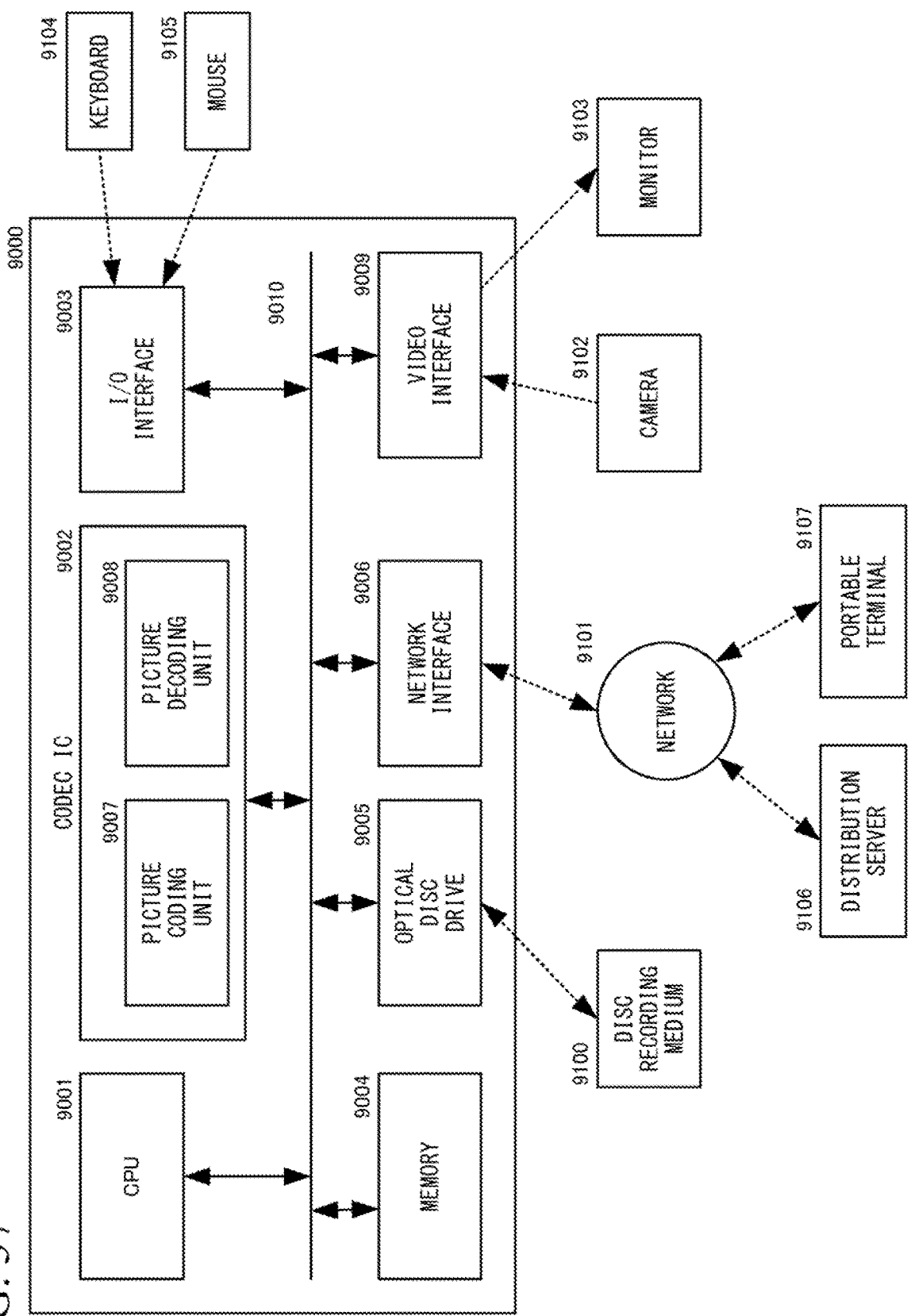
FIG. 37 is an explanatory diagram showing an example of a hardware configuration of a coding/decoding device according to an embodiment of the present invention.

FIG. 37 shows an example of a hardware configuration of the coding/decoding device according to the present embodiment. The coding/decoding device includes the configuration of the picture coding device and the picture decoding device according to the embodiment of the present invention. A related coding/decoding device 9000 includes a CPU 9001, a codec IC 9002, an I/O interface 9003, a memory 9004, an optical disc drive 9005, a network interface 9006, and a video interface 9009 and the respective parts are connected by a bus 9010.

A picture coding unit 9007 and a picture decoding unit 9008 are typically implemented as the codec IC 9002. A picture coding process of the picture coding device according to the embodiment of the present invention is executed by the picture coding unit 9007 and a picture decoding process in the picture decoding device according to the embodiment of the present invention is performed by the picture decoding unit 9008. The I/O interface 9003 is implemented by, for example, a USB interface, and is connected to an external keyboard 9104, a mouse 9105, and the like. The CPU 9001 controls the coding/decoding device 9000 so that a user-desired operation is executed on the basis of a user operation input via the I/O interface 9003. User operations using the keyboard 9104, the mouse 9105, and the like include the selection of a coding or decoding function to be executed, setting of coding quality, designation of an input/output destination of a bitstream, designation of an input/output destination of a picture, and the like.

When the user desires an operation of reproducing a picture recorded on a disc recording medium 9100, the optical disc drive 9005 reads a bitstream from the disc recording medium 9100 that has been inserted and transmits the read bitstream to the picture decoding unit 9008 of the codec IC 9002 via the bus 9010. The picture decoding unit 9008 executes a picture decoding process on the input bitstream in the picture decoding device according to the embodiment of the present invention and transmits a decoded picture to an external monitor 9103 via the video interface 9009. The coding/decoding device 9000 includes a network interface 9006 and can be connected to an external distribution server 9106 and a portable terminal 9107 via a network 9101. When the user desires to reproduce the picture recorded on the distribution server 9106 or the portable terminal 9107 instead of the picture recorded on the disc recording medium 9100, the network interface 9006 acquires a bitstream from the network 9101 instead of reading the bitstream from the input disc recording medium 9100. When the user desires to reproduce the picture recorded in the memory 9004, the picture decoding process in the picture decoding device according to the embodiment of the present invention is executed on the bitstream recorded in the memory 9004.

When the user desires to perform an operation of coding a picture captured by the external camera 9102 and recording the coded picture in the memory 9004, the video interface 9009 inputs the picture from the camera 9102 and transmits the picture to the picture coding unit 9007 of the codec IC 9002 via the bus 9010. The picture coding unit 9007 executes a picture coding process on a picture input via the video interface 9009 in the picture coding device according to the embodiment of the present invention to create a bitstream. Then, the bitstream is transmitted to the memory 9004 via the bus 9010. When the user desires to record a bitstream on the disc recording medium 9100 instead of the memory 9004, the optical disc drive 9005 writes the bitstream to the disc recording medium 9100 which has been inserted.

It is also possible to implement a hardware configuration that includes a picture coding device without including a picture decoding device or a hardware configuration that includes a picture decoding device without including a picture coding device. Such a hardware configuration is implemented, for example, by replacing the codec IC 9002 with the picture coding unit 9007 or the picture decoding unit 9008.

The above processes related to coding and decoding may be implemented as a transmission, storage, and reception device using hardware and implemented by firmware stored in a read only memory (ROM), a flash memory, or the like or software of a computer or the like. A firmware program and a software program thereof may be provided by recording the programs on a recording medium capable of being read by a computer or the like or may be provided from a server through a wired or wireless network or may be provided as data broadcasts of terrestrial or satellite digital broadcasting.

The present invention has been described above on the basis of the embodiments. The embodiments are examples and it will be understood by those skilled in the art that various modifications are possible in combinations of the respective components and processing processes and such modifications are within the scope of the present invention.

EXPLANATION OF REFERENCES

100 Picture coding device
101 Block split unit
102 Inter prediction unit
103 intra prediction unit
104 Decoded picture memory
105 Prediction method determination unit
106 Residual generation unit
107 Orthogonal transform/quantization unit
108 Bit strings coding unit
109 Inverse quantization/inverse orthogonal transform unit
110 Decoding picture signal superimposition unit
111 Coding information storage memory
200 Picture decoding device
201 Bit strings decoding unit
202 Block split unit
203 Inter prediction unit
204 Intra prediction unit
205 Coding information storage memory
206 Inverse quantization/inverse orthogonal transform unit
207 Decoding picture signal superimposition unit
208 Decoded picture memory

What is claimed is:

1. A moving-picture coding device for performing an affine transform in units of coding blocks, the moving-picture coding device comprising:
a subblock-based temporal merging candidate derivation unit configured to derive a subblock-based temporal merging candidate which has a motion vector and a flag indicating whether or not a prediction subblock is valid for each reference list in units of subblocks;
an affine inheritance merging candidate derivation unit configured to derive an affine inheritance merging candidate for inheriting an affine model of blocks neighboring a coding target block in a space domain;
an affine construction merging candidate derivation unit configured to derive an affine construction merging candidate from a plurality of motion information elements of blocks neighboring the coding target block in a space or time domain;
an affine fixation merging candidate derivation unit configured to derive an affine fixation merging candidate in which motion information of an affine control point is fixed; and
a subblock-based merging candidate selection unit configured to select a subblock-based merging candidate from the subblock-based temporal merging candidate, the affine inheritance merging candidate, the affine construction merging candidate and the affine fixation merging candidate.

2. A moving-picture coding method of performing an affine transform in units of coding blocks, the moving-picture coding method comprising:
an affine inheritance merging candidate derivation step of deriving an affine inheritance merging candidate for inheriting an affine model of blocks neighboring a coding target block in a space domain;
a subblock-based temporal merging candidate derivation of deriving a subblock-based temporal merging candidate which has a motion vector and a flag indicating whether or not a prediction subblock is valid for each reference list in units of subblocks;
an affine construction merging candidate derivation step of deriving an affine construction merging candidate from a plurality of motion information elements of blocks neighboring the coding target block in a space or time domain;
an affine fixation merging candidate derivation step of deriving an affine fixation merging candidate in which motion information of an affine control point is fixed; and
a subblock-based merging candidate selection step of selecting a subblock-based merging candidate from the subblock-based temporal merging candidate, the affine inheritance merging candidate, the affine construction merging candidate and the affine fixation merging candidate.

3. A moving-picture coding program for performing an affine transform in units of coding blocks stored in a computer-readable non-transitory recording medium, the moving-picture coding program causing a computer to execute:
an affine inheritance merging candidate derivation step of deriving an affine inheritance merging candidate for inheriting an affine model of blocks neighboring a coding target block in a space domain;
a subblock-based temporal merging candidate derivation of deriving a subblock-based temporal merging candidate which has a motion vector and a flag indicating whether or not a prediction subblock is valid for each reference list in units of subblocks;
an affine construction merging candidate derivation step of deriving an affine construction merging candidate from a plurality of motion information elements of blocks neighboring the coding target block in a space or time domain;
an affine fixation merging candidate derivation step of deriving an affine fixation merging candidate in which motion information of an affine control point is fixed; and
a subblock-based merging candidate selection step of selecting a subblock-based merging candidate from the subblock-based temporal merging candidate, the affine inheritance merging candidate, the affine construction merging candidate and the affine fixation merging candidate.

4. A moving-picture decoding device for performing an affine transform in units of decoding blocks, the moving-picture decoding device comprising:
an affine inheritance merging candidate derivation unit configured to derive an affine inheritance merging candidate for inheriting an affine model of blocks neighboring a decoding target block in a space domain;
a subblock-based temporal merging candidate derivation unit configured to derive a subblock-based temporal merging candidate which has a motion vector and a flag indicating whether or not a prediction subblock is valid for each reference list in units of subblocks;
an affine construction merging candidate derivation unit configured to derive an affine construction merging candidate from a plurality of motion information elements of blocks neighboring the decoding target block in a space or time domain;
an affine fixation merging candidate derivation unit configured to derive an affine fixation merging candidate in which motion information of an affine control point is fixed; and a subblock-based merging candidate selection unit configured to select a subblock-based merging candidate from the subblock-based temporal merging candidate, the affine inheritance merging candidate, the affine construction merging candidate and the affine fixation merging candidate.

5. A moving-picture decoding method of performing an affine transform in units of decoding blocks, the moving-picture decoding method comprising:

an affine inheritance merging candidate derivation step of deriving an affine inheritance merging candidate for inheriting an affine model of blocks neighboring a decoding target block in a space domain;

a subblock-based temporal merging candidate derivation of deriving a subblock-based temporal merging candidate which has a motion vector and a flag indicating whether or not a prediction subblock is valid for each reference list in units of subblocks;

an affine construction merging candidate derivation step of deriving an affine construction merging candidate from a plurality of motion information elements of blocks neighboring the decoding target block in a space or time domain;

an affine fixation merging candidate derivation step of deriving an affine fixation merging candidate in which motion information of an affine control point is fixed; and a subblock-based merging candidate selection step of selecting a subblock-based merging candidate from the subblock-based temporal merging candidate, the affine inheritance merging candidate, the affine construction merging candidate and the affine fixation merging candidate.

6. A moving-picture decoding program for performing an affine transform in units of decoding blocks stored in a computer-readable non-transitory recording medium, the moving-picture decoding program causing a computer to execute:

an affine inheritance merging candidate derivation step of deriving an affine inheritance merging candidate for inheriting an affine model of blocks neighboring a decoding target block in a space domain;

a subblock-based temporal merging candidate derivation of deriving a subblock-based temporal merging candidate which has a motion vector and a flag indicating whether or not a prediction subblock is valid for each reference list in units of subblocks;

an affine construction merging candidate derivation step of deriving an affine construction merging candidate from a plurality of motion information elements of blocks neighboring the decoding target block in a space or time domain;

an affine fixation merging candidate derivation step of deriving an affine fixation merging candidate in which motion information of an affine control point is fixed; and a subblock-based merging candidate selection step of selecting a subblock-based merging candidate from the subblock-based temporal merging candidate, the affine inheritance merging candidate, the affine construction merging candidate and the affine fixation merging candidate.

* * * * *